(12) United States Patent
Fukagawa et al.

(10) Patent No.: US 7,981,488 B2
(45) Date of Patent: Jul. 19, 2011

(54) LIQUID CRYSTAL DISPLAY DEVICE

(75) Inventors: Nobutaka Fukagawa, Minami-ashigara (JP); Hiromoto Haruta, Minami-ashigara (JP); Yutaka Nozoe, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 850 days.

(21) Appl. No.: 11/916,318

(22) PCT Filed: Jun. 6, 2006

(86) PCT No.: PCT/JP2006/311702
§ 371 (c)(1),
(2), (4) Date: Dec. 3, 2007

(87) PCT Pub. No.: WO2006/132404
PCT Pub. Date: Dec. 14, 2006

(65) Prior Publication Data
US 2009/0153782 A1    Jun. 18, 2009

(30) Foreign Application Priority Data
Jun. 8, 2005   (JP) .................. 2005-168713

(51) Int. Cl.
*G02F 1/335* (2006.01)
*G02F 1/13363* (2006.01)

(52) U.S. Cl. ........... 428/1.3; 349/96; 349/118; 428/1.31

(58) Field of Classification Search .......... 428/1.3, 428/1.31, 1.33, 1.54; 349/117–122
See application file for complete search history.

(56) References Cited

U.S. PATENT DOCUMENTS

| 2003/0218709 A1* | 11/2003 | Ito et al. ............... 349/117 |
| 2004/0239852 A1 | 12/2004 | Ono et al. |
| 2005/0105027 A1* | 5/2005 | Wada et al. ............. 349/117 |

FOREIGN PATENT DOCUMENTS

| EP | 10451261 A1 | 10/2000 |
| EP | 1215216 A1 * | 6/2002 |
| JP | 2005-037440 A | 2/2005 |
| JP | 2005-099236 A | 4/2005 |
| JP | 2005-134863 A | 5/2005 |
| WO | WO 03/032060 A1 | 4/2003 |
| WO | WO 2006030954 A1 * | 3/2006 |

OTHER PUBLICATIONS

JPO Website Machine English Translation of JP 2004-050516, Kawanishi et al., Feb. 19, 2004.*
Form PCT/ISA/210 (International Search Report) dated Aug. 8, 2006.
Form PCT/ISA/237 (Written Opinion of the International Searching Authority) dated Aug. 8, 2006.

* cited by examiner

*Primary Examiner* — Sophie Hon
(74) *Attorney, Agent, or Firm* — Buchanan Ingersoll & Rooney PC

(57) ABSTRACT

A liquid crystal display device comprising a liquid crystal cell and two polarizing plates disposed on the both sides thereof, wherein a protective film satisfying the specific conditions of retardation is sandwitched each between the liquid crystal cell and the polarizing plates. The liquid crystal display device can be easily produced at low costs and has a low viewing angle dependency of color.

10 Claims, 1 Drawing Sheet

LIQUID CRYSTAL DISPLAY DEVICE

This application is a 371 of PCT/JP2006/311702 filed Jun. 6, 2006.

TECHNICAL FIELD

The present invention relates to a liquid crystal display device, particularly to a VA mode liquid crystal display device excellent in viewing angle properties.

BACKGROUND ART

Liquid crystal display devices are space-saving image display devices with lower power consumptions, whereby the use thereof have been increasing year by year. The liquid crystal display devices had a major disadvantage of large viewing angle dependencies. However, a wide viewing angle liquid crystal display device of a VA mode has been put into practical use in recent years, so that demand for the liquid crystal display devices is expanding rapidly even in the field of television, etc. needing high-quality images.

Though the VA mode liquid crystal display devices advantageously have higher contrast as compared with devices using the other modes, they are disadvantageous in that the contrast and color are largely changed due to the viewing angle. In view of the disadvantage, for example, disclosed in WO 2003/032060, etc. are methods of using 2 retardation layers having different optical properties to obtain a VA mode liquid crystal display device such that a sharp achromatic black can be observed even from an oblique direction.

However, the above methods require a process of bonding the retardation films after production of a polarizing plate. Thus, the methods are disadvantageous in complicated production processes, low productivity, and high production costs, and the improvement of the disadvantages has been demanded.

DISCLOSURE OF THE INVENTION

An object of the present invention is to provide a liquid crystal display device that can be easily produced with low costs and has a low viewing angle dependency of color.

The above problem has been solved by the following embodiments.

[1] A liquid crystal display device comprising a liquid crystal cell and two polarizing plates disposed on the both sides thereof, wherein
the polarizing plates each comprise a polarizer and two protective films disposed on the both sides thereof,
in one of the polarizing plates, the protective film facing the liquid crystal cell has properties of the following inequalities (1) to (5), and
in the other polarizing plate, the protective film facing the liquid crystal cell has properties of the following inequalities (6) to (10).

| | |
|---|---|
| $20 \text{ nm} < Re(548) < 150 \text{ nm}$ | Inequality (1) |
| $20 \text{ nm} < Rth(548) < 150 \text{ nm}$ | Inequality (2) |
| $0 < Rth(548)/Re(548) < 2.0$ | Inequality (3) |
| $0.5 < Re(446)/Re(548) < 1$ | Inequality (4) |
| $1.0 < Re(628)/Re(548) < 2.0$ | Inequality (5) |
| $0 \text{ nm} < Re(548) < 10 \text{ nm}$ | Inequality (6) |
| $100 \text{ nm} < Rth(548) < 300 \text{ nm}$ | Inequality (7) |
| $10 < Rth(548)/Re(548)$ | Inequality (8) |
| $1.0 < Rth(446)/Rth(548) < 2.0$ | Inequality (9) |
| $0.5 < Rth(628)/Rth(548) < 1.0$ | Inequality (10) |

[2] The liquid crystal display device according to [1], wherein the protective film facing the liquid crystal cell is a cellulose acylate film.

[3] The liquid crystal display device according to [1] or [2], wherein the protective film facing the liquid crystal cell is a stretched cellulose acylate film.

[4] The liquid crystal display device according to [2] or [3], wherein the cellulose acylate film having the properties of the inequalities (1) to (5) comprises a cellulose acylate having two or more types of acyl groups.

[5] The liquid crystal display device according to any one of [2] to [4], wherein the cellulose acylate film having the properties of the inequalities (1) to (5) comprises a cellulose acylate having a fatty acyl group and a substituted or unsubstituted aromatic acyl group.

[6] The liquid crystal display device according to any one of [2] to [5], wherein the cellulose acylate film having the properties of the inequalities (1) to (5) comprises at least one Re generating agent.

[7] The liquid crystal display device according to [6], wherein the Re generating agent is a compound represented by the following formula (I):

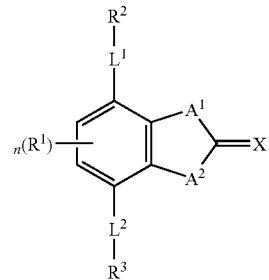

Formula (I)

wherein $L^1$ and $L^2$ independently represent a single bond or a divalent linking group. $A^1$ and $A^2$ independently represent one selected from the group consisting of —O—, —NR—, —S—, and —CO—. R represents a hydrogen atom or a substituent. $R^1$, $R^2$ and $R^3$ independently represent a substituent. X represents a nonmetal atom of Groups 14 to 16, and a hydrogen atom or a substituent may be connected to X. n represents an integer of 0 to 2.

[8] The liquid crystal display device according to any one of [2] to [7], wherein the cellulose acylate film having the properties of the inequalities (6) to (10) comprises at least one Rth generating agent.

[9] The liquid crystal display device according to [8], wherein the Rth generating agent has an absorption maximum in a wavelength range of 250 to 380 nm.

[10] The liquid crystal display device according to any one of [1] to [9], wherein the liquid crystal cell uses a VA mode.

According to the invention, there is provided a liquid crystal display device that can be easily produced at low costs and has a low viewing angle dependency of color.

BEST MODE FOR CARRYING OUT THE INVENTION

Figure 1:
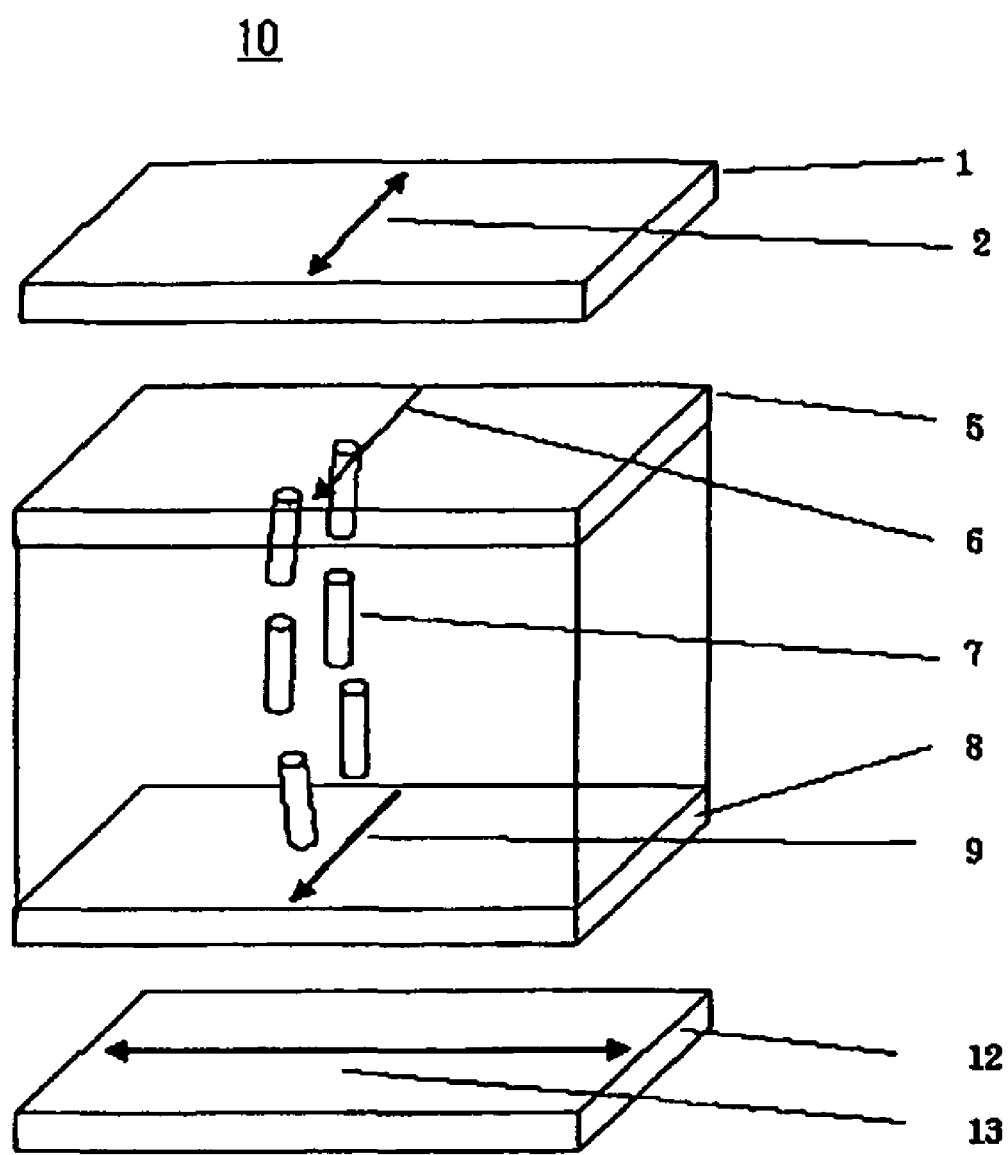
FIG. 1 is a schematic view showing an example of the liquid crystal display device of the present invention.

<Feature of the Liquid Crystal Display Device of the Present Invention>
[Structural Feature and Optical Properties]

The liquid crystal display device of the present invention has a liquid crystal cell and two polarizing plates disposed on the both sides thereof, each of the polarizing plates has a polarizer and two protective films disposed on the both sides thereof, the protective film facing the liquid crystal cell has properties of the following inequalities (1) to (5) in one of the polarizing plates, and the protective film facing the liquid crystal cell has properties of the following inequalities (6) to (10) in the other polarizing plate.

| | |
|---|---|
| 20 nm<Re(548)<150 nm | Inequality (1) |
| 20 nm<Rth(548)<150 nm | Inequality (2) |
| 0<Rth(548)/Re(548)<2.0 | Inequality (3) |
| 0.5<Re(446)/Re(548)<1 | Inequality (4) |
| 1.0<Re(628)/Re(548)<2.0 | Inequality (5) |
| 0<Re(548)<10 nm | Inequality (6) |
| 100 nm<Rth(548)<300 nm | Inequality (7) |
| 10<Rth(548)/Re(548) | Inequality (8) |
| 1.0<Rth(446)/Rth(548)<2.0 | Inequality (9) |
| 0.5<Rth(628)/Rth(548)<1.0 | Inequality (10) |

The invention is characterized by controlling the retardation wavelength dispersion of the protective films of the polarizing plates, facing the liquid crystal cell, and specifically by using the polarizing plate protective film satisfying the inequalities (1) to (5) (hereinafter referred to as the polarizing plate protective film A in some cases) and the polarizing plate protective film satisfying the inequalities (6) to (10) (hereinafter referred to as the polarizing plate protective film C in some cases). The protective films on the opposite side of the polarizing plates may be known ones or the polarizing plate protective films A and C.

The polarizing plate protective films A and C will be described in detail after the following explanation of retardation of film.

[Retardation of Film]

In this specification, $Re(\lambda)$ and $Rth(\lambda)$ represent an in-plane retardation and a retardation in the thickness direction at a wavelength $\lambda$, respectively. The $Re(\lambda)$ is measured by means of KOBRA 21ADH or WR manufactured by Oji Scientific Instruments while applying a $\lambda$ nm wavelength light in the normal line direction of the film. The $Rth(\lambda)$ is calculated in the following manner in the case of measuring a film of a uniaxial or biaxial refractive index ellipsoid.

The $Rth(\lambda)$ is calculated by KOBRA 21ADH or WR based on 6 retardation values, an assumed value of average refractive index, and an inputted thickness, the 6 retardation values being $Re(\lambda)$ values measured by applying a $\lambda$ nm wavelength light to the film from 6 directions tilted at 0 to 50 degrees with 10 degrees interval to the film normal line such that an in-plane slow axis (detected by KOBRA 21ADH or WR) is used as a tilt axis (a rotation axis), or alternatively an arbitrary in-plane axis is used as a rotation axis when there is no slow axis.

In the above calculation, in a case where a retardation value is 0 at a certain tilt angle to the normal line using the in-plane slow axis as the rotation axis, positive sign of a retardation value at a tilt angle larger than the certain tilt angle is converted to negative sign, and then the negative retardation value is used in the calculation by KOBRA 21ADH or WR.

The Rth may be calculated by the following equalities (21) and (22) based on an assumed value of average refractive index, an inputted thickness, and 2 retardation values that is measured in 2 tilt directions such that a slow axis is used as a tilt axis (a rotation axis), or alternatively an arbitrary in-plane axis is used as a rotation axis when there is no slow axis.

$$Re(\theta) = \left[ nx - \frac{(ny \times nz)}{\sqrt{\left\{ ny\sin\left(\sin^{-1}\left(\frac{\sin(-\theta)}{nx}\right)\right)\right\}^2 + \left\{ nz\cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}}$$

Equality (21)

$Re(\theta)$ represents a retardation value in a direction tilted at an angle $\theta$ to the normal line. In the equality (21), nx represents an in-plane refractive index in the slow axis direction, ny represents an in-plane refractive index in a direction perpendicular to the slow axis direction, and nz represents a refractive index in a direction perpendicular to the directions.

$$Rth = ((nx+ny)/2 - nz) \times d$$

The $Rth(\lambda)$ is calculated in the following manner in the case of measuring a film that is not a uniaxial or biaxial index ellipsoid and thus has no so-called optic axes. The $Rth(\lambda)$ is calculated by KOBRA 21ADH or WR based on 11 retardation values, an assumed value of average refractive index, and an inputted thickness, the 11 retardation values being $Re(\lambda)$ values measured by applying a $\lambda$ nm wavelength light to the film from 11 directions tilted at −50 to +50 degrees with 10 degrees interval to the film normal line such that an in-plane slow axis (detected by KOBRA 21ADH or WR) is used as a tilt axis (a rotation axis).

In the above measurement, the assumed values of average refractive indexes may be those described in *Polymer Handbook* (JOHN WILEY & SONS, INC.) and catalogs of various optical films. Unknown average refractive indexes can be measured by an Abbe refractometer. The average refractive indexes of major optical film materials are as follows: cellulose acylate (1.48), cycloolefin polymer (1.52), polycarbonate (1.59), polymethyl methacrylate (1.49), polystyrene (1.59). By inputting the assumed average refractive index values and thicknesses, nx, ny, and nz are calculated by KOBRA 21ADH or WR. Nz is calculated from thus obtained nx, ny, and nz by $Nz=(nx-nz)/(nx-ny)$.

<Polarizing Plate Protective Film A>

The retardation of the polarizing plate protective film A according to the invention satisfies the following conditions. The polarizing plate protective film A is preferably a cellulose acylate film, more preferably a stretched cellulose acylate film.

$$20\ nm < Re(548) < 150\ nm \quad \text{Inequality (1)}$$

$$20\ nm < Rth(548) < 150\ nm \quad \text{Inequality (2)}$$

$$0 < Rth(548)/Re(548) < 2.0 \quad \text{Inequality (3)}$$

$$0.5 < Re(446)/Re(548) < 1 \quad \text{Inequality (4)}$$

$$1.0 < Re(628)/Re(548) < 2.0 \quad \text{Inequality (5)}$$

The inequality (1) is more preferably 40 nm<Re(548)<150 nm, most preferably 60 nm<Re(548)<140 nm.

The inequality (2) is more preferably 30 nm<Rth(548) <135 nm, most preferably 30 nm<Rth(548)<70 nm.

The inequality (3) is more preferably 0.5<Rth(548)/Re (548)<1.0, most preferably 0.5<Rth(548)/Re(548)<0.75.

The inequality (4) is more preferably 0.55<Re(446)/Re (548)<0.9, most preferably 0.60<Re(446)/Re(548)<0.8.

The inequality (5) is more preferably 1.05<Re(628)/Re (548)<1.5, most preferably 1.1<Re(628)/Re(548)<1.3.

The Re(λ) and Rth(λ) are controlled in the above range, whereby the resultant polarizing plate protective film has a large effect of reducing color change due to viewing angles.

The polarizing plate protective film A may be a polymer film. The polymer film preferably has both of a positive intrinsic birefringence component and a negative intrinsic birefringence component. Specifically, the polymer film is preferably a modified polycarbonate film such as PUREACE available from Teijin Limited, a norbornene film disclosed in JP-A-2003-292639 or JP-A-2003-321535, a cellulose acylate film, etc. Among them, the cellulose acylate film is particularly preferred as the polymer film because of the low material costs and polarizing plate workability.

[Cellulose Acylate]

The cellulose acylate usable in the invention is described below.

The substitution degree of the cellulose acylate is a ratio of acylated hydroxyl groups in cellulose component units (glucoses connected by β-1,4-glycosidic bonds), each having 3 hydroxyl groups. The substitution degree (the acylation degree) can be calculated from a measured amount of a fatty acid connected per a unit mass of cellulose. The measurement is carried out in accordance with ASTM D817-91.

In the invention, the cellulose acylate is preferably a cellulose acetate having an acylation degree of 2.00 to 2.90. The acylation degree is more preferably 2.2 to 2.8. The ratio of the acylation degree at the 6-position to the total acylation degree is preferably 0.25 or more, more preferably 0.3 or more. Further, the cellulose acylate used in the invention preferably has two or more types of acyl groups.

According to another preferred embodiment of the invention, the cellulose acylate is preferably a mixed fatty acid ester that has an acylation degree of 2 to 2.9 and has an acetyl group and an acyl group having 3 to 4 carbon atoms. The acylation degree of the mixed fatty acid ester is more preferably 2.2 to 2.85, most preferably 2.4 to 2.8. The acetylation degree is preferably less than 2.5, more preferably less than 1.9.

According to a further preferred embodiment of the invention, the cellulose acylate is preferably a mixed acid ester having a fatty acyl group and a substituted or unsubstituted, aromatic acyl group. The substituted or unsubstituted, aromatic acyl group may be a group represented by the following formula (A):

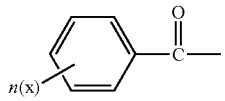

First the formula (A) is described below. In the formula (A), X represents a substituent. Examples of the substituents include halogen atoms, a cyano group, alkyl groups, alkoxy groups, aryl groups, aryloxy groups, acyl groups, carbonamide groups, sulfonamide groups, ureido groups, aralkyl groups, a nitro group, alkoxycarbonyl groups, aryloxycarbonyl groups, aralkyloxycarbonyl groups, carbamoyl groups, sulfamoyl groups, acyloxy groups, alkenyl groups, alkynyl groups, alkylsulfonyl groups, arylsulfonyl groups, alkyloxysulfonyl groups, aryloxysulfonyl groups, alkylsulfonyloxy groups, aryloxysulfonyl groups, —S—R, —NH—CO—OR, —PH—R, —P(—R)$_2$, —PH—O—R, —P(—R)(—O—R), —P(—O—R)$_2$, —PH(=O)—R—P(=O)(—R)$_2$, —PH(=O)—O—R, —P(=O)(—R)(—O—R), —P(=O)(—O—R)$_2$, —O—PH(=O)—R, —O—P(=O)(—R)$_2$—O—PH(=O)—O—R, —O—P(=O)(—R)(—O—R), —O—P(=O)(—O—R)$_2$, —NH—PH(=O)—R, —NH—P(=O)(—R)(—O—R), —NH—P(=O)(—O—R)$_2$, —SiH$_2$—R, —SiH(—R)$_2$, —Si(—R)$_3$, —O—SiH$_2$—R, —O—SiH(—R)$_2$ and —O—Si(—R)$_3$. Each R is an aliphatic group, an aromatic group, or a heterocyclic group.

In the formula (A), n represents a number of the substituent X, and is an integer of 0 to 5. The substituent number n is preferably 1 to 5, more preferably 1 to 4, further preferably 1 to 3, most preferably 1 or 2. The above substituent is preferably a halogen atom, a cyano group, an alkyl group, an alkoxy group, an aryl group, an aryloxy group, an acyl group, a carbonamide group, a sulfonamide group, or an ureido group, more preferably a halogen atom, a cyano group, an alkyl group, an alkoxy group, an aryloxy group, an acyl group, or a carbonamide group, further preferably a halogen atom, a cyano group, an alkyl group, an alkoxy group, or an aryloxy group, and most preferably a halogen atom, an alkyl group, or an alkoxy group.

The above halogen atom includes a fluorine atom, a chlorine atom, a bromine atom, and an iodine atom. The above alkyl group may have a cyclic or branched structure. The carbon number of the alkyl group is preferably 1 to 20, more preferably 1 to 12, further preferably 1 to 6, most preferably 1 to 4. Examples of the alkyl groups include methyl, ethyl, propyl, isopropyl, butyl, t-butyl, hexyl, cyclohexyl, octyl, and 2-ethylhexyl groups. The above alkoxy group may have a cyclic or branched structure. The carbon number of the alkoxy group is preferably 1 to 20, more preferably 1 to 12, further preferably 1 to 6, most preferably 1 to 4. The alkoxy group may have a further substituent of another alkoxy group. Examples of the alkoxy groups include methoxy, ethoxy, 2-methoxyethoxy, 2-methoxy-2-ethoxyethoxy, butyloxy, hexyloxy, and octyloxy groups.

The carbon number of the above aryl group is preferably 6 to 20, more preferably 6 to 12. Examples of the aryl groups include phenyl and naphthyl groups. The carbon number of the above aryloxy group is preferably 6 to 20, more preferably 6 to 12. Examples of the aryloxy groups include phenoxy and naphthoxy groups. The carbon number of the above acyl group is preferably 1 to 20, more preferably 1 to 12. Examples of the acyl groups include formyl, acetyl, and benzoyl groups. The carbon number of the above carbonamide group is preferably 1 to 20, more preferably 1 to 12. Examples of the carbonamide groups include acetoamide and benzamide groups. The carbon number of the above sulfonamide group is preferably 1 to 20, more preferably 1 to 12. Examples of the sulfonamide groups include methanesulfonamide, benzenesulfonamide, and p-toluenesulfonamide groups. The carbon number of the above ureido group preferably 1 to 20, more preferably 1 to 12. Examples of the ureido groups include an (unsubstituted) ureido group.

The carbon number of the above aralkyl group is preferably 7 to 20, more preferably 7 to 12. Examples of the aralkyl groups include benzyl, phenethyl, and naphthylmethyl groups. The carbon number of the above alkoxycarbonyl group is preferably 2 to 20, more preferably 2 to 12. Examples of the alkoxycarbonyl groups include a methoxycarbonyl group. The carbon number of the above aryloxycarbonyl group is preferably 7 to 20, more preferably 7 to 12. Examples of the aryloxycarbonyl groups include a phenoxy carbonyl group. The carbon number of the above aralkyloxycarbonyl group is preferably 8 to 20, more preferably 8 to 12. Examples of the aralkyloxycarbonyl group include a benzyloxycarbonyl group. The carbon number of the above carbamoyl group is preferably 1 to 20, more preferably 1 to 12. Examples of the carbamoyl groups include (unsubstituted) carbamoyl and N-methylcarbamoyl groups. The carbon number of the above sulfamoyl group is preferably 20 or less, more preferably 12 or less. Examples of the sulfamoyl groups include (unsubstituted) sulfamoyl and N-methylsulfamoyl groups. The carbon number of the above acyloxy group is preferably 1 to 20, more preferably 2 to 12. Examples of the acyloxy groups include acetoxy and benzoyloxy groups.

The carbon number of the above alkenyl group is preferably 2 to 20, more preferably 2 to 12. Examples of the alkenyl groups include vinyl, allyl, and isopropenyl groups. The carbon number of the above alkynyl group is preferably 2 to 20, more preferably 2 to 12. Examples of the alkynyl groups include a thienyl group. The carbon number of the above alkylsulfonyl group is preferably 1 to 20, more preferably 1 to 12. The carbon number of the above arylsulfonyl group is preferably 6 to 20, more preferably 6 to 12. The carbon number of the above alkyloxysulfonyl group is preferably 1 to 20, more preferably 1 to 12. The carbon number of the above aryloxysulfonyl group is preferably 6 to 20, more preferably 6 to 12. The carbon number of the above alkylsulfonyloxy group is preferably 1 to 20, more preferably 1 to 12. The carbon number of the above aryloxysulfonyl group is preferably 6 to 20, more preferably 6 to 12.

Next a fatty acid ester residue in the mixed acid ester of cellulose, which is an example of the cellulose acylate, is described below. In the fatty acid ester residue in the mixed acid ester of cellulose, the aliphatic acyl group preferably has 2 to 20 carbon atoms. Specific examples of the aliphatic acyl groups include acetyl, propionyl, butyryl, isobutyryl, valeryl, pivaloyl, hexanoyl, octanoyl, lauroyl, and stearoyl groups. Preferred are acetyl, propionyl, and butyryl groups, and particularly preferred is an acetyl group. In the invention, the aliphatic acyl group may further have a substituent. Examples of the substituents include the above examples of X in the formula (A).

Further, when the aromatic ring has two or more substituents, the substituents may be the same or different ones, and may be bonded together to form a condensed polycyclic compound such as naphthalene, indene, indan, phenanthrene, quinoline, isoquinoline, chromene, chroman, phthalazine, acridine, indole, or indoline.

Generally the substitution of the hydroxyl groups of cellulose by the aromatic acyl group can be carried out by a method using an aromatic carboxylic acid chloride, or a symmetric acid anhydride and a mixed acid anhydride, derived from an aromatic carboxylic acid. Particularly preferred is a method using an acid anhydride derived from an aromatic carboxylic acid described in *Journal of Applied Polymer Science*, Vol. 29, 3981-3990 (1984). As the above method, the method for producing the cellulose acylate in the invention include (i) a method comprising preparing a fatty acid mono- or di-ester of a cellulose, and introducing the aromatic acyl group represented by the formula (A) to the residual hydroxyl groups, and (ii) a method comprising directly reacting a cellulose with a mixed acid anhydride of an aliphatic carboxylic acid and an aromatic carboxylic acid. In the method of (i), the process of preparing the fatty acid mono- or di-ester of a cellulose is known, and the conditions of the latter reaction for introducing the aromatic acyl group thereto depend on the type of the aromatic acyl group. The reaction temperature is preferably 0 to 100° C., more preferably 20 to 50° C., and the reaction time is preferably 30 minutes or more, more preferably 30 to 300 minutes. Also in the method of (ii) using the mixed acid anhydride, the reaction conditions depend on the type of the mixed acid anhydride. The reaction temperature is preferably 0 to 100° C., more preferably 20 to 50° C., and the reaction time is preferably 30 to 300 minutes, more preferably 60 to 200 minutes. The above reactions may be carried out without or in a solvent, and is preferably carried out using a solvent. Dichloromethane, chloroform, dioxane, etc. can be used as the solvent.

In the case of the fatty acid monoester of cellulose, the substitution degree of the aromatic acyl group is preferably 2.0 or less, more preferably 0.1 to 2.0, based on the remaining hydroxyl groups. In the case of the fatty acid diester of cellulose (cellulose diacetate), the substitution degree of the aromatic acyl group is preferably 1.0 or less, more preferably 0.1 to 1.0, based on the remaining hydroxyl groups. Specific examples (No. 1 to 43) of the aromatic acyl groups represented by the formula (A) are illustrated below without intention of restricting the invention. As the aromatic acyl group represented by the formula (A), the following groups of No. 1, 3, 5, 6, 8, 13, 18, and 28 are preferred, and the groups of No. 1, 3, 6, and 13 are more preferred.

1

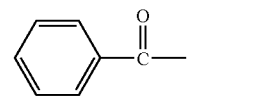

2

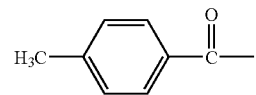

3

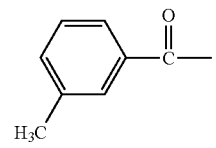

4

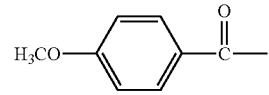

5

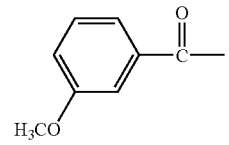

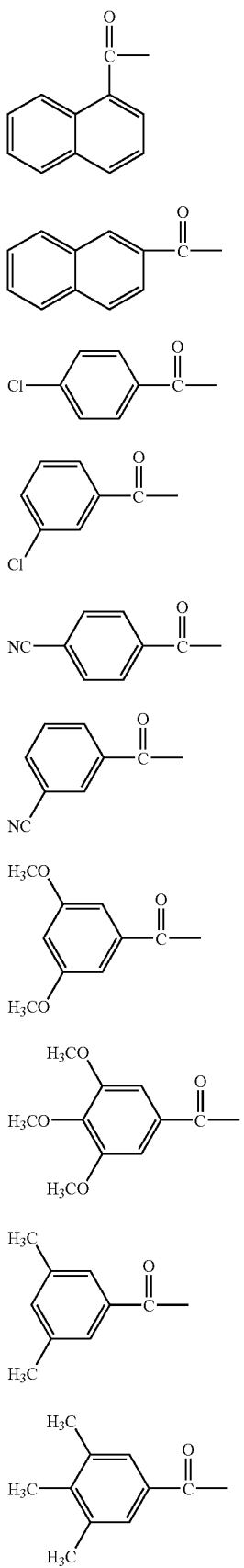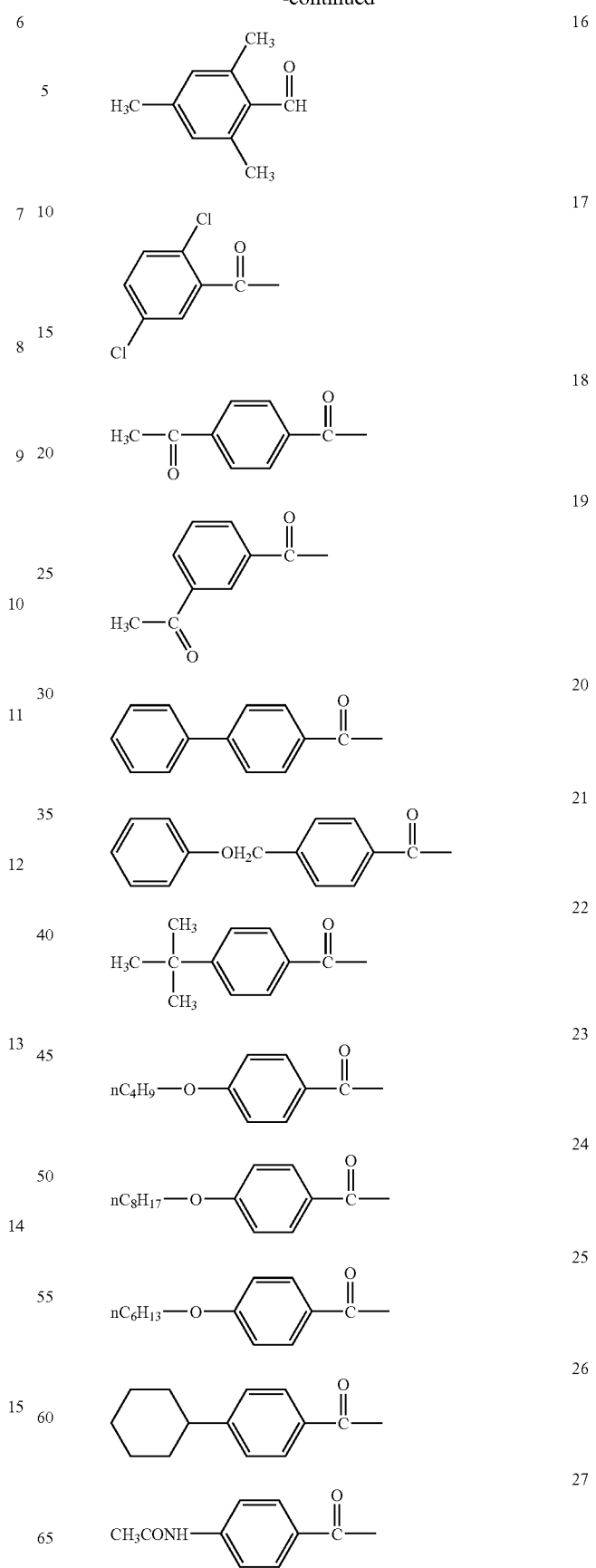

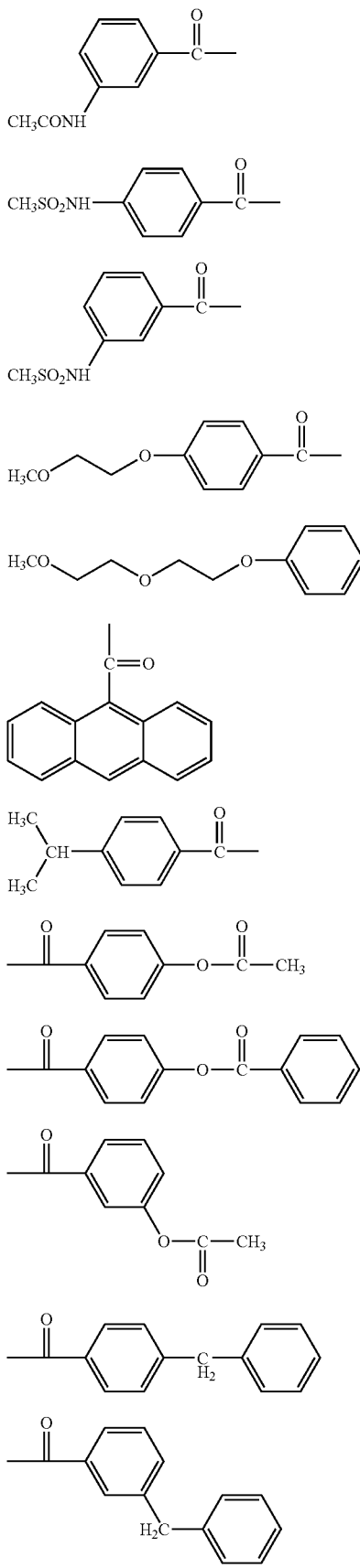
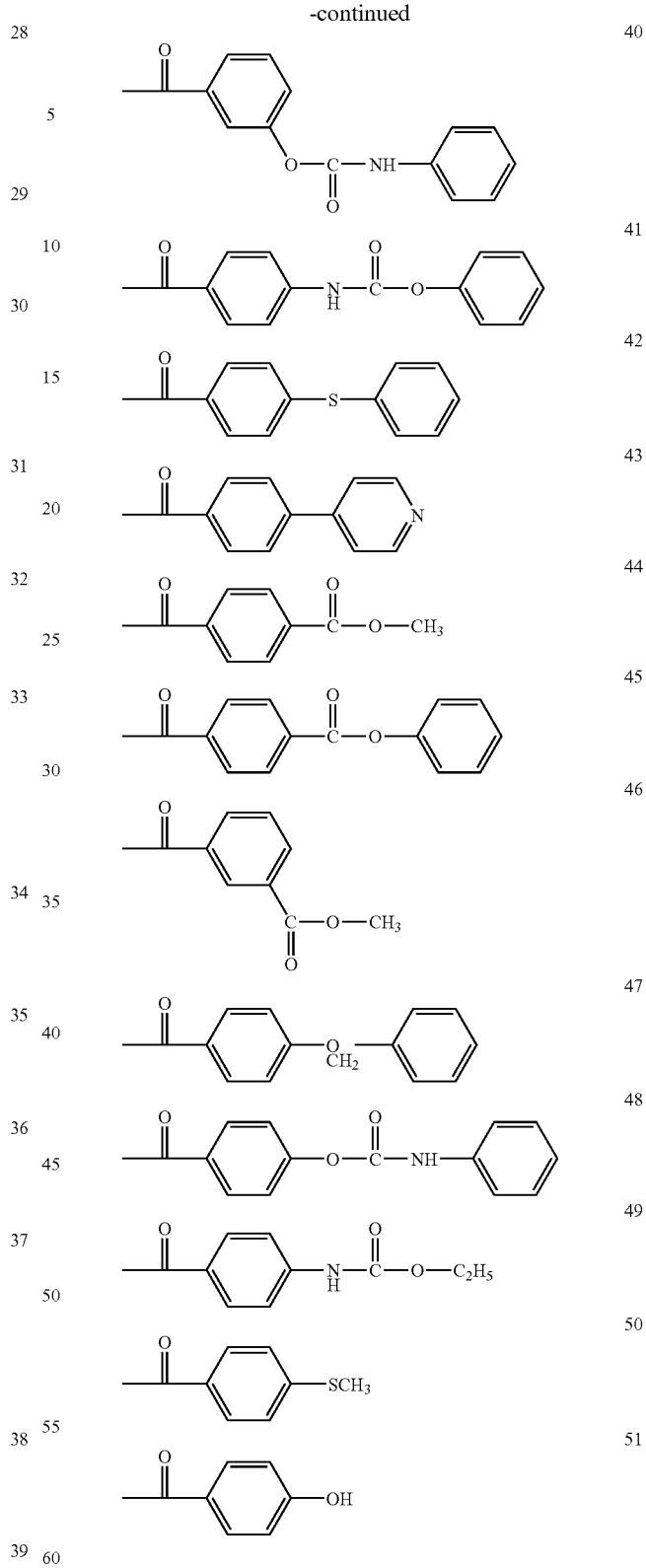
The weight average polymerization degree of the cellulose acylate used in the invention is preferably 350 to 800, more preferably 370 to 600. The number average molecular weight of the cellulose acylate used in the invention is preferably 70,000 to 230,000, more preferably 75,000 to 230,000, most preferably 78,000 to 120,000.

The cellulose acylate used in the invention may be synthesized by using an acid anhydride or acid chloride as an acylating agent. In the case of using the acylating agent of an acid anhydride, an organic acid such as acetic acid, methylene chloride, etc. is used as a reaction solvent. Further, a protic catalyst such as sulfuric acid may be used as a catalyst in the synthesis. In the case of using the acylating agent of an acid chloride, a basic compound may be used as a catalyst. In an industrially the most common synthesis method, a cellulose is esterified with a mixed organic acid component containing an organic acid (such as acetic acid, propionic acid, or butyric acid) or an anhydride thereof (such as acetic anhydride, propionic anhydride, or butyric anhydride) corresponding to the acetyl group and the other acyl group, to synthesize the cellulose ester.

In this method, a cellulose such as cotton linter or wood pulp is activated by an organic acid such as acetic acid, and then is esterified by the above organic acid mixture liquid in the presence of a sulfuric acid catalyst in most cases. The organic acid anhydride components are generally used in an amount excessive for the hydroxyl groups in the cellulose. In this esterification treatment, hydrolysis (depolymerization) of the cellulose main chain including β-1,4-glycosidic bonds proceeds in addition to the esterification. When the main chain is hydrolyzed, the polymerization degree of the cellulose ester is reduced, so that the physical properties of the resultant cellulose ester film are deteriorated. Thus, it is preferred that the reaction conditions such as the reaction temperature are determined depending on the polymerization degree and molecular weight of the resultant cellulose ester.

It is important to control the maximum temperature at 50° C. or lower in the esterification in order to obtain a cellulose ester with a high polymerization degree (a high molecular weight). The maximum temperature is preferably controlled at 35 to 50° C., more preferably controlled at 37 to 47° C. The reaction temperature is preferably 35° C. or higher, at which the esterification smoothly proceeds. Further, the reaction temperature is preferably 50° C. or lower, at which a problem such as the polymerization degree reduction of the cellulose ester is not caused.

By stopping the esterification reaction while preventing temperature rise, the polymerization degree reduction can be further suppressed to synthesize a cellulose ester with a high polymerization degree. Thus, when a reaction terminator such as water or acetic acid is added after the esterification, the excess acid anhydride not used for the esterification is hydrolyzed to generate a corresponding organic acid as a by-product. The hydrolysis generates heat vigorously to increase the temperature in the reaction apparatus. Unless the rate of adding the reaction terminator is excessively high, there is not a case where heat is rapidly generated out of the cooling ability of the reaction apparatus, the hydrolysis of the cellulose main chain rapidly proceeds, and the resultant cellulose ester has a low polymerization degree. Further, part of the catalyst is connected to the cellulose during the esterification, and most of the connected catalyst is dissociated from the cellulose in the step of adding the reaction terminator. Unless the rate of adding the reaction terminator is excessively high, a time sufficient for the dissociation of the catalyst can be obtained, and such a problem that the part of the catalyst remains connecting to the cellulose is hardly caused. The cellulose ester connected to the strong acid catalyst is poor in stability, and thereby is easily decomposed by drying heat, etc. to reduce the polymerization degree. Due to these reasons, after the esterification, the reaction terminator is added preferably over 4 minutes or more, more preferably over 4 to 30 minutes, to stop the reaction. It is preferred that the time of adding the reaction terminator is 30 minutes or less, and in this case a problem of industrial productivity reduction, etc. is not caused.

The reaction terminator is generally water or an alcohol capable of decomposing the acid anhydride. In the invention, it is preferred that a mixture of water and an organic acid is used as the reaction terminator in view of preventing generation of a triester with low solubility in organic solvents. When the esterification is carried out under the above conditions, a high molecular cellulose ester having a weight average polymerization degree of 500 or more can be easily synthesized.

[Re Generating Agent]

It is preferred that the cellulose acylate film used in the invention contains an Re generating agent, and it is particularly preferred that the polarizing plate protective film (the polarizing plate protective film A) satisfying the inequality (1) to (5) contains an Re generating agent. The Re generating agent is a compound for generating an in—plane birefringence.

The Re generating agent used in the invention is preferably a compound represented by the following formula (I), more preferably a compound represented by the following formula (II).

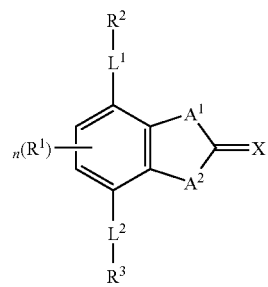

Formula (I)

In the formula (I), $L^1$ and $L^2$ independently represent a single bond or a divalent linking group. $A^1$ and $A^2$ independently represent one selected from the group consisting of —O—, —NR— (in which R represents a hydrogen atom or a substituent), —S—, and —CO—. $R^1$, $R^2$, and $R^3$ independently represent a substituent. X represents a nonmetal atom of Groups 14 to 16, and a hydrogen atom or a substituent may be connected to X. n represents an integer of 0 to 2.

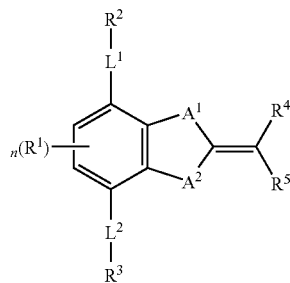

Formula (II)

In the formula (II), $L^1$ and $L^2$ independently represent a single bond or a divalent linking group. $A^1$ and $A^2$ independently represent one selected from the group consisting of —O—, —NR— (in which R represents a hydrogen atom or a substituent), —S—, and CO—. $R^1$, $R^2$, $R^3$, $R^4$, and $R^5$ independently represent a substituent. n represents an integer of 0 to 2.

In the formulae (I) and (II), preferred examples of the divalent linking groups of $L^1$ and $L^2$ include the following groups:

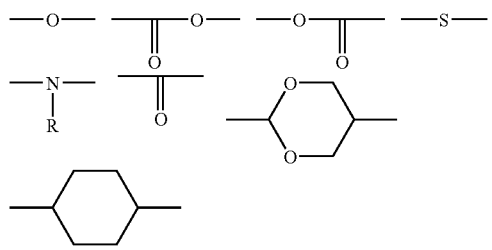

More preferred divalent linking groups are —O—, —COO—, and —OCO—.

In the formulae (I) and (II), $R^1$ is a substituent. When the compound has a plurality of $R^1$'s, they may be the same or different substituents, and may form a ring.

Examples of the substituents include halogen atoms such as a fluorine atom, chlorine atom, bromine atom, and iodine atom; alkyl groups, the carbon number thereof being preferably 1 to 30, such as a methyl group, ethyl group, n-propyl group, isopropyl group, t-butyl group, n-octyl group, and 2-ethylhexyl group; cycloalkyl groups, preferably substituted or unsubstituted cycloalkyl groups having a carbon number of 3 to 30, such as a cyclohexyl group, cyclopentyl group, 4-n-dodecylcyclohexyl group; bicycloalkyl groups, preferably substituted or unsubstituted bicycloalkyl groups having a carbon number of 5 to 30, i.e. monovalent groups provided by removing one hydrogen atom from bicycloalkanes having a carbon number of 5 to 30, such as a bicyclo[1,2,2]heptane-2-yl group and bicyclo[2,2,2]octane-3-yl group; alkenyl groups, preferably substituted or unsubstituted alkenyl groups having a carbon number of 2 to 30, such as a vinyl group and allyl group; cycloalkenyl groups, preferably substituted or unsubstituted cycloalkenyl groups having a carbon number of 3 to 30, i.e. monovalent groups provided by removing one hydrogen atom from cycloalkenes having a carbon number of 3 to 30, such as a 2-cyclopentene-1-yl group and 2-cyclohexene-1-yl; substituted or unsubstituted bicycloalkenyl groups, preferably substituted or unsubstituted bicycloalkenyl groups having a carbon number of 5 to 30, i.e. monovalent groups provided by removing one hydrogen atom from bicycloalkenes having one double bond, such as a bicyclo[2,2,1]hepto-2-ene-1-yl group and bicyclo[2,2,2]octo-2-ene-4-yl; alkynyl groups, preferably substituted or unsubstituted alkynyl groups having a carbon number of 2 to 30, such as an ethynyl group and propargyl group; aryl groups, preferably substituted or unsubstituted aryl groups having a carbon number of 6 to 30, such as a phenyl group, p-tolyl group, and naphtyl group; heterocyclic groups, preferably monovalent groups provided by removing one hydrogen atom from 5 or 6-membered, substituted or unsubstituted, aromatic or nonaromatic heterocycle compounds, more preferably 5 or 6-membered, aromatic heterocyclic groups having a carbon number of 3 to 30, such as a 2-furyl group, 2-thienyl group, 2-pyrimidinyl group, and 2-benzothiazolyl group; a cyano group; a hydroxyl group; a nitro group; a carboxyl group; alkoxy groups, preferably substituted or unsubstituted alkoxy groups having a carbon number of 1 to 30, such as a methoxy group, ethoxy group, isopropoxy group, t-butoxy group, n-octyloxy group, and 2-methoxyethoxy group; aryloxy groups, preferably substituted or unsubstituted aryloxy groups having a carbon number of 6 to 30, such as a phenoxy group, 2-methylphenoxy group, 4-tert-butylphenoxy group, 3-nitrophenoxy group, and 2-tetradecanoylaminophenoxy group; silyloxy groups, the carbon number thereof being preferably 3 to 20, such as a trimethylsilyloxy group and tert-butyldimethylsilyloxy group; heterocyclyloxy groups, preferably substituted or unsubstituted heterocyclyloxy groups having a carbon number of 2 to 30, such as a 1-phenyltetrazole-5-oxy group and 2-tetrahydropyranyloxy group; acyloxy groups, preferably a formyloxy group, substituted or unsubstituted alkylcarbonyloxy groups having a carbon number of 2 to 30, and substituted or unsubstituted arylcarbonyloxy groups having a carbon number of 6 to 30, such as a formyloxy group, acetyloxy group, pivaloyloxy group, stearoyloxy group, benzoyloxy group, and p-methoxyphenylcarbonyloxy group; carbamoyloxy groups, preferably substituted or unsubstituted carbamoyloxy groups having a carbon number of 1 to 30, such as an N,N-dimethylcarbamoyloxy group, N,N-diethylcarbamoyloxy group, morpholinocarbonyloxy group, N,N-di-n-octylaminocarbonyloxy group, and N-n-octylcarbamoyloxy group; alkoxycarbonyloxy groups, preferably substituted or unsubstituted alkoxycarbonyloxy groups having a carbon number of 2 to 30, such as a methoxycarbonyloxy group, ethoxycarbonyloxy group, tert-butoxycarbonyloxy group, and n-octylcarbonyloxy group; aryloxycarbonyloxy groups, preferably substituted or unsubstituted aryloxycarbonyloxy groups having a carbon number of 7 to 30, such as a phenoxycarbonyloxy group, p-methoxyphenoxycarbonyloxy group, and p-n-hexadecyloxyphenoxycarbonyloxy group; amino groups, preferably an amino group, substituted or unsubstituted alkylamino groups having a carbon number of 1 to 30, and substituted or unsubstituted anilino groups having a carbon number of 6 to 30, such as an amino group, methylamino group, dimethylamino group, anilino group, N-methylamino group, and diphenylamino group; acylamino groups, preferably a formylamino group, substituted or unsubstituted alkylcarbonylamino groups having a carbon number of 1 to 30, and substituted or unsubstituted arylcarbonylamino groups having a carbon number of 6 to 30, such as a formylamino group, acetylamino group, pivaloylamino group, lauroylamino group, and benzoylamino group; aminocarbonylamino groups, preferably substituted or unsubstituted aminocarbonylamino groups having a carbon number of 1 to 30, such as a carbamoylamino group, N,N-dimethylaminocarbonylamino group, N,N-diethylaminocarbonylamino group, and morpholinocarbonylamino group; alkoxycarbonylamino groups, preferably substituted or unsubstituted alkoxycarbonylamino groups having a carbon number of 2 to 30, such as a methoxycarbonylamino group, ethoxycarbonylamino group, tert-butoxycarbonylamino group, n-octadecyloxycarbonylamino group, and N-methyl-methoxycarbonylamino group; aryloxycarbonylamino groups, preferably substituted or unsubstituted aryloxycarbonylamino groups having a carbon number of 7 to 30, such as a phenoxycarbonylamino group, p-chlorophenoxycarbonylamino group, and m-n-octyloxyphenoxycarbonylamino group; sulfamoylamino groups, preferably substituted or unsubstituted sulfamoylamino groups having a carbon number of 0 to 30, such as a sulfamoylamino group, N,N-dimethylaminosulfonylamino group, and N-n-octylaminosulfonylamino group; alkyl- or aryl-sulfonylamino groups, preferably substituted or unsubstituted alkylsulfonylamino groups having a carbon number of 1 to 30 and substituted or unsubstituted arylsulfonylamino groups having a carbon number of 6 to 30, such as a methylsulfonylamino group, butylsulfonylamino group, phenylsulfonylamino group, 2,3,5-trichlorophenylsulfonylamino group, and p-methylphenylsulfonylamino group; a mercapto group; alkylthio groups, preferably substituted or unsubstituted alkylthio groups having a carbon number of 1 to 30, such as a methylthio group, ethylthio group, and n-hexadecylthio group; arylthio groups, preferably substituted or unsubstituted arylthio groups having a carbon number of 6 to 30, such as a phenylthio group, p-chlorophenylthio group, and m-methoxyphenylthio group; heterocyclylthio groups, preferably substituted or unsubstituted heterocyclylthio group having a carbon number of 2 to 30, such as a 2-benzothiazolylthio group and 1-phenyltetrazole-5-yl thio group; sulfamoyl groups, preferably substituted or unsubstituted sulfamoyl groups having a carbon number of 0 to 30, such as an N-ethylsulfamoyl group, N-(3-dodecyloxypropyl)sulfamoyl group, N,N-dimethylsulfamoyl group, N-acetylsulfamoyl group, N-benzoylsulfamoyl group, and N-(N'-phenylcarbamoyl)sulfamoyl group; a sulfo group; alkyl- or aryl-sulfinyl groups, preferably substituted or unsubstituted alkylsulfinyl groups having a carbon number of 1 to 30 and substituted or unsubstituted arylsulfinyl groups having a carbon number of 6 to 30, such as a methylsulfinyl group, ethylsulfinyl group, phenylsulfinyl group, and p-methylphenylsulfinyl group; alkyl- or aryl-sulfonyl groups, preferably substituted or unsubstituted alkylsulfonyl groups having a carbon number of 1 to 30 and substituted or unsubstituted arylsulfonyl groups having a carbon number of 6 to 30, such as a methylsulfonyl group, ethylsulfonyl group, phenylsulfonyl group, and p-methylphenylsulfonyl group; acyl groups, preferably a formyl group, substituted or unsubstituted alkylcarbonyl groups having a carbon number of 2 to 30, substituted or unsubstituted arylcarbonyl groups having a carbon number of 7 to 30, such as an acetyl group and pivaloylbenzoyl group; aryloxycarbonyl groups, preferably substituted or unsubstituted aryloxycarbonyl groups having a carbon number of 7 to 30, such as a phenoxycarbonyl group, o-chlorophenoxycarbonyl group, m-nitrophenoxycarbonyl group, and p-tert-butylphenoxycarbonyl group; alkoxycarbonyl groups, preferably substituted or unsubstituted alkoxycarbonyl groups having a carbon number of 2 to 30, such as a methoxycarbonyl group, ethoxycarbonyl group, tert-butoxycarbonyl group, and n-octadecyloxycarbonyl group; carbamoyl groups, preferably substituted or unsubstituted carbamoyl groups having a carbon number of 1 to 30, such as a carbamoyl group, N-methylcarbamoyl group, N,N-dimethylcarbamoyl group, N,N-di-n-octylcarbamoyl group, and N-(methylsulfonyl)carbamoyl group; aryl- and heterocyclyl-azo groups, preferably substituted or unsubstituted arylazo groups having a carbon number of 6 to 30 and substituted or unsubstituted heterocyclylazo groups having a carbon number of 3 to 30, such as a phenylazo group, p-chlorophenylazo group, and 5-ethylthio-1,3,4-thiadiazole-2-yl azo group; imide groups, preferably an N-succinimido group and N-phthalimido group; phosphino groups, preferably substituted or unsubstituted phosphino groups having a carbon number of 2 to 30, such as a dimethylphosphino group, diphenylphosphino group, and methylphenoxyphosphino group; phosphinyl groups, preferably substituted or unsubstituted phosphinyl groups having a carbon number of 2 to 30, such as a phosphinyl group, dioctyloxyphosphinyl group, and diethoxyphosphinyl group; phosphinyloxy groups, preferably substituted or unsubstituted phosphinyloxy groups having a carbon number of 2 to 30, such as a diphenoxyphosphinyloxy group and dioctyloxyphosphinyloxy group; phosphinylamino groups, preferably substituted or unsubstituted phosphinylamino groups having a carbon number of 2 to 30, such as a dimethoxyphosphinylamino group and dimethylaminophosphinylamino group; and silyl groups, preferably substituted or unsubstituted silyl groups having a carbon number of 3 to 30, such as a trimethylsilyl group, tert-butyldimethylsilyl group, and phenyldimethylsilyl group.

In the above substituents having a hydrogen atom, the hydrogen atom may be removed and further replaced by the above substituent. Examples of such functional groups include alkylcarbonylaminosulfonyl groups, arylcarbonylaminosulfonyl groups, alkylsulfonylaminocarbonyl groups, and arylsulfonylaminocarbonyl groups, and specific examples thereof include a methylsulfonylaminocarbonyl group, p-methylphenylsulfonylaminocarbonyl group, acetylaminosulfonyl group, and benzoylaminosulfonyl group.

$R^1$ is preferably a halogen atom, alkyl group, alkenyl group, aryl group, heterocyclic group, hydroxyl group, carboxyl group, alkoxy group, aryloxy group, acyloxy group, cyano group, or amino group, more preferably a halogen atom, alkyl group, cyano group, or alkoxy group.

$R^2$ and $R^3$ independently represent a substituent, and examples thereof include those of $R^1$. Each of $R^2$ and $R^3$ is preferably a substituted or unsubstituted benzene ring, or a substituted or unsubstituted cyclohexane ring, more preferably a benzene ring having a substituent, or a cyclohexane ring having a substituent, further preferably a benzene ring having a substituent at the 4 position, or a cyclohexane ring having a substituent at the 4 position.

$R^4$ and $R^5$ independently represent a substituent, and examples thereof include those of $R^1$. Each of $R^4$ and $R^5$ is preferably an electron-withdrawing substituent having a Hammett's substituent constant $\sigma_P$ of more than 0, and more preferably a substituent having a $\sigma_P$ of 0 to 1.5. Examples of such substituents include a trifluoromethyl group, a cyano group, a carbonyl group, and a nitro group. $R^4$ and $R^5$ may be bonded to form a ring.

The Hammett's substituent constants $\sigma_P$ and $\sigma_m$ are described in detail in Naoki Inamoto, *Hamettosoku, Kozo to Hannosei*, Maruzen, Co., Ltd.; The Chemical Society of Japan, *Shin Jikken Kagaku Koza* 14, *Yuki Kagobutsu no Gosei to Han-no V*, Page 2605, Maruzen, Co., Ltd.; Tadao Nakaya, *Riron Yuki Kagaku Kaisetsu*, Page 217, Tokyo Kagaku Dozin, Co., Ltd.; *Chemical Reviews*, Vol. 91, Page 165-195 (1991); etc.

$A^1$ and $A^2$ independently represent one selected from the group consisting of —O—, —NR— (in which R represents a hydrogen atom or a substituent), —S—, and CO—. Each of $A^1$ and $A^2$ is preferably —O—, —NR— (in which R is a substituent, the examples thereof including those of $R^1$), or —S—.

X represents a nonmetal atom of Groups 14 to 16, and a hydrogen atom or a substituent may be connected to X. X is preferably =O, =S, =NR, or =C(R)R, wherein R represents a substituent, examples thereof including those of $R^1$.

n is an integer of 0 to 2, preferably 0 or 1.

Specific examples of the compounds represented by the formulae (I) and (II) are illustrated below without intention of restricting the scope of the invention. The following compounds are represented as Example Compound (X), in which X is a number in parentheses, unless otherwise provided.

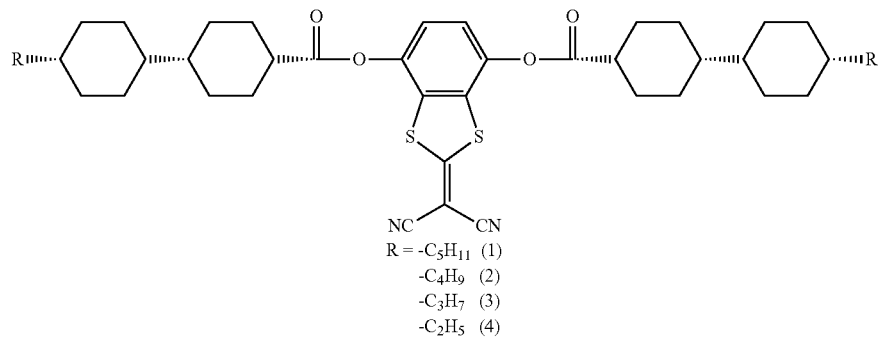
R = -C$_5$H$_{11}$ (1)
-C$_4$H$_9$ (2)
-C$_3$H$_7$ (3)
-C$_2$H$_5$ (4)
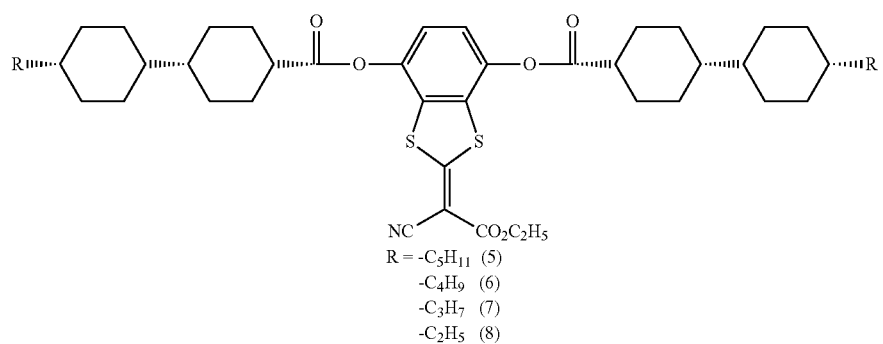
R = -C$_5$H$_{11}$ (5)
-C$_4$H$_9$ (6)
-C$_3$H$_7$ (7)
-C$_2$H$_5$ (8)
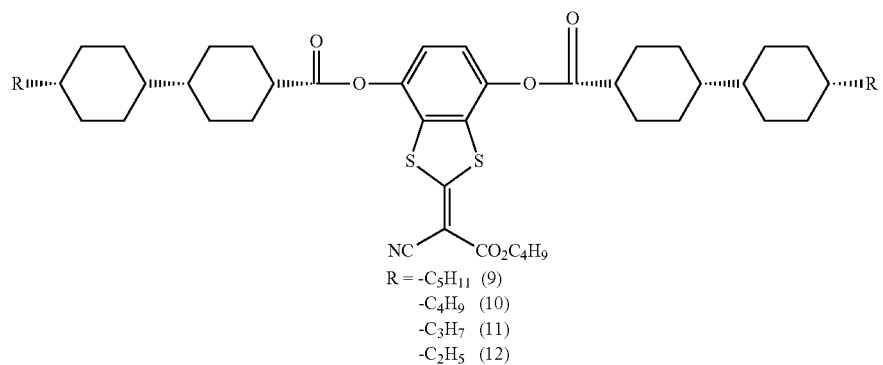
R = -C$_5$H$_{11}$ (9)
-C$_4$H$_9$ (10)
-C$_3$H$_7$ (11)
-C$_2$H$_5$ (12)
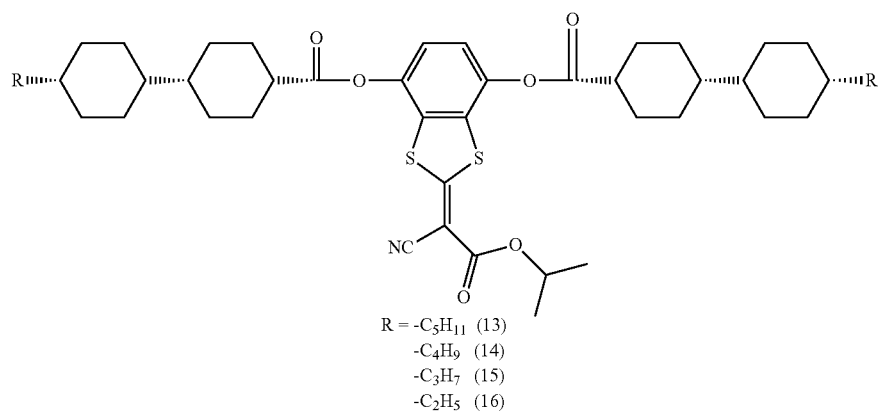
R = -C$_5$H$_{11}$ (13)
-C$_4$H$_9$ (14)
-C$_3$H$_7$ (15)
-C$_2$H$_5$ (16)

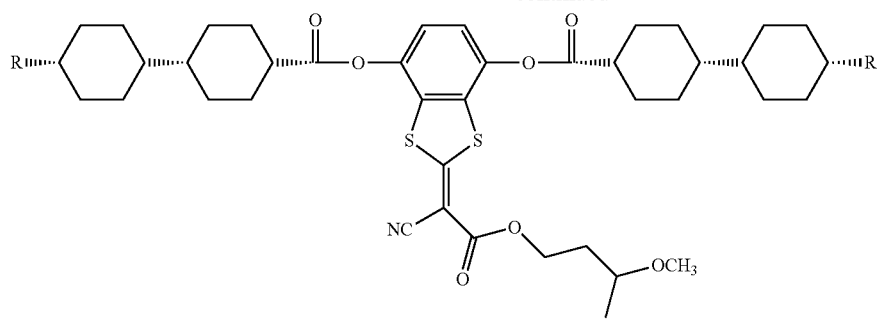
R = -C$_5$H$_{11}$ (17)
-C$_4$H$_9$ (18)
-C$_3$H$_7$ (19)
-C$_2$H$_5$ (20)
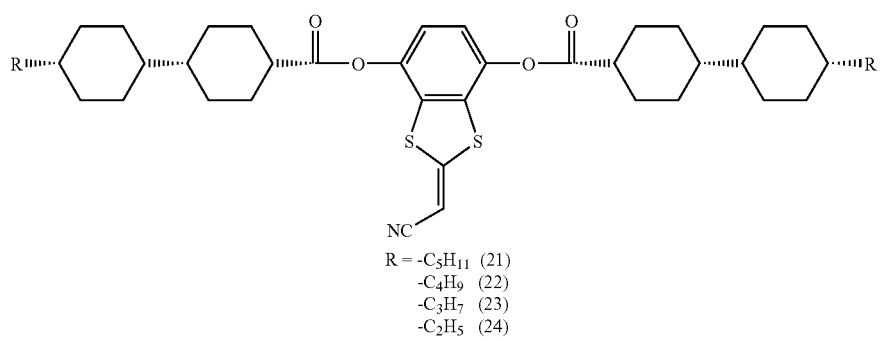
R = -C$_5$H$_{11}$ (21)
-C$_4$H$_9$ (22)
-C$_3$H$_7$ (23)
-C$_2$H$_5$ (24)
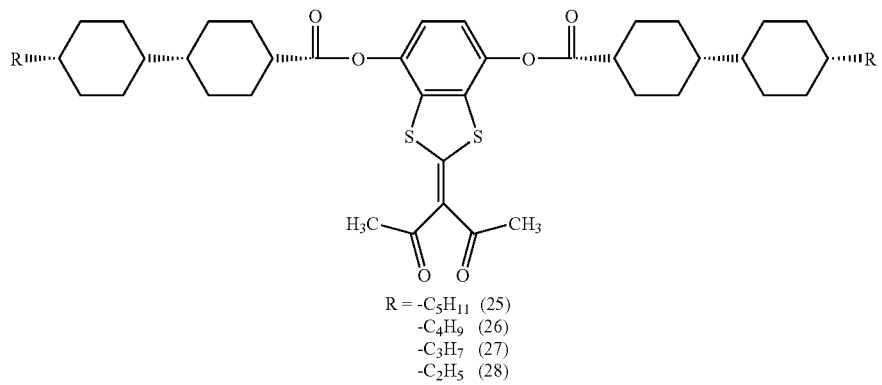
R = -C$_5$H$_{11}$ (25)
-C$_4$H$_9$ (26)
-C$_3$H$_7$ (27)
-C$_2$H$_5$ (28)
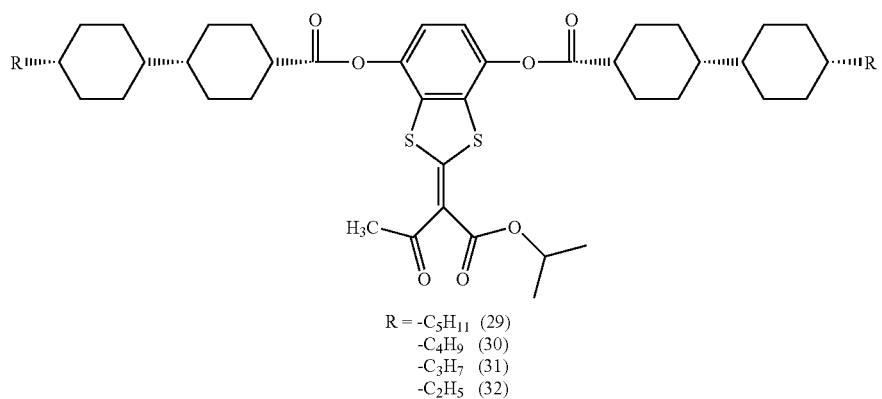
R = -C$_5$H$_{11}$ (29)
-C$_4$H$_9$ (30)
-C$_3$H$_7$ (31)
-C$_2$H$_5$ (32)

-continued
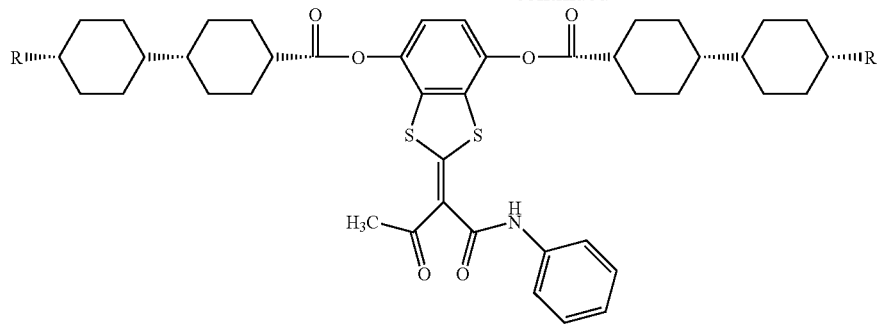
R = -C$_5$H$_{11}$ (33)
-C$_4$H$_9$ (34)
-C$_3$H$_7$ (35)
-C$_2$H$_5$ (36)
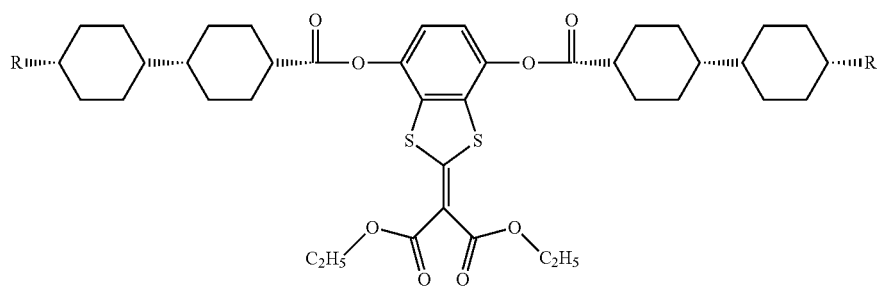
R = -C$_5$H$_{11}$ (37)
-C$_4$H$_9$ (38)
-C$_3$H$_7$ (39)
-C$_2$H$_5$ (40)
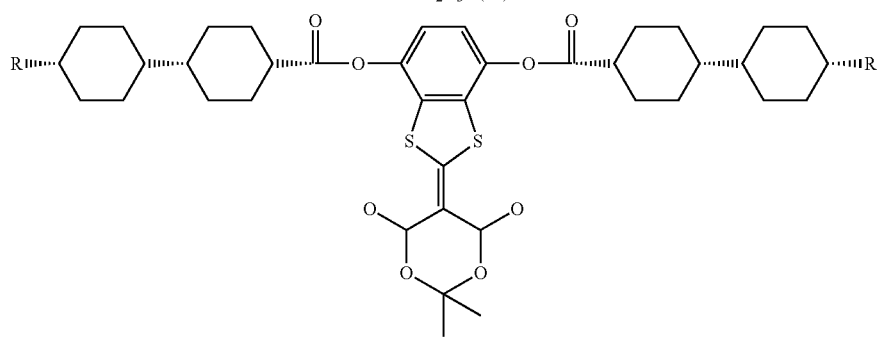
R = -C$_5$H$_{11}$ (41)
-C$_4$H$_9$ (42)
-C$_3$H$_7$ (43)
-C$_2$H$_5$ (44)
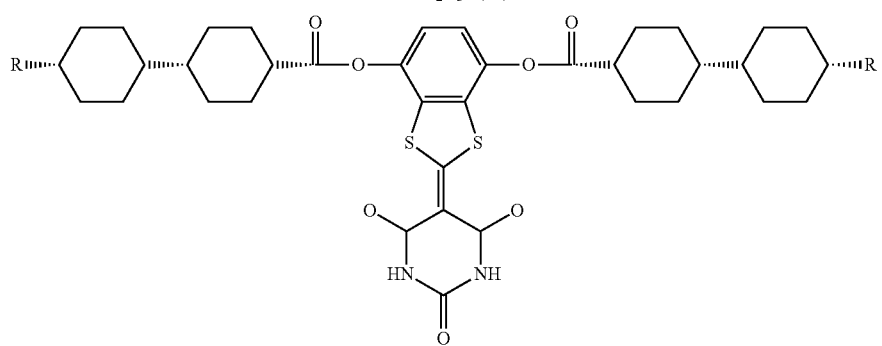
R = -C$_5$H$_{11}$ (45)
-C$_4$H$_9$ (46)
-C$_3$H$_7$ (47)
-C$_2$H$_5$ (48)

-continued
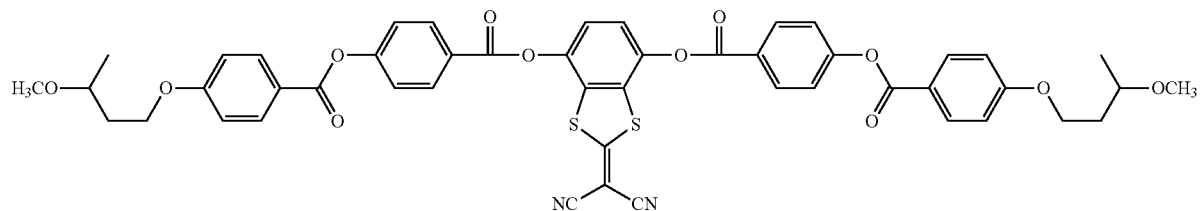
(49)
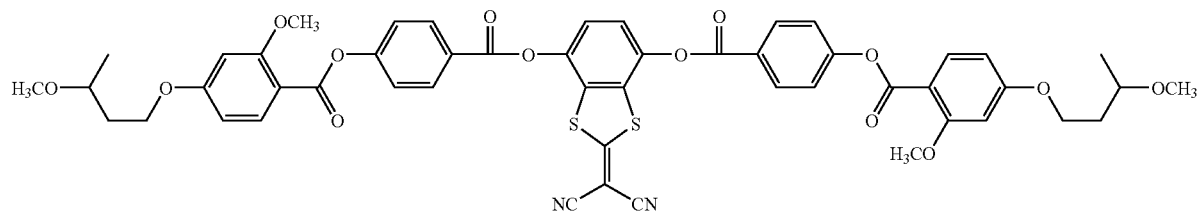
(50)
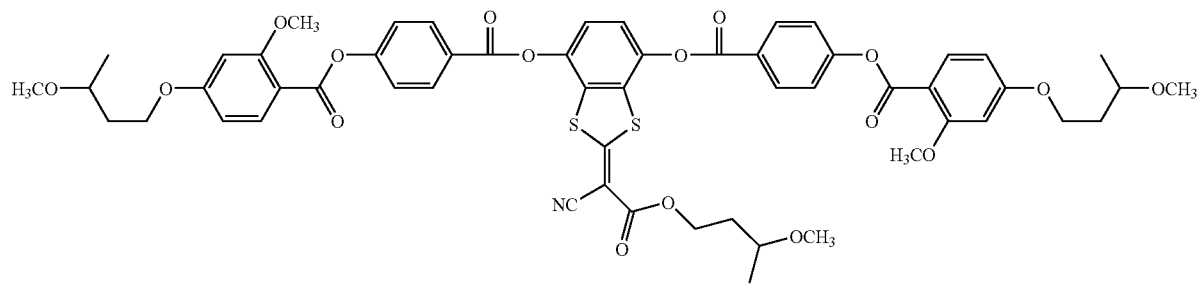
(51)
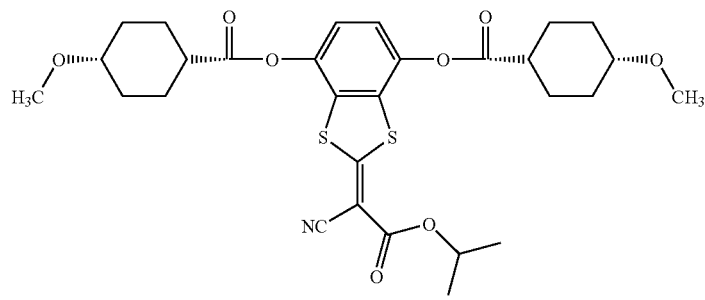
(52)
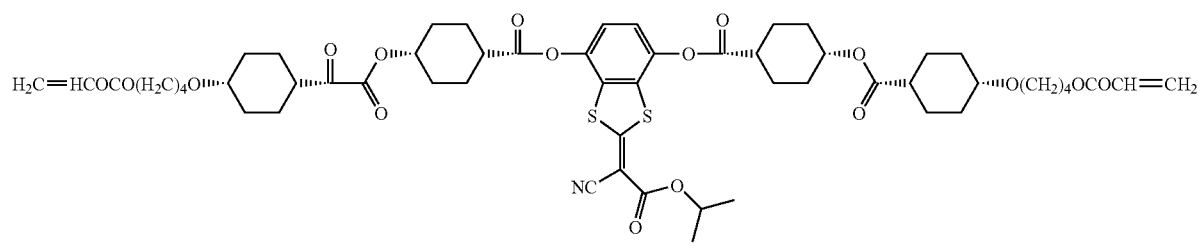
(53)
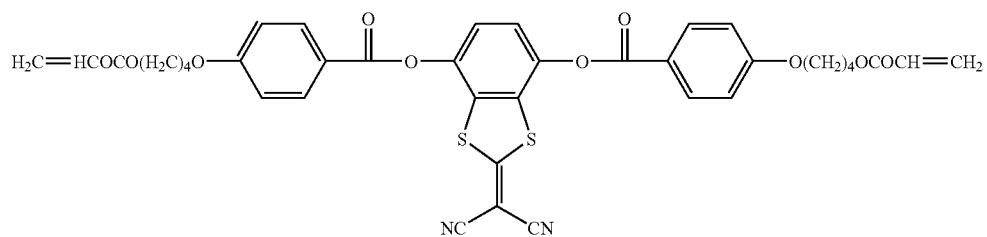
(54)

-continued
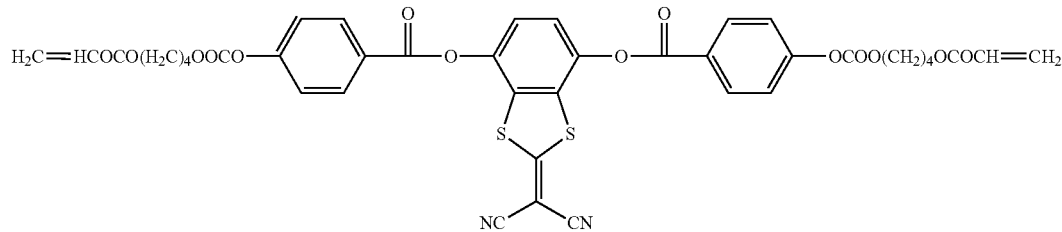
(55)
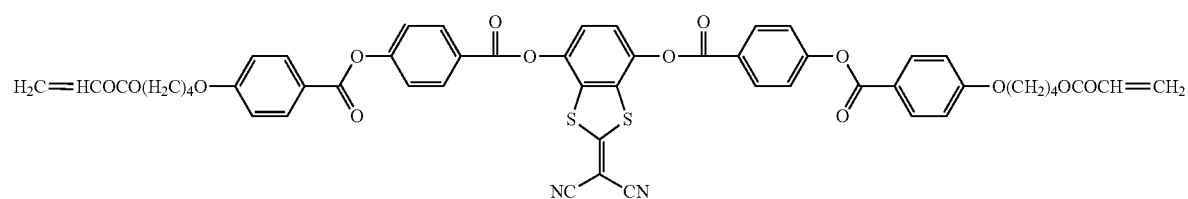
(56)
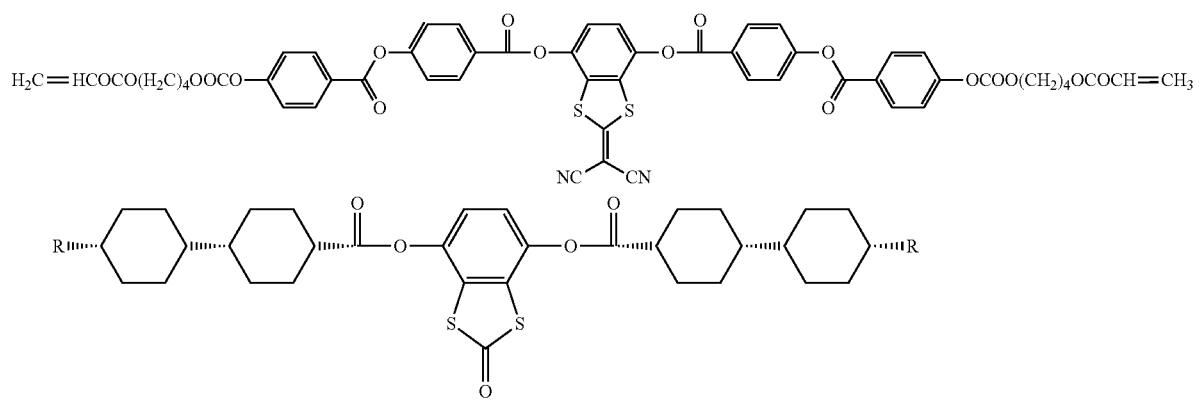
(57)
R = -C$_5$H$_{11}$ (58)
-C$_4$H$_9$ (59)
-C$_3$H$_7$ (60)
-C$_2$H$_5$ (61)
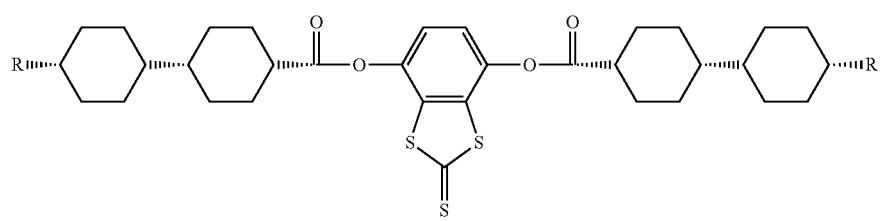
R = -C$_5$H$_{11}$ (62)
-C$_4$H$_9$ (63)
-C$_3$H$_7$ (64)
-C$_2$H$_5$ (65)
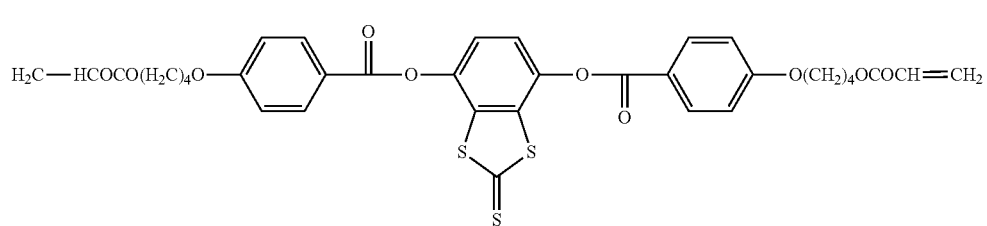
(66)

-continued
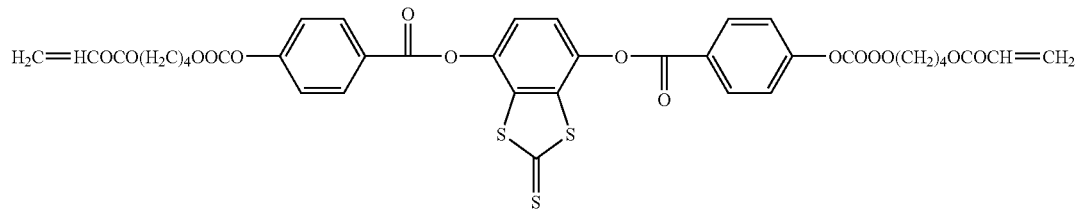
(67)
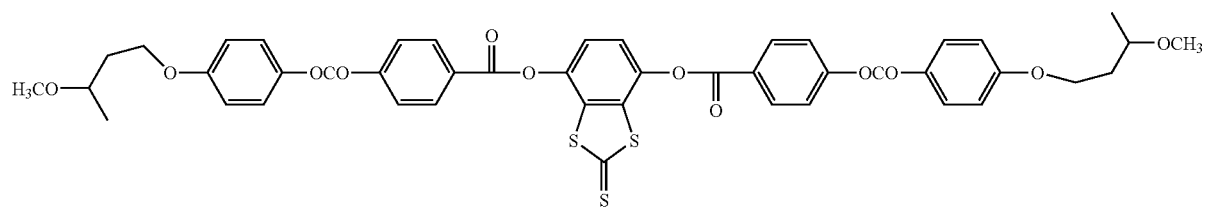
(68)
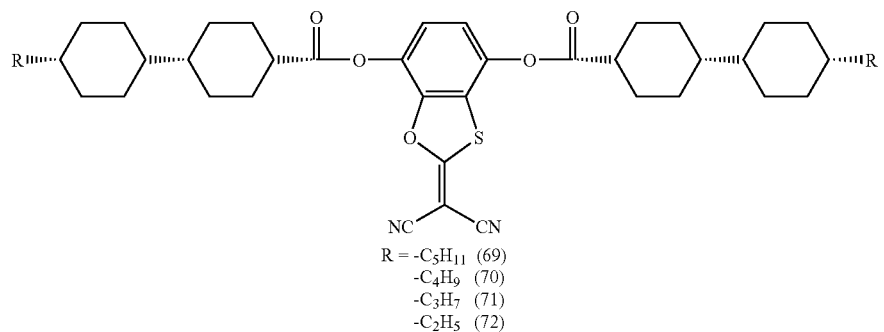
R = -C₅H₁₁ (69)
-C₄H₉ (70)
-C₃H₇ (71)
-C₂H₅ (72)
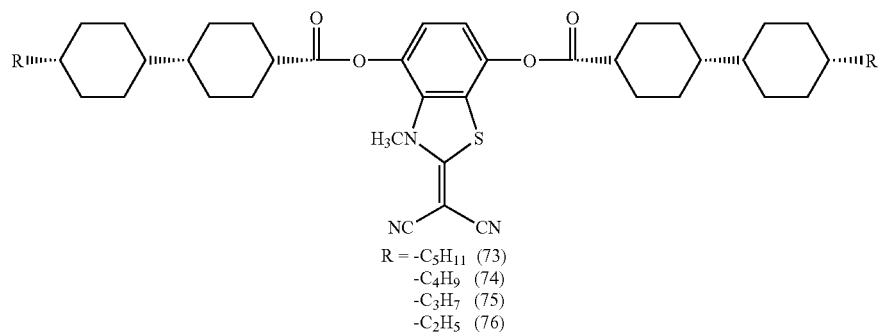
R = -C₅H₁₁ (73)
-C₄H₉ (74)
-C₃H₇ (75)
-C₂H₅ (76)
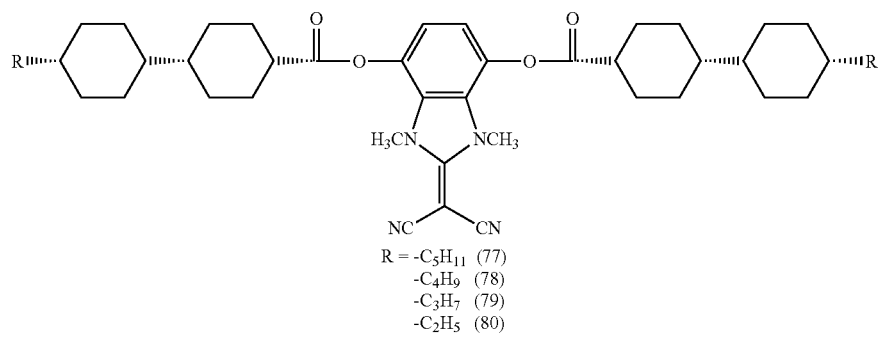
R = -C₅H₁₁ (77)
-C₄H₉ (78)
-C₃H₇ (79)
-C₂H₅ (80)

-continued
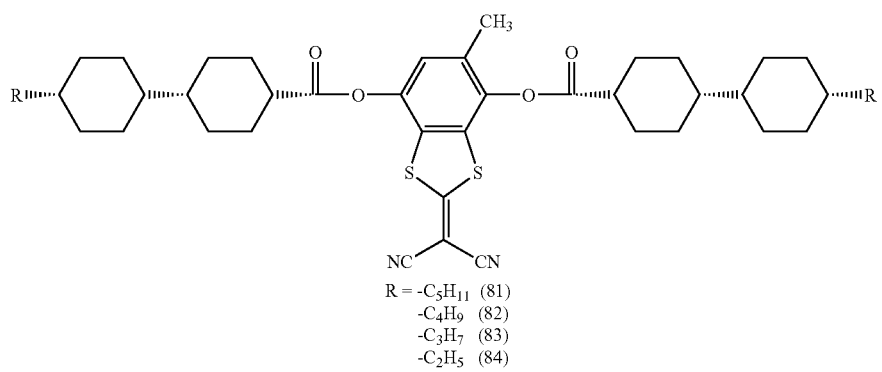
R = -C₅H₁₁ (81)
-C₄H₉ (82)
-C₃H₇ (83)
-C₂H₅ (84)
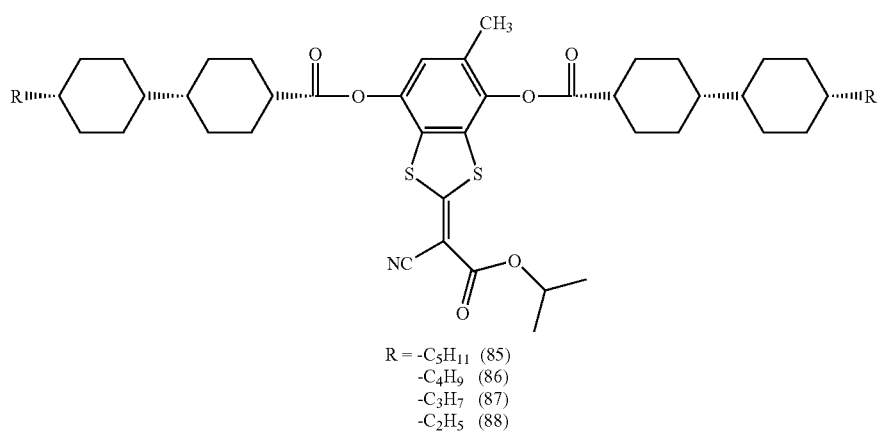
R = -C₅H₁₁ (85)
-C₄H₉ (86)
-C₃H₇ (87)
-C₂H₅ (88)
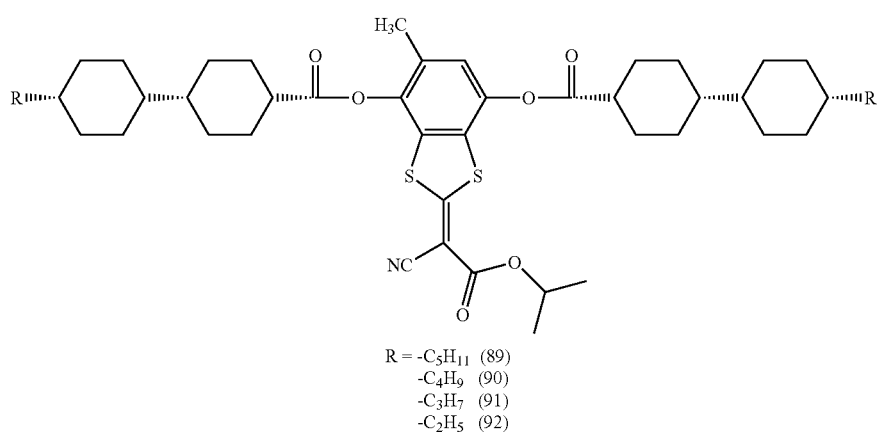
R = -C₅H₁₁ (89)
-C₄H₉ (90)
-C₃H₇ (91)
-C₂H₅ (92)
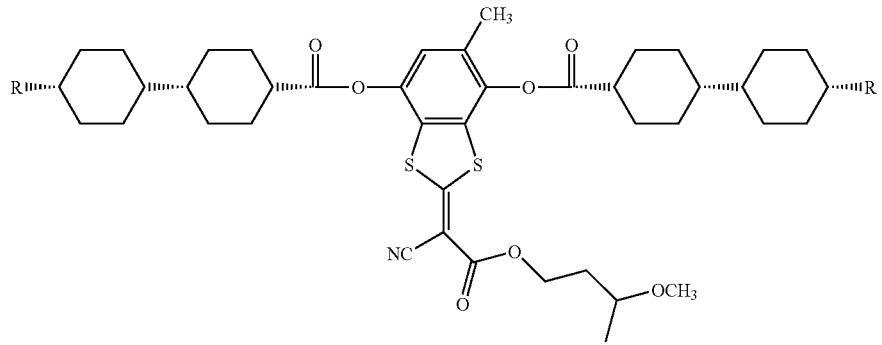
R = -C₅H₁₁ (93)
-C₄H₉ (94)
-C₃H₇ (95)
-C₂H₅ (96)

-continued
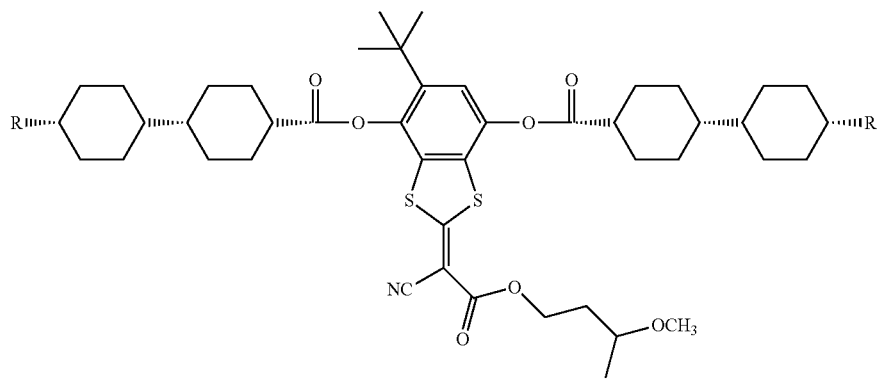
R = -C$_5$H$_{11}$ (97)
-C$_4$H$_9$ (98)
-C$_3$H$_7$ (99)
-C$_2$H$_5$ (100)
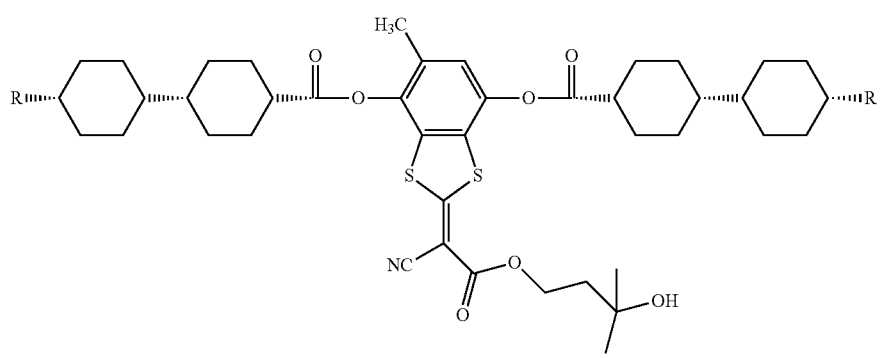
R = -C$_5$H$_{11}$ (101)
-C$_4$H$_9$ (102)
-C$_3$H$_7$ (103)
-C$_2$H$_5$ (104)
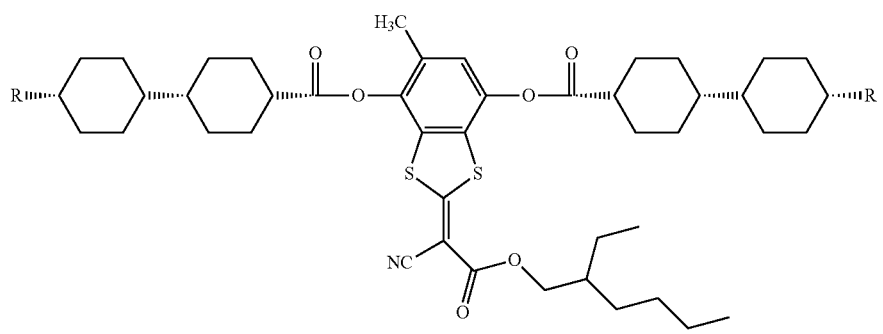
R = -C$_5$H$_{11}$ (105)
-C$_4$H$_9$ (106)
-C$_3$H$_7$ (107)
-C$_2$H$_5$ (108)

The compound represented by the formula (I) or (II) can be synthesized in reference to a known method. For example, Example Compound (1) can be synthesized according to the following scheme.

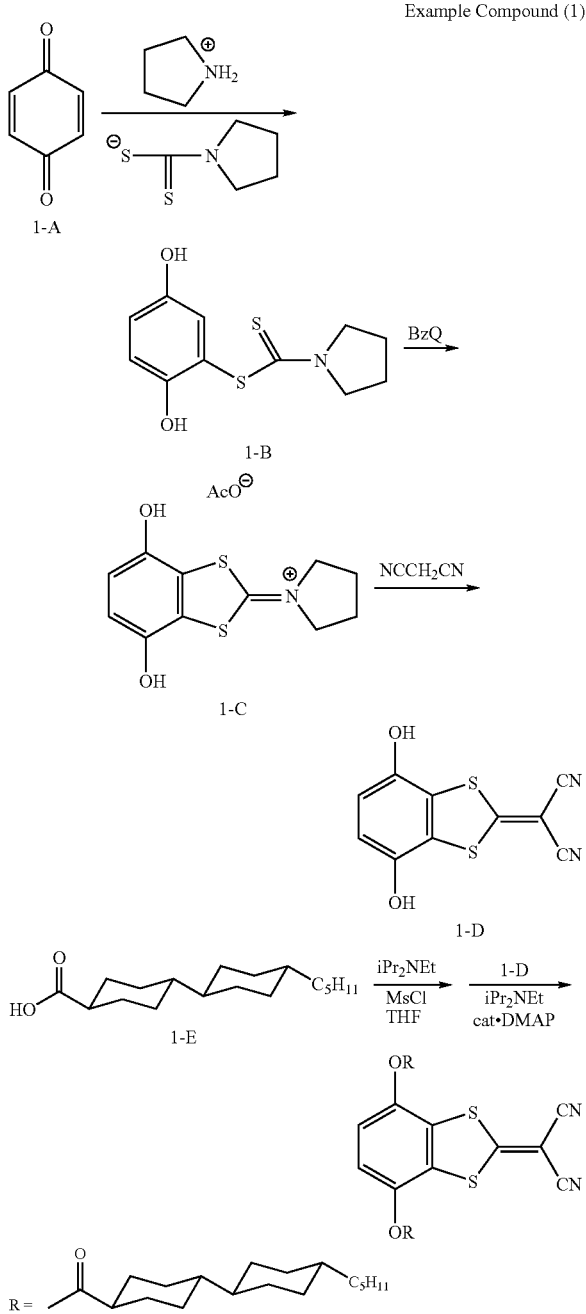

Example Compound (1)

In the above scheme, the compounds (1-A) to (1-D) can be synthesized in reference to *Journal of Chemical Crystallography,* 1997, 27 (9), p. 515-526.

As shown in the scheme, Example Compound (1) can be obtained such that methanesulfonyl chloride is added to a tetrahydrofuran solution of the compound (1-E), N,N-diisopropylethylamine is added thereto dropwise and stirred, N,N-diisopropylethylamine is added to the resultant mixture, a tetrahydrofuran solution of the compound (1-D) is added thereto dropwise, and then a tetrahydrofuran solution of N,N-dimethylaminopyridine (DMAP) is added to the mixture dropwise.

Further, a rod-like aromatic compound described in JP-A-2004-50516, Page 11 to 14 may be used as the Re generating agent in the invention.

The Re generating agent may be used singly, and two or more Re generating agents may be used in combination. The mass ratio of the Re generating agent to the 100 parts by mass of cellulose acylate is preferably 0.1 to 20% by mass, more preferably 0.5 to 10% by mass.

The Re generating agent may be dissolved in an organic solvent such as an alcohol, methylene chloride, or dioxolane and then added to a cellulose acylate solution (a dope), or alternatively may be added directly to a dope composition.

[Production Of Cellulose Acylate Film]

In the invention, the cellulose acylate film may be produced by a solution casting method. In the solution casting method, a solution (a dope) prepared by dissolving the cellulose acylate in an organic solvent to produce the film.

The organic solvent preferably contains a solvent selected from the group consisting of ethers having 3 to 12 carbon atoms, ketones having 3 to 12 carbon atoms, esters having 3 to 12 carbon atoms, and halogenated hydrocarbons having 1 to 6 carbon atoms.

The ethers, ketones, and esters may have a cyclic structure. A compound having two or more groups selected from ether, ketone, and ester functional groups (—O—, —CO—, and —COO—) can be used as the organic solvent. The organic solvent may have another functional group such as an alcoholic hydroxyl group. The carbon number of the organic solvent having 2 or more types of functional groups may be within the carbon number range of a compound having any one of the functional groups.

Examples of the ethers having 3 to 12 carbon atoms include diisopropyl ether, dimethoxymethane, dimethoxyethane, 1,4-dioxane, 1,3-dioxolane, tetrahydrofuran, anisole, and phenetole.

Examples of the ketones having 3 to 12 carbon atoms include acetone, methyl ethyl ketone, diethyl ketone, diisobutyl ketone, cyclohexanone and methyl cyclohexanone.

Examples of the esters having 3 to 12 carbon atoms include ethyl formate, propyl formate, pentyl formate, methyl acetate, ethyl acetate, and pentyl acetate.

Examples of the organic solvents having the two or more types of functional groups include 2-ethoxyethyl acetate, 2-methoxyethanol, and 2-butoxyethanol.

The carbon number of the halogenated hydrocarbon having 1 to 6 carbon atoms is preferably 1 or 2, more preferably 1. A halogen atom of the halogenated hydrocarbon is preferably a chlorine atom. In the halogenated hydrocarbon, the ratio of hydrogen atoms replaced by halogen atoms is preferably 25 to 75 mol %, more preferably 30 to 70 mol %, further preferably 35 to 65 mol %, most preferably 40 to 60 mol %. A typical halogenated hydrocarbon is methylene chloride.

2 or more types of the organic solvents may be used as a mixture.

The cellulose acylate solution (the dope) may be prepared by a common method, in which the preparation is carried out at 0° C. or higher (at an ordinary temperature or a high temperature). The cellulose acylate solution may be prepared by dope preparation method and apparatus for a common solution casting method. In the common method, the organic solvent is preferably a halogenated hydrocarbon, particularly methylene chloride.

The amount of the cellulose acylate is controlled such that the resulting solution has a cellulose acylate content of 10 to 40% by mass. The cellulose acylate content is more preferably 10 to 30% by mass. Additives to be hereinafter described may be added to the organic solvent (the main solvent).

The cellulose acylate solution can be prepared by stirring the cellulose acylate and organic solvent at an ordinary temperature (0 to 40° C.). In the case of preparing a high concentration solution, they may be stirred under pressure and heat. Specifically, the cellulose acylate and organic solvent are put in a pressurized vessel and closed, and are then stirred under increased pressure while heating at a temperature higher than the boiling point of the solvent without boiling the solvent. The heating temperature is generally 40° C. or higher, preferably 60 to 200° C., more preferably 80 to 110° C.

The components may be roughly premixed and then put in a vessel. The components may be separately added to the vessel. The vessel preferably has such a structure that the components can be stirred. The inner pressure of the vessel may be increased by introducing an inert gas such as nitrogen gas. Alternatively the inner pressure may be increased by heating to increase the solvent vapor pressure. The components may be added under the increased pressure after the vessel is closed.

In the case of using the heating process, the vessel is preferably heated from the outside. For example, the vessel may be heated by a jacket type heating apparatus. Further, the entire vessel may be heated such that a plate heater is placed on the outside of the vessel, a pipe is connected thereto, and a liquid is circulated in the pipe.

The components are preferably stirred by an impeller formed in the vessel. The impeller preferably has such a length that it reaches the vicinity of the vessel wall. A scrape blade is preferably formed on the end of the impeller to interchange the liquid on the vessel wall.

The vessel may contain a measuring instrument such as a pressure indicator or a thermometer. Each component is dissolved in the solvent in the vessel. The prepared dope is isolated from the vessel after cooling, or is isolated and then cooled by a heat exchanger, etc.

The cellulose acylate solution may be prepared by a cooling dissolution method. By the cooling dissolution method, the cellulose acylate can be dissolved even in an organic solvent that it is hardly dissolved in by a common method. In the case of using a solvent that the cellulose acylate can be dissolved in by a common method, a uniform solution can be rapidly obtained by the cooling dissolution method.

In the cooling dissolution method, first the cellulose acylate is gently added to the organic solvent while stirring at room temperature. The amount of the cellulose acylate is preferably controlled such that the cellulose acylate content of the mixture is 10 to 40% by mass. The cellulose acylate content is more preferably 10 to 30% by mass. Further, additives to be hereinafter described may be added to the mixture.

Then the mixture is cooled to a temperature of −100 to 10° C., etc., the temperature being preferably −80 to −10° C., more preferably −50 to −20° C., most preferably −50 to −30° C. The mixture may be cooled in dry ice-methanol bath (−75° C.), a cooled diethylene glycol solution (−30 to −20° C.), etc. In the cooling step, the mixture of the cellulose acylate and the organic solvent is solidified.

The cooling rate is preferably 4° C./minute or more, more preferably 8° C./minute or more, most preferably 12° C./minute or more. A higher cooling rate is more preferred, and the upper limit is theoretically 10,000° C./second, technically 1,000° C./second, and practically 100° C./second. The cooling rate is a value obtained by dividing the temperature difference between the start and end of the cooling by the time required for completing the cooling.

When the cooled mixture is heated to a temperature of 0 to 200° C., preferably 0 to 150° C., more preferably 0 to 120° C., most preferably 0 to 50° C., the cellulose acetate is dissolved in the organic solvent. The mixture may be heated by only leaving at room temperature or by a heating bath. The heating rate is preferably 4° C./minute or more, more preferably 8° C./minute or more, most preferably 12° C./minute or more. A higher heating rate is more preferred, and the upper limit is theoretically 10,000° C./second, technically 1,000° C./second, and practically 100° C./second. The heating rate is a value obtained by dividing the temperature difference between the start and end of the heating by the time required for completing the heating.

A uniform cellulose acylate solution can be obtained in the above manner. In a case where the dissolution is insufficient, the steps of cooling and heating may be repeated. The dissolution can be evaluated only by visually observing the appearance of the solution.

In the cooling dissolution method, a closable vessel is preferably used to prevent water contamination due to dew condensation in the cooling step. The dissolving time can be shortened by cooling under increased pressure and heating under reduced pressure, and a pressure resistant vessel is preferably used in this case.

When a cellulose acetate having an acetylation degree of 60.9% and a viscosity average polymerization degree of 299 is dissolved in methyl acetate by the cooling dissolution method, thus prepared 20% by mass solution has about 33° C. of a pseudo phase transition point between the sol and gel states, obtained by differential scanning calorimetry (DSC), and the solution is in the uniform gel state at the point or lower. Thus, the solution is maintained at the pseudo phase transition temperature or higher, preferably at a temperature of about 10° C. higher than the gel phase transition temperature. It should be noted that the pseudo phase transition temperature depends on the acetylation degree and viscosity average polymerization degree of the cellulose acetate, the solution concentration, and the organic solvent.

The cellulose acylate film may be produced from the prepared cellulose acylate solution (the dope) by a solution casting method. The dope is cast on a drum or band, and the solvent is evaporated to form the film. It is preferred that the concentration of the dope is controlled before the casting such that the solid content is 18 to 35%. The surface of the drum or band is preferably in the mirror-finished state. The dope is preferably cast on the drum or band having a surface temperature of 10° C. or lower.

The drying step in the solution casting method is described in U.S. Pat. Nos. 2,336,310, 2,367,603, 2,492,078, 2,492,977, 2,492,978, 2,607,704, 2,739,069, and 2,739,070, British Patent Nos. 640731 and 736892, JP-B-45-4554, JP-B-49-5614, JP-A-60-176834, JP-A-60-203430, and JP-A-62-115035. The dope may be dried on the band or drum by flowing air or an inert gas such as nitrogen.

The resultant film may be peeled off from the drum or band and further dried by hot air while successively changing the air temperature from 100° C. to 160° C. to evaporate the residual solvent. This method is described in JP-B-5-17844. The time between the casting and the peeling can be reduced by using the method. To carry out the method, the dope is in the gel state at the surface temperature of the drum or band in the casting step.

The prepared cellulose acylate solution (the dope) may be formed into a film by double or more casting. In this case, the cellulose acylate film is preferably formed by the solution casting method. The dope is cast on a drum or band, and the solvent is evaporated to form the film. It is preferred that the concentration of the dope is controlled before the casting such that the solid content is 10 to 40%. The surface of the drum or band is preferably in the mirror finished state.

In the case of casting a plurality of the cellulose acylate solutions, the film may be formed by casting the cellulose acylate solutions into layers respectively from a plurality of casting openings formed at some intervals in the moving direction of a support, as described in JP-A-61-158414, JP-A-1-122419, and JP-A-11-198285, etc. The film may be formed by casting the cellulose acylate solutions from two casting openings as described in JP-B-60-27562, JP-A-61-94724, JP-A-61-947245, JP-A-61-104813, JP-A-61-158413, and JP-A-6-134933. Further, the film may be formed by enclosing flow of a high-viscosity cellulose acylate solution with a low-viscosity cellulose acylate solution, thereby extruding the solutions simultaneously as described in JP-A-56-162617.

Further, 2 casting openings may be used such that a layer is formed on a support by a first casting opening, the layer is peeled off, and another layer is formed on a surface of the above layer that faced the support by a second casting opening, to form a film, as described in JP-B-44-20235, etc.

The cellulose acylate solutions for the casting may be the same or different solutions. To form a plurality of cellulose acylate layers with desired functions, the cellulose acylate solutions suitable for the functions may be extruded from the casting openings respectively. The cellulose acylate solution may be cast simultaneously together with a liquid for another functional layer such as an adhesive layer, dye layer, antistatic layer, antihalation layer, UV absorbing layer, or polarizing layer.

In the case of using a single layer solution, a high-concentration high-viscosity cellulose acylate solution has to be extruded to obtain a desired film thickness. In this case, the cellulose acylate solution is poor in the stability, thereby suffering problems of generation of solids, spit defects, poor flatness, etc. In view of solving the problems, a plurality of high-viscosity cellulose acylate solutions can be extruded onto a support by casting the solutions simultaneously from casting openings, resulting in excellent flatness and surface properties. Further, the drying load can be reduced by using the high-concentration cellulose acylate solutions, thereby increasing the speed of producing the film.

A degradation inhibitor such as an antioxidant, peroxide decomposing agent, radical inhibitor, metal deactivator, acid scavenger, or amine may be added to the cellulose acylate film. The degradation inhibitors are described in JP-A-3-199201, JP-A-5-1907073, JP-A-5-194789, JP-A-5-271471, and JP-A-6-107854. The mass ratio of the degradation inhibitor to the solution (the dope) is preferably 0.01 to 1% by mass, more preferably 0.01 to 0.2% by mass. When the mass ratio is 0.01% or more by mass, sufficient effects of the degradation inhibitor are achieved. When the mass ratio is less than 1% by mass, bleed out of the degradation inhibitor on the film surface is hardly caused. Particularly preferred examples of the degradation inhibitors include butylated hydroxytoluene (BHT) and tribenzylamine (TBA).

The steps from the casting to the after-drying may be carried out under air or an inert gas such as a nitrogen gas. In the invention, the cellulose acylate film may be winded by means of a common winder by a method such as a constant tension method, a constant torque method, a taper tension method, and a program tension control method with constant inner stress.

[Stretching]

The polarizing plate protective film A used in the invention is particularly preferably a stretched cellulose acylate film. A desired retardation of the cellulose acylate film can be obtained by the stretching. The direction of the stretching may be the width direction or longitudinal direction of the cellulose acylate film.

Methods for stretching in the width direction are described in JP-A-62-115035, JP-A-4-152125, JP-A-4-284211, JP-A-4-298310, JP-A-11-48271, etc.

The film is stretched under ordinary temperature or a heating condition. The heating temperature is preferably equal to or less than the glass-transition temperature of the film. The film may be stretched during the drying, and can be efficiently stretched particularly in a case where a solvent remains in the film. In the case of stretching the film in the longitudinal direction, for example, the film may be stretched by controlling the transporting rollers such that the speed of winding the film is higher than the speed of peeling the film. In the case of stretching the film in the width direction, the film may be stretched such that the film is transported with the ends held by a tenter, the width of the tenter being gradually increased. After drying, the film may be stretched by a stretching apparatus, and is preferably stretched by uniaxial stretching using a long stretching apparatus.

The film stretch ratio based on the unstretched film is preferably 1 to 200%, more preferably 5% to 150%. The film is stretched in the width direction particularly preferably by 1 to 200%, and further preferably by 5 to 150%. The stretching speed is preferably 1%/minute to 100%/minute, more preferably 5%/minute to 80%/minute, most preferably 10%/minute to 60%/minute.

The stretched cellulose acylate film is preferably produced by the step of stretching the cellulose acylate film at the maximum stretch ratio, and the step of maintaining the stretched film at a stretch ratio lower than the maximum stretch ratio for a certain period (hereinafter referred to as a relaxation step in some cases). The stretch ratio in the relaxation step is preferably 50% to 99%, more preferably 70% to 97%, most preferably 90% to 95%, of the maximum stretch ratio. Further, the relaxation time is preferably 1 to 120 seconds, more preferably 5 to 100 seconds.

The stretching temperature in the relaxation step is preferably within a range between the glass-transition temperature (Tg) of the film and the Tg+40° C.

Further, it is preferred that the stretched cellulose acylate film used for the polarizing plate protective film A of the invention is produced by a method containing the step of shrinking the film while holding the film in the width direction.

In the method containing the steps of stretching the film in the width direction and shrinking the film in the transport direction, the film can be shrunk such that the film is held by a pantograph- or linear motor-type tenter, and a distance of clips is gradually reduced in the transport direction while stretching the film in the width direction.

For example, FITZ manufactured by Ichikin, Ltd. can be preferably used as a stretching apparatus for stretching the film in the longitudinal direction or width direction and for shrinking the film in the other direction simultaneously to increase the film thickness. The apparatus is described in JP-A-2001-38802.

A stretch ratio in the stretching step and a shrink ratio in the shrinking step may be appropriately selected depending on desired front retardation Re and thickness direction retardation Rth, and it is preferred that the stretch ratio is 10% or more and the shrink ratio is 5% or more.

It should be noted that, in the invention, the shrink ratio means the length ratio of the film in the shrinking direction before and after the shrinking step.

The shrink ratio is preferably 5 to 40%, particularly preferably 10 to 30%.

[Thickness Of Stretched Cellulose Acylate Film]

The thickness of the stretched cellulose acylate film used in the invention is preferably 10 to 200 μm, more preferably 20 to 150 μm, most preferably 30 to 100 μm.

<Polarizing Plate Protective Film C>

Then the polarizing plate protective film C used in the invention is described in detail below.

The polarizing plate protective film C has retardation properties satisfying the following inequalities (6) to (10).

$$0\ nm < Re(548) < 10\ nm \quad \text{Inequality (6)}$$

$$100\ nm < Rth(548) < 300\ nm \quad \text{Inequality (7)}$$

$$10 < Rth(548)/Re(548) \quad \text{Inequality (8)}$$

$$1.0 < Rth(446)/Rth(548) < 2.0 \quad \text{Inequality (9)}$$

$$0.5 < Rth(628)/Rth(548) < 1.0 \quad \text{Inequality (10)}$$

The inequality (6) is more preferably 0 nm<Re(548)<5 nm, most preferably 0 nm<Re(548)<3 nm.

The inequality (7) is more preferably 120 nm<Rth(548)<280 nm, most preferably 150 nm<Rth(548)<250 nm.

The inequality (8) is more preferably 15<Rth(548)/Re(548), most preferably 20<Rth(548)/Re(548).

The inequality (9) is more preferably 1.05<Rth(446)/Rth(548)<1.8, most preferably 1.1<Rth(446)/Rth(548)<1.5.

The inequality (10) is more preferably 0.5<Rth(628)/Rth(548)<1.0, most preferably 0.7<Rth(628)/Rth(548)<0.97.

The Re(λ) and Rth(λ) are controlled in the above range, whereby the resultant polarizing plate protective film has a large effect of reducing color change due to viewing angles.

The polarizing plate protective film C may be a various polymer film. The polymer film is preferably a film of a polycarbonate, cycloolefin polymer, cellulose acylate, etc. Among them, the cellulose acylate is particularly preferred because of the polarizing plate workability.

The retardation of the cellulose acylate film used as the polarizing plate protective film C (hereinafter referred to as the cellulose acylate film C in some cases) can be controlled by various methods. The retardation is preferably controlled by an Rth generating agent to be hereinafter described, or by film stretching.

The Rth generating agent is a compound for generating a birefringence in the film thickness direction.

The Rth generating agent is preferably a compound that has an absorption maximum in a wavelength range of 250 to 380 nm and has a large polarizability anisotropy.

The Rth generating agent is particularly preferably a compound represented by the following formula (I):

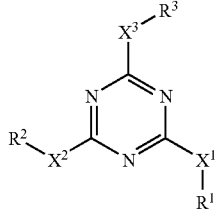

(I)

In the formula (I), $X^1$ represents a single bond, —$NR^4$—, —O—, or —S—, $X^2$ represents a single bond, —$NR^5$—, —O—, or —S—, and $X^3$ represents a single bond, —$NR^6$—, —O—, or —S—. $R^1$, $R^2$, and $R^3$ independently represent an alkyl group, an alkenyl group, an aromatic ring group, or a heterocyclic group, and $R^4$, $R^5$, and $R^6$ independently represent a hydrogen atom, an alkyl group, an alkenyl group, an aryl group, or a heterocyclic group.

The compound represented by the formula (I) is described in detail below.

First $R^1$, $R^2$, and $R^3$ are described below.

In the formula (I), $R^1$, $R^2$, and $R^3$ independently represent an alkyl group, an alkenyl group, an aromatic ring group, or a heterocyclic group, and are more preferably an aromatic ring group or a heterocyclic group. The aromatic ring group of $R^1$, $R^2$, or $R^3$ is preferably a phenyl group or naphthyl group, particularly preferably a phenyl group.

$R^1$, $R^2$, and $R^3$ may have a substituent on the aromatic ring or heterocycle. Examples of the substituents include halogen atoms, a hydroxyl group, a cyano group, a nitro group, a carboxyl group, alkyl groups, alkenyl groups, aryl groups, alkoxy groups, alkenyloxy groups, aryloxy groups, acyloxy groups, alkoxycarbonyl groups, alkenyloxycarbonyl groups, aryloxycarbonyl groups, sulfamoyl groups, alkyl-substituted sulfamoyl groups, alkenyl-substituted sulfamoyl groups, aryl-substituted sulfamoyl groups, sulfonamide groups, carbamoyl groups, alkyl-substituted carbamoyl groups, alkenyl-substituted carbamoyl groups, aryl-substituted carbamoyl groups, amide groups, alkylthio groups, alkenylthio groups, arylthio groups, and acyl groups.

When $R^1$, $R^2$, or $R^3$ represents a heterocyclic group, its heterocycle preferably has aromaticity. The heterocycle having aromaticity is generally an unsaturated heterocycle, and preferably has double bonds maximally. The heterocycle is preferably a 5-, 6-, or 7-membered ring, more preferably a 5- or 6-membered ring, most preferably a 6-membered ring. A heteroatom of the heterocycle is preferably a nitrogen, sulfur, or oxygen atom, particularly preferably a nitrogen atom. The heterocycle having aromaticity is particularly preferably a pyridine ring to form a 2- or 4-pyridyl group as the heterocyclic group. The heterocyclic group may have a substituent. Examples of the substituents on the heterocyclic group include the above-described substituent examples. The substituent may further have a substituent.

In the formula (I), $X^1$ represents a single bond, —$NR^4$—, —O—, or —S—, $X^2$ represents a single bond, —$NR^5$—, —O—, or —S—, and $X^3$ represents a single bond, —$NR^6$—, —O—, or —S—. $R^4$, $R^5$, and $R^6$ independently represent a hydrogen atom, an alkyl group, an alkenyl group, an aryl group, or a heterocyclic group.

The alkyl group of $R^4$, $R^5$, or $R^6$ may be a cyclic or chain alkyl group. The alkyl group is preferably a chain alkyl group, and more preferably not a branched chain alkyl group but a straight alkyl group. The carbon number of the alkyl group is preferably 1 to 30, more preferably 1 to 20, further preferably 1 to 10, still further preferably 1 to 8, most preferably 1 to 6. The alkyl group may have a substituent, and examples thereof include halogen atoms, alkoxy groups such as methoxy and ethoxy groups, and acyloxy groups such as acryloyloxy and methacryloyloxy groups.

The alkenyl group of $R^4$, $R^5$, or $R^6$ may be a cyclic or chain alkenyl group. The alkenyl group is preferably a chain alkenyl group, and more preferably not a branched chain alkenyl group but a straight alkenyl group. The carbon number of the alkenyl group is preferably 2 to 30, more preferably 2 to 20, further preferably 2 to 10, still further preferably 2 to 8, most preferably 2 to 6. The alkyl group may have a substituent, and examples thereof include those of the substituent on the alkyl group.

The aromatic ring group (aryl group) and heterocyclic group of $R^4$, $R^5$, or $R^6$ have the same meanings and preferred embodiments as that of $R^1$, $R^2$, or $R^3$. The aromatic ring group and the heterocyclic group may further have a substituent, and examples thereof include those on the $R^1$, $R^2$, and $R^3$.
Preferred examples 1-(1) to IV-(10) of the compound represented by the formula (I) are illustrated below without intention of restricting the invention.
I-(1)
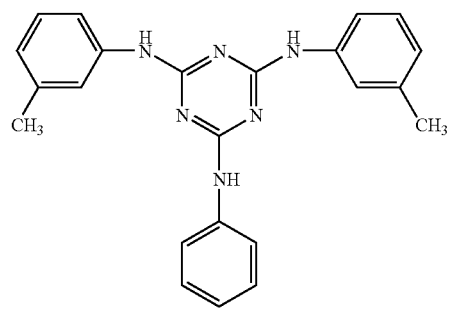
I-(2)
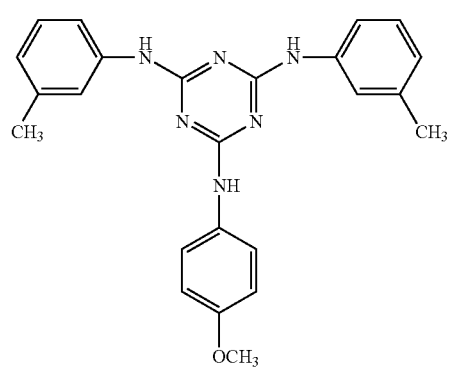
I-(3)
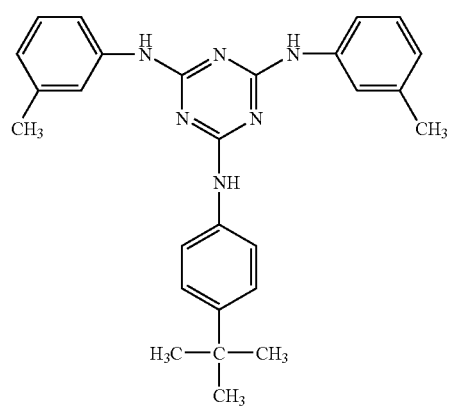
I-(4)
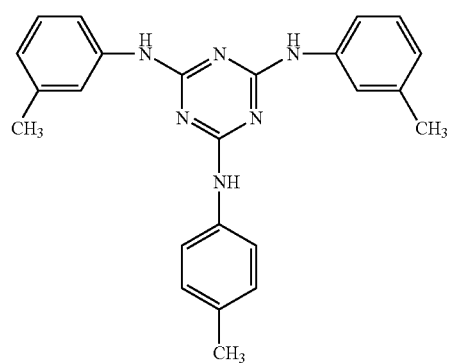
I-(5)
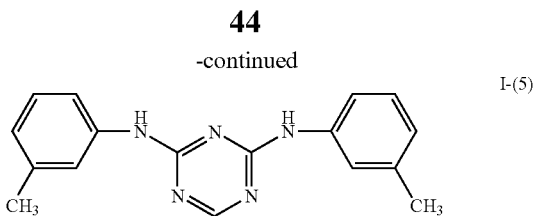
I-(6)
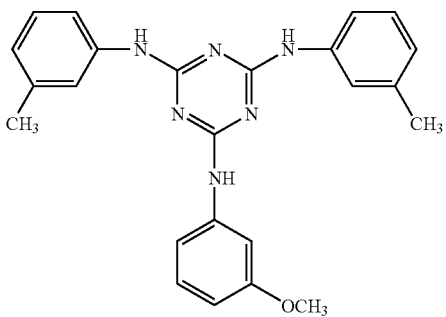
I-(7)
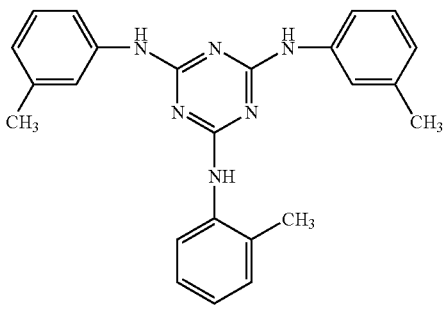
I-(8)
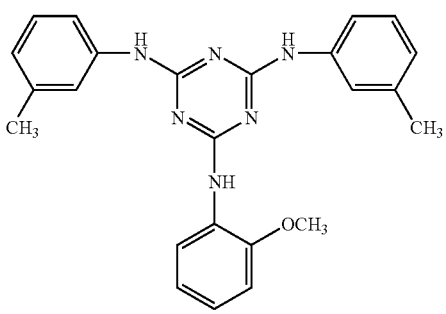
I-(9)
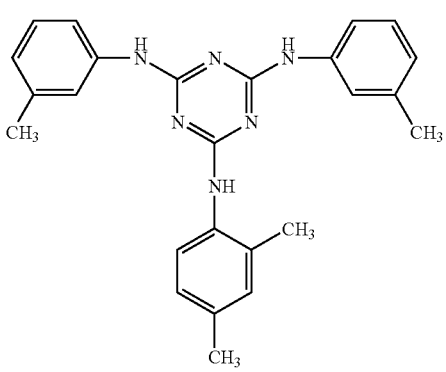

I-(10) 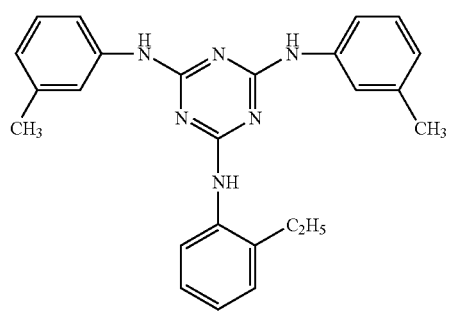
I-(11) 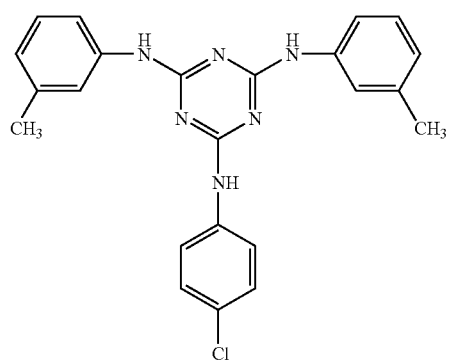
I-(12) 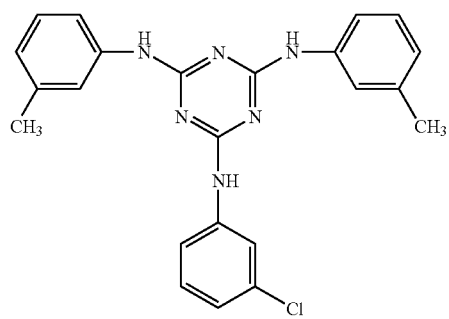
I-(13) 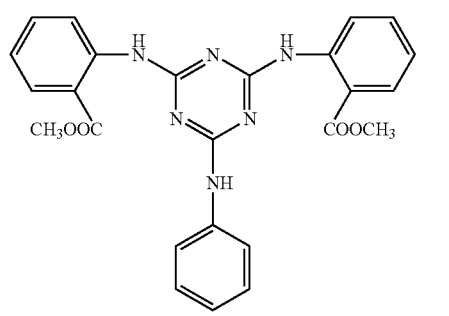
I-(14) 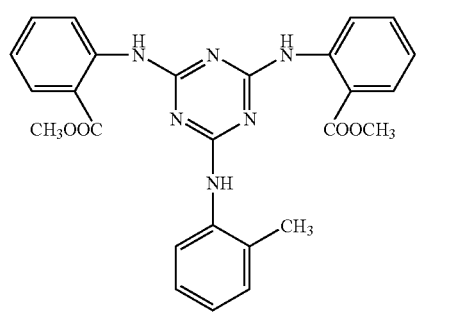
I-(15) 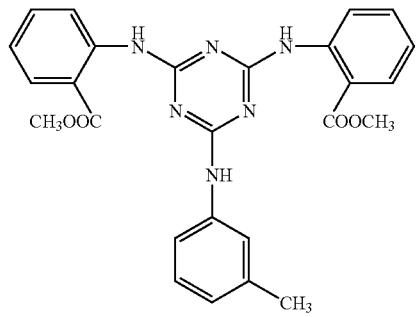
I-(16) 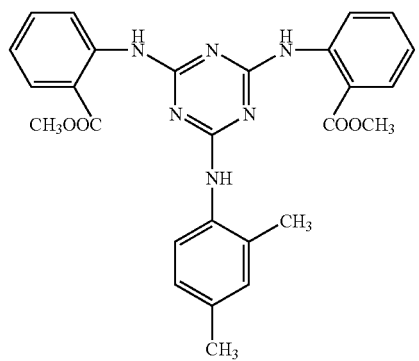
I-(17) 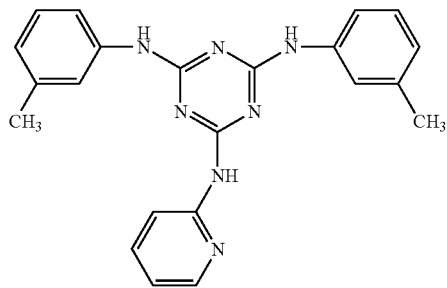
I-(18) 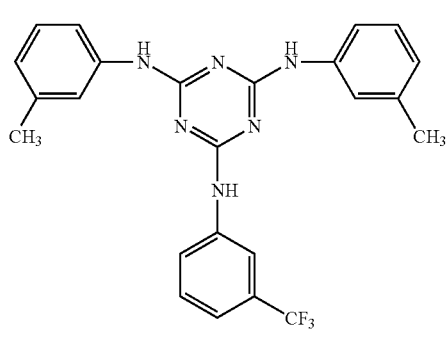
I-(19) 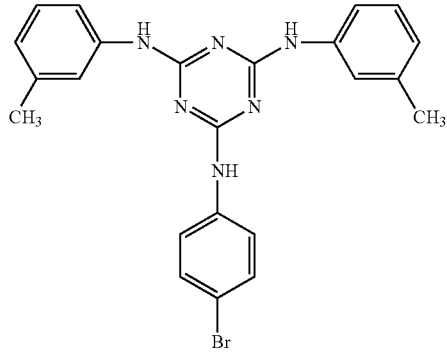

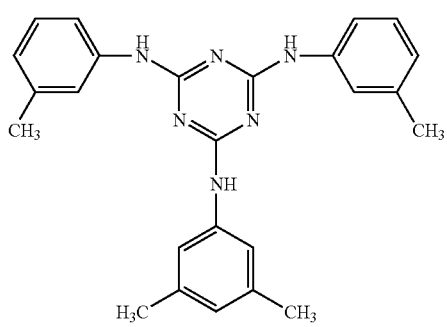 I-(20)
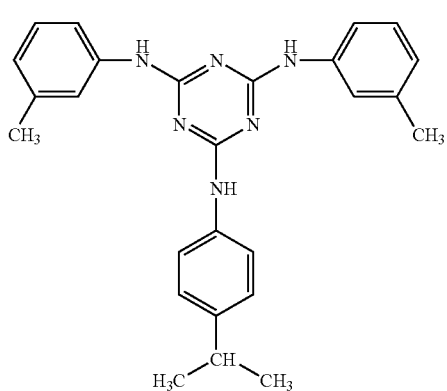 I-(21)
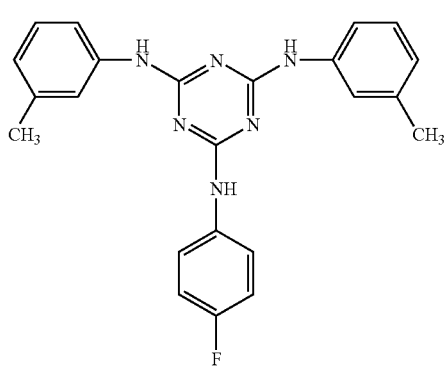 I-(22)
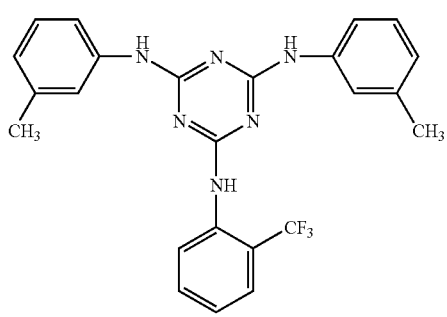 I-(23)
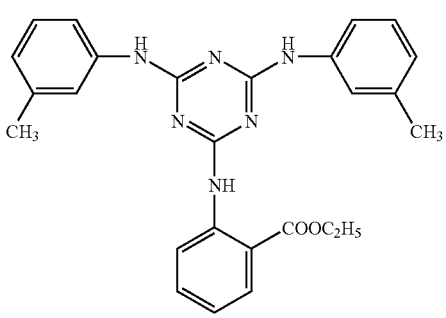 I-(24)
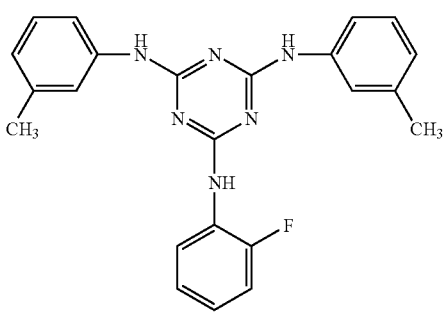 I-(25)
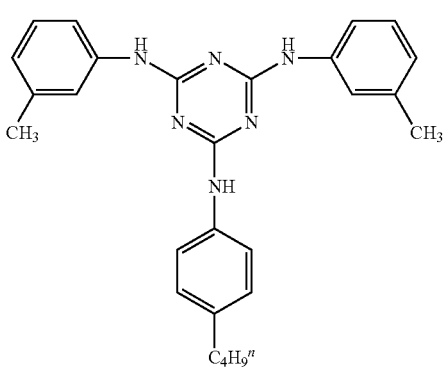 I-(26)
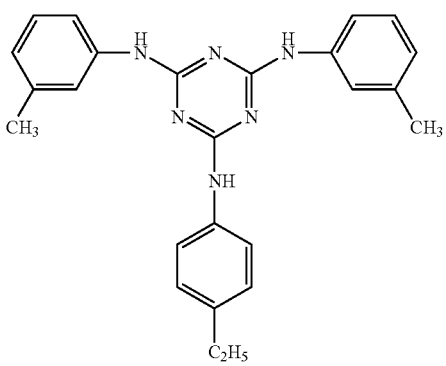 I-(27)

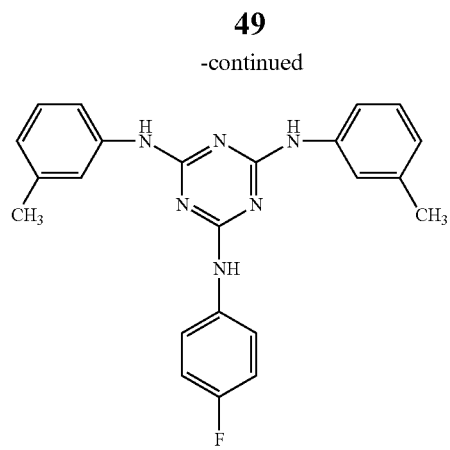
I-(28)
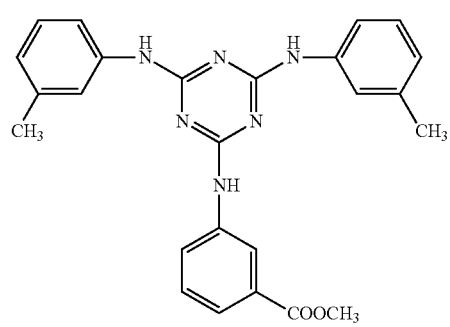
I-(29)
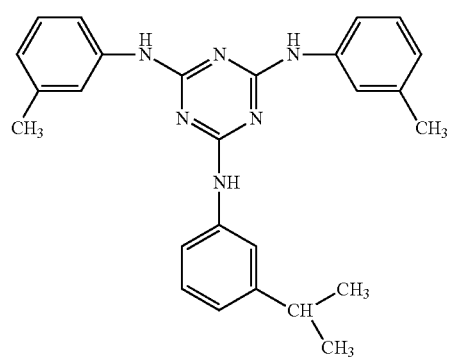
I-(30)
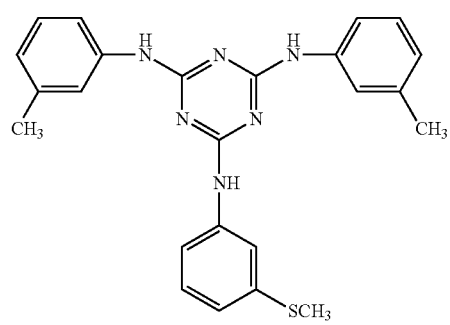
I-(31)
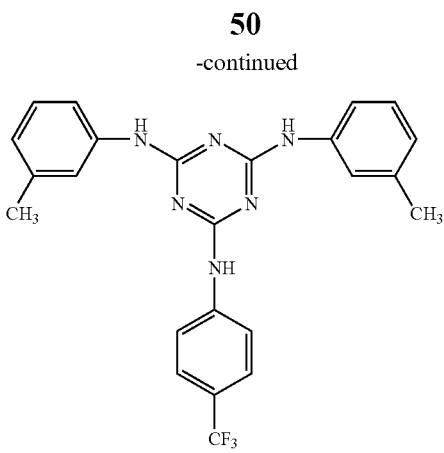
I-(32)
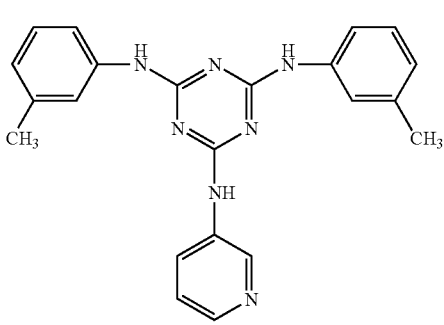
I-(33)
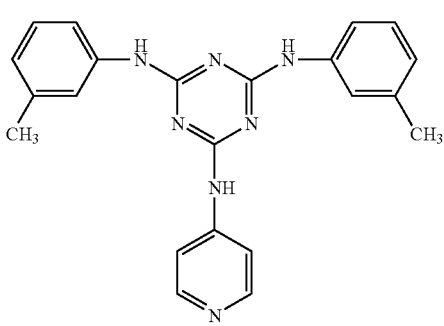
I-(34)
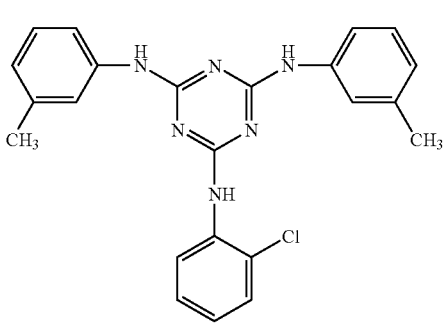
I-(35)
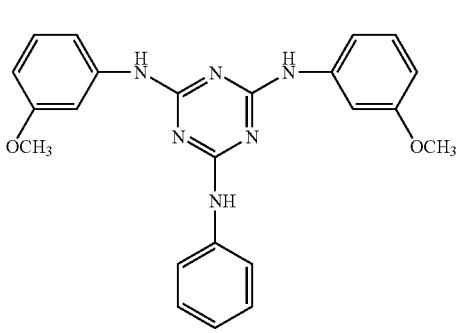
I-(36)

I-(37)
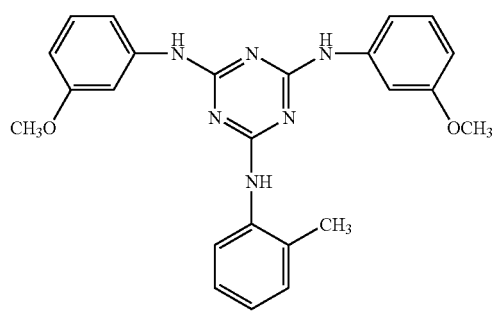
I-(38)
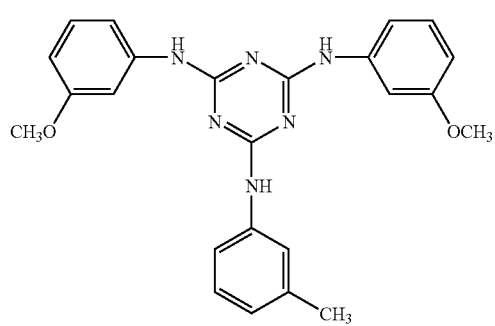
I-(39)
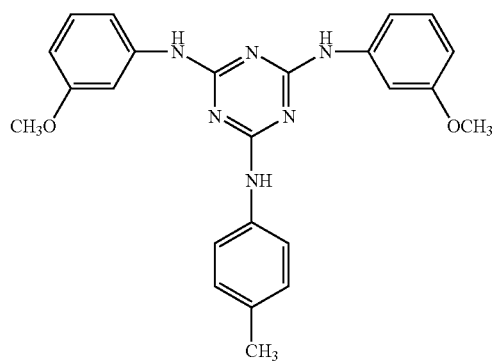
I-(40)
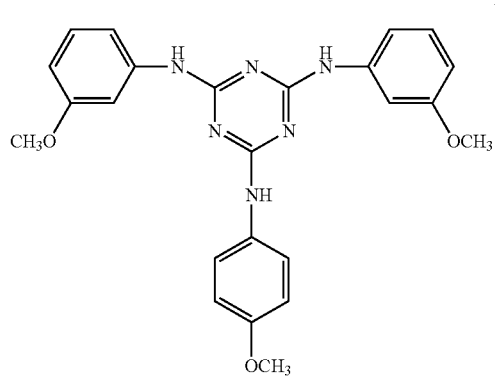
I-(41)
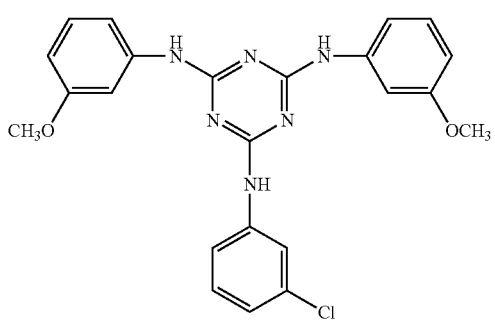
I-(42)
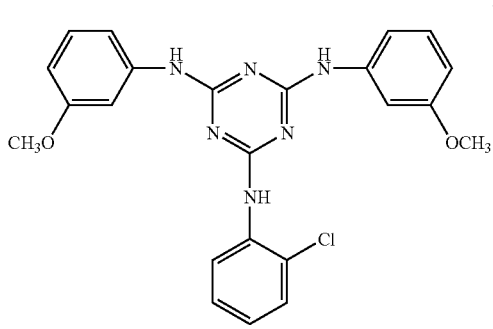
I-(43)
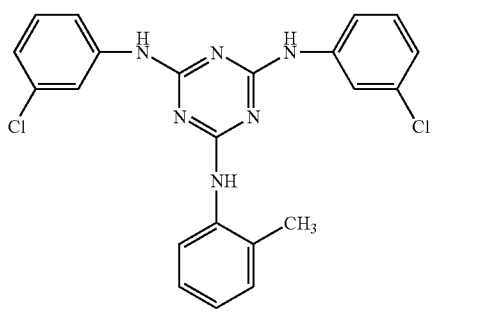
I-(44)
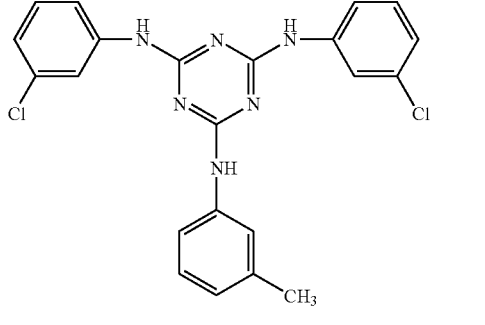
I-(45)
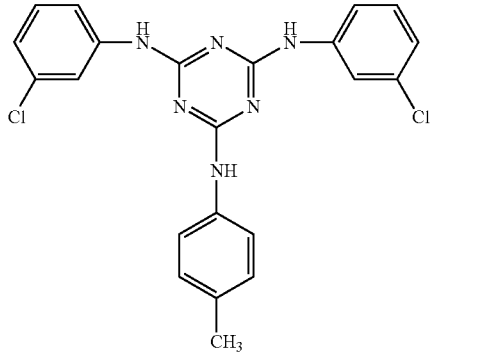

I-(46)
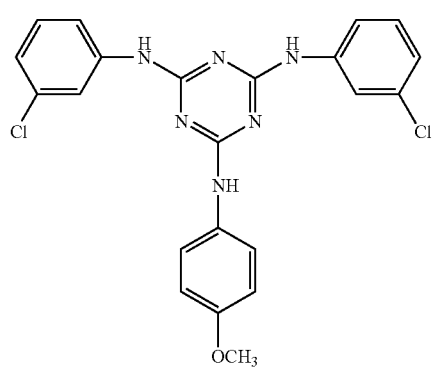
I-(47)
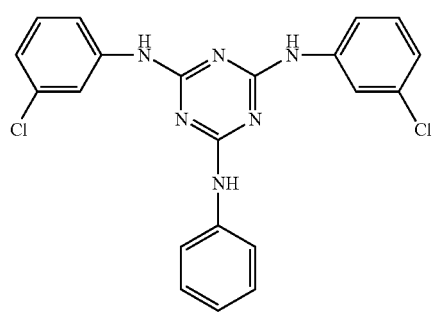
I-(48)
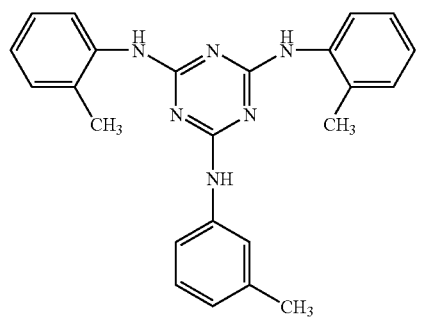
I-(49)
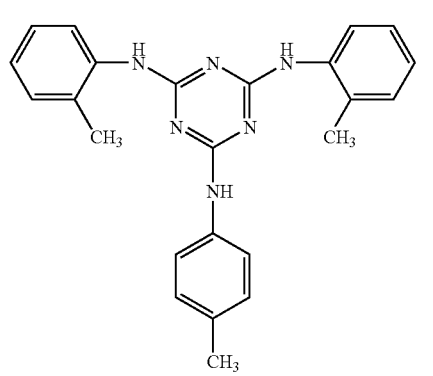
I-(50)
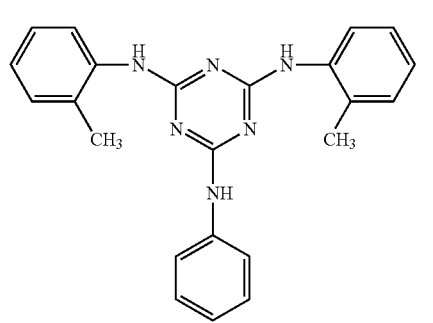
II-(1)
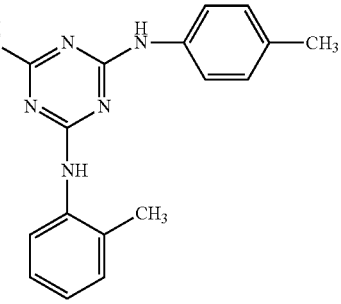
II-(2)
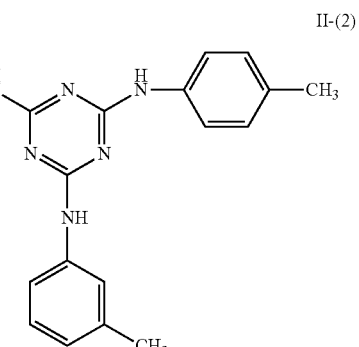
II-(3)
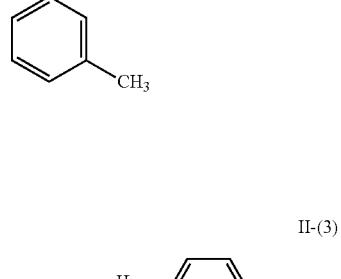
II-(3)
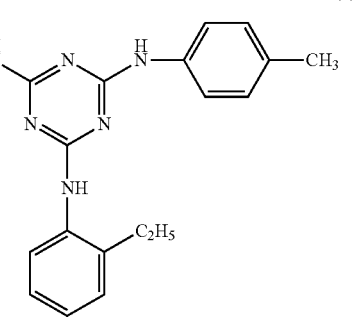
II-(4)
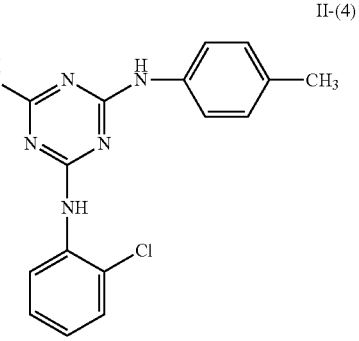

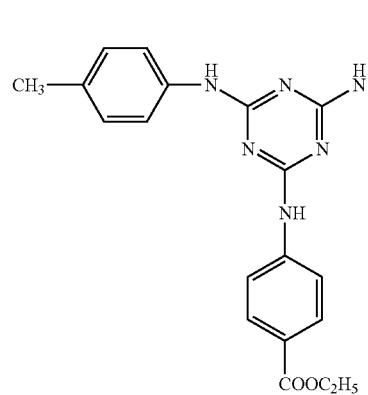
II-(5)
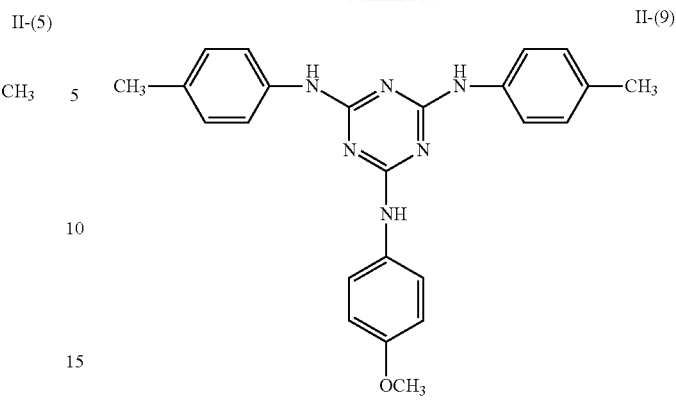
II-(9)
III-(1)
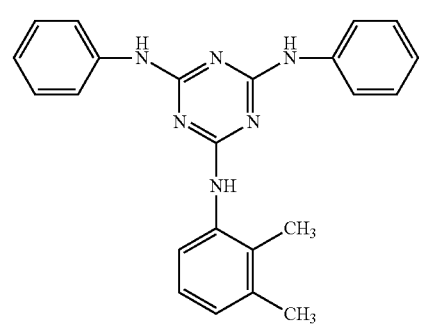
II-(6)
III-(2)
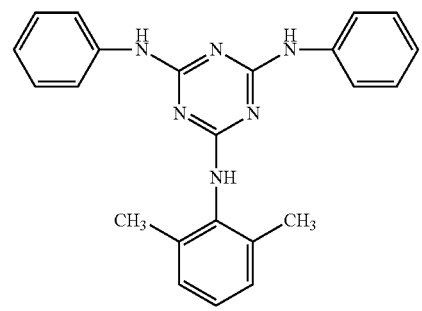
II-(7)
III-(3)
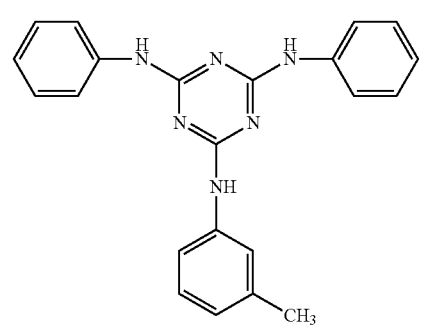
II-(8)
III-(4)

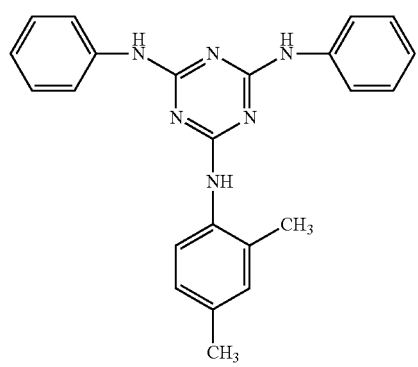
III-(5)
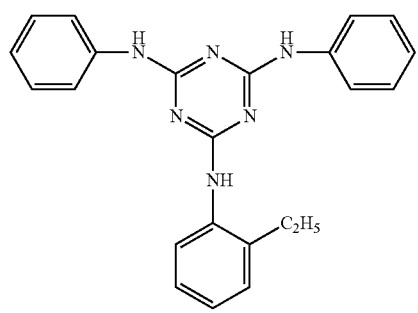
III-(6)
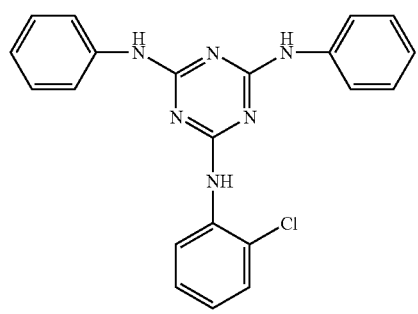
III-(7)
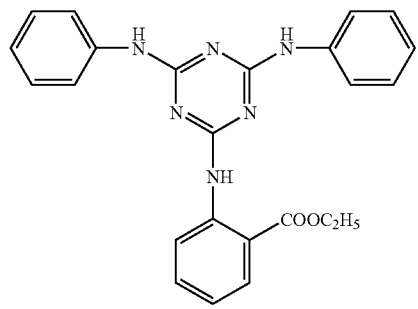
III-(8)
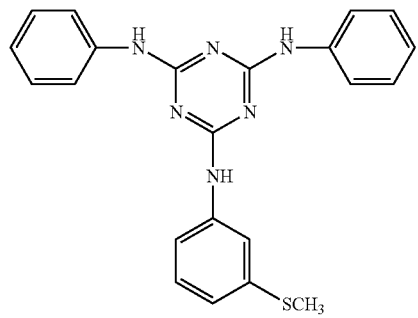
III-(9)
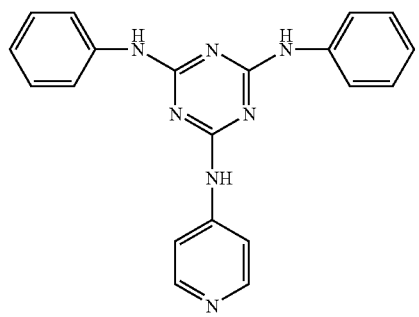
III-(10)
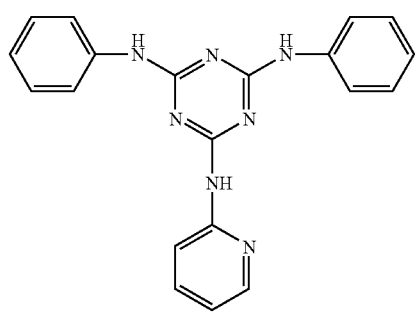
III-(11)
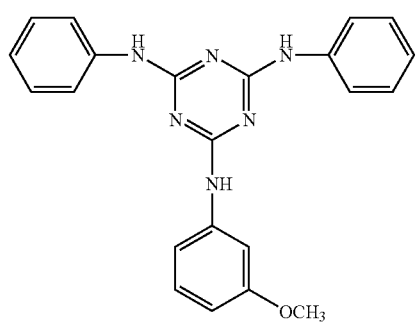
III-(12)
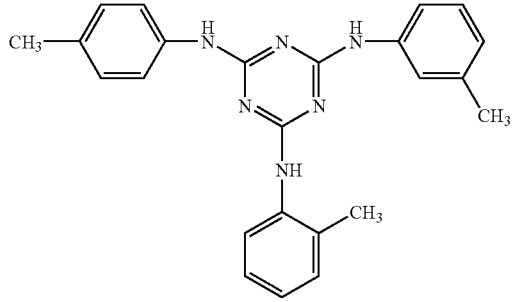
IV-(1)
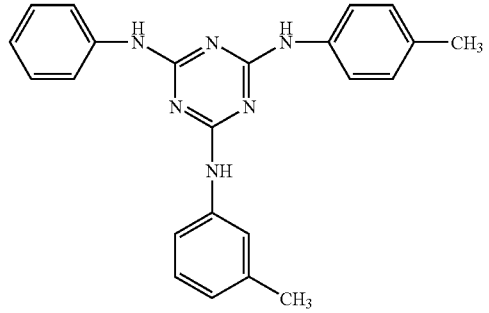
IV-(2)

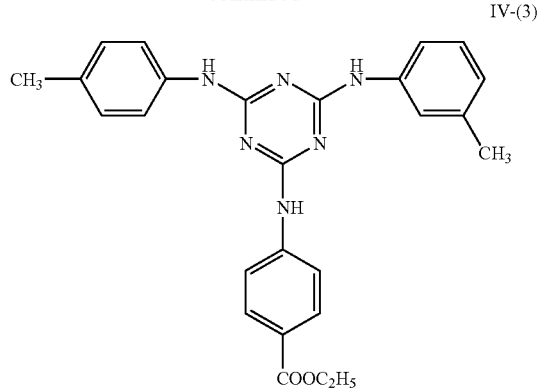
IV-(3)
IV-(4)
IV-(5)
IV-(6)
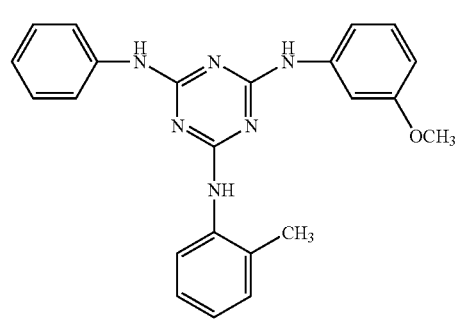
IV-(7)
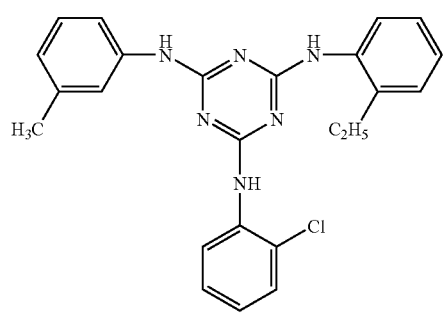
IV-(8)
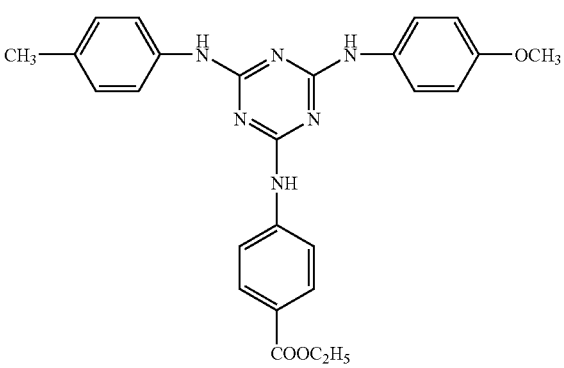
IV-(9)
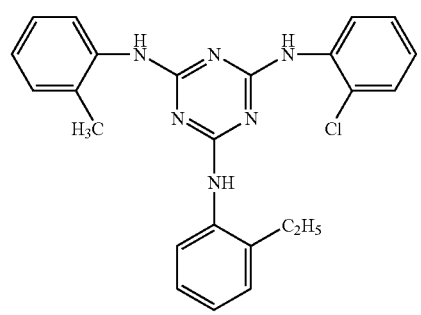
IV-(10)
Also a compound represented by the following formula (III) is preferably used as the Rth generating agent in the invention. The compound of the formula (III) is described in detail below.

Formula (III)

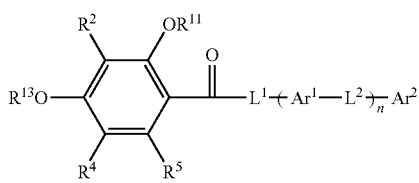

In the formula (III), $R^2$, $R^4$, and $R^5$ independently represent a hydrogen atom or a substituent, $R^{11}$ and $R^{13}$ independently represent a hydrogen atom or an alkyl group, and $L^1$ and $L^2$ independently represent a single bond or a divalent linking group. $Ar^1$ represents an arylene group or an aromatic heterocyclic group, $Ar^2$ represents an aryl group or an aromatic heterocyclic group, n represents an integer of 3 or more, and $L^2$'s and $Ar^1$'s in the n units may be the same or different ones respectively. $R^{11}$ and $R^{13}$ are different from each other, and the alkyl group of $R^{13}$ is free of heteroatoms.

In the formula (III), $R^2$, $R^4$, and $R^5$ independently represent a hydrogen atom or a substituent. The substituent may be a substituent T to be hereinafter described.

In the formula (III), $R^2$ is preferably a hydrogen atom, an alkyl group, an alkoxy group, an amino group, or a hydroxyl group, more preferably a hydrogen atom, an alkyl group, or an alkoxy group, further preferably a hydrogen atom, an alkyl group (which preferably has 1 to 4 carbon atoms, and is more preferably a methyl group), or an alkoxy group (which preferably has 1 to 12 carbon atoms, more preferably has 1 to 8 carbon atoms, further preferably has 1 to 6 carbon atoms, particularly preferably 1 to 4 carbon atoms). $R^2$ is particularly preferably a hydrogen atom, a methyl group, or a methoxy group, most preferably a hydrogen atom.

In the formula (III), $R^4$ is preferably a hydrogen atom or an electron-donating group, more preferably a hydrogen atom, an alkyl group, an alkoxy group, an amino group, or a hydroxyl group, further preferably a hydrogen atom, an alkyl group having 1 to 4 carbon atoms, or an alkoxy group having 1 to 12 carbon atoms (which preferably has 1 to 12 carbon atoms, more preferably has 1 to 8 carbon atoms, further preferably has 1 to 6 carbon atoms, particularly preferably has 1 to 4 carbon atoms), particularly preferably a hydrogen atom, an alkyl group having 1 to 4 carbon atoms, or an alkoxy group having 1 to 4 carbon atoms, most preferably a hydrogen atom or a methoxy group.

In the formula (III), $R^5$ is preferably a hydrogen atom, a halogen atom, an alkyl group, an alkoxy group, an amino group, or a hydroxyl group, more preferably a hydrogen atom, an alkyl group, or an alkoxy group, further preferably a hydrogen atom, an alkyl group (preferably an alkyl group having 1 to 4 carbon atoms, more preferably a methyl group), or an alkoxy group (which preferably has 1 to 12 carbon atoms, more preferably has 1 to 8 carbon atoms, further preferably has 1 to 6 carbon atoms, particularly preferably has 1 to 4 carbon atoms). $R^5$ is particularly preferably a hydrogen atom, a methyl group, or a methoxy group, most preferably a hydrogen atom.

In the formula (III), $R^{11}$ and $R^{13}$ independently represent a hydrogen atom or an alkyl group. $R^{11}$ and $R^{13}$ are different from each other, and the alkyl group of $R^{13}$ has no heteroatoms. The heteroatoms are atoms other than hydrogen and carbon atoms, and include oxygen, nitrogen, sulfur, phosphorus, silicon, halogen (F, Cl, Br, and I), and boron atoms.

The alkyl group of $R^{11}$ or $R^{13}$ is a straight, branched, or cyclic, substituted or unsubstituted, alkyl group, preferably a substituted or unsubstituted alkyl group having 1 to 30 carbon atoms, a substituted or unsubstituted cycloalkyl group having 3 to 30 carbon atoms, a substituted or unsubstituted bicycloalkyl group having 5 to 30 carbon atoms (a monovalent group provided by removing one hydrogen atom from a bicycloalkane having 5 to 30 carbon atoms), or a tricyclo structure with more rings.

Preferred examples of the alkyl groups of $R^{11}$ and $R^{13}$ include a methyl group, ethyl group, n-propyl group, isopropyl group, n-butyl group, sec-butyl group, t-butyl group, n-pentyl group, iso-pentyl group, n-hexyl group, n-heptyl group, n-octyl group, tert-octyl group, 2-ethylhexyl group, n-nonyl group, 1,1,3-trimethylhexyl group, n-decyl group, 2-hexyldecyl group, cyclohexyl group, cycloheptyl group, 2-hexenyl group, oleyl group, linoleyl group, and linolenyl group. Further, the cycloalkyl groups include cyclohexyl, cyclopentyl, and 4-n-dodecylcyclohexyl groups, and the bicycloalkyl groups include bicyclo[1,2,2]heptane-2-yl and bicyclo[2,2,2]octane-3-yl groups.

$R^{11}$ is further preferably a hydrogen atom, a methyl group, an ethyl group, an n-propyl group, or an isopropyl group, particularly preferably a hydrogen atom or a methyl group, most preferably a methyl group.

$R^{13}$ is particularly preferably an alkyl group having 2 or more carbon atoms, more preferably an alkyl group having 3 or more carbon atoms. An alkyl group having a branched or cyclic structure is particularly preferred.

Specific examples O-1 to O-20 of the alkyl group of $R^{13}$ are illustrated below without intention of restricting the scope of the invention. In the following examples, each # means a position connecting to the oxygen atom.

O-1
\#—CH$_3$

O-2
\#—C$_2$H$_5$

O-3
\#—C$_3$H$_7$(n)

O-4
\#—C$_3$H$_7$(i)

O-5
\#—C$_4$H$_9$(n)

O-6
\#—C(CH$_3$)$_3$

O-7
\#—C$_5$H$_{11}$(n)

O-8
\#—CH$_2$CH$_2$CH(CH$_3$)$_2$

O-9
\#—C$_6$H$_{13}$(n)

O-10
\#—C$_8$H$_{17}$(n)

O-11
\#—CH$_2$CH(C$_2$H$_5$)(C$_4$H$_9$)

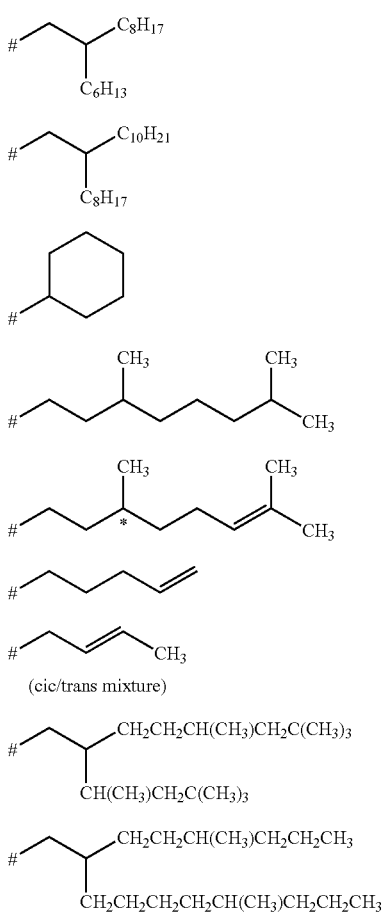

In the formula (III), Ar$^1$ represents an arylene group or an aromatic heterocycle, and Ar$^1$'s in the repeating units may be the same or different groups. Ar$^2$ represents an aryl group or an aromatic heterocycle.

In the formula (III), the arylene group of Ar$^1$ is preferably an arylene group having 6 to 30 carbon atoms, may be monocyclic, and may be bonded to another ring to form a condensed ring. The arylene group may have a substituent if possible, and the substituent may be the substituent T to be hereinafter described. The arylene group of Ar$^1$ more preferably has 6 to 20 carbon atoms, and particularly preferably has 6 to 12 carbon atoms, and examples thereof include a phenylene group, a p-methylphenylene group, and a naphthylene group.

In the formula (III), the aryl group of Ar$^2$ is preferably an aryl group having 6 to 30 carbon atoms, and may be monocyclic, and may be bonded to another ring to form a condensed ring. The aryl group may have a substituent if possible, and the substituent may be the substituent T to be hereinafter described. The aryl group of Ar$^2$ more preferably has 6 to 20 carbon atoms, and particularly preferably has 6 to 12 carbon atoms, and examples thereof include a phenyl group, a p-methylphenyl group, and a naphthyl group.

In the formula (III), the aromatic heterocycles of Ar$^1$ and Ar$^2$ may contain at least one of oxygen, nitrogen, and sulfur atoms, and are preferably 5- or 6-membered aromatic heterocycles containing at least one of oxygen, nitrogen, and sulfur atoms. The aromatic heterocycles may have a substituent if possible, and the substituent may be the substituent T to be hereinafter described.

In the formula (III), specific examples of the aromatic heterocycles of Ar$^1$ and Ar$^2$ include furan, pyrrole, thiophene, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthyridine, quinoxaline, quinazoline, cinnoline, pteridine, acridine, phenanthroline, phenazine, tetrazole, benzimidazole, benzoxazole, benzthiazole, benzotriazole, tetrazaindene, pyrrolotriazole, and pyrazolotriazole. Preferred aromatic heterocycles include benzimidazole, benzoxazole, benzthiazole, and benzotriazole.

In the formula (III), L$^1$ and L$^2$ independently represent a single bond or a divalent linking group. L$^1$ and L$^2$ may be the same or different ones, and L$^2$'s in the repeating units may be the same or different ones.

Preferred examples of the divalent linking groups include —O—, —NR— (in which R represents a hydrogen atom or an alkyl or aryl group that may have a substituent), —CO—, —SO$_2$—, —S—, alkylene groups, substituted alkylene groups, alkenylene groups, substituted alkenylene groups, alkynylene groups, and combinations of two or more thereof. More preferred divalent linking groups include —O—, —NR—, —CO—, —SO$_2$NR—, —NRSO$_2$—, —CONR—, —NRCO—, —COO—, —OCO—, and alkynylene groups. R is preferably a hydrogen atom.

In the invention, in the compound represented by the formula (III), Ar$^1$ is connected to L$^1$ and L$^2$. When Ar$^1$ is a phenylene group, each of L$^1$-Ar$^1$-L$^2$ and L$^2$-Ar$^1$-L$^2$ most preferably has para substitution (1,4-substitution) structure.

In the formula (III), n is an integer of 3 or more, preferably 3 to 7, more preferably 3 to 6, further preferably 3 to 5.

Compounds represented by the following formulae (IV) and (V) can be particularly preferably used as the compound represented by the formula (III).

Formula (IV)

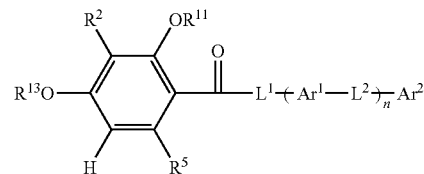

In the formula (IV), R$^2$ and R$^5$ independently represent a hydrogen atom or a substituent, R$^{11}$ and R$^{13}$ independently represent a hydrogen atom or an alkyl group, and L$^1$ and L$^2$ independently represent a single bond or a divalent linking group. Ar$^1$ represents an arylene group or an aromatic heterocycle, Ar$^2$ represents an aryl group or an aromatic heterocycle, n represents an integer of 3 or more, and L$^2$'s and Ar$^1$'s in the n units may be the same or different ones respectively. R$^{11}$ and R$^{13}$ are different from each other, and the alkyl group represented by R$^{13}$ contains no heteroatoms.

In the formula (IV), R$^2$, R$^5$, R$^{11}$, and R$^{13}$ have the same meanings and preferred embodiments as those in the formula (III). Further, also L$^1$, L$^2$, Ar$^1$, and Ar$^2$ have the same meanings and preferred embodiments as those in the formula (III).

Formula (V)

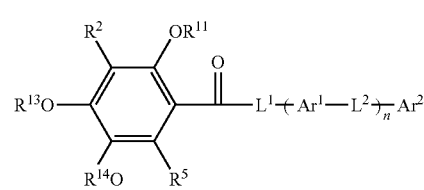

In the formula (V), $R^2$ and $R^5$ independently represent a hydrogen atom or a substituent, $R^{11}$, $R^{13}$, and $R^{14}$ independently represent a hydrogen atom or an alkyl group, and $L^1$ and $L^2$ independently represent a single bond or a divalent linking group. $Ar^1$ represents an arylene group or an aromatic heterocycle, $Ar^2$ represents an aryl group or an aromatic heterocycle, n represents an integer of 3 or more, and $L^2$'s and $Ar^1$'s in the n units may be the same or different ones respectively. $R^{11}$ and $R^{13}$ are different from each other, and the alkyl group represented by $R^{13}$ contains no heteroatoms.

In the formula (V), $R^2$, $R^5$, $R^{11}$, and $R^{13}$ have the same meanings and preferred embodiments as those in the formula (III). Further, also $L^1$, $L^2$, $Ar^1$, and $Ar^2$ have the same meanings and preferred embodiments as those in the formula (III).

In the formula (V), $R^{14}$ represents a hydrogen atom or an alkyl group, and the alkyl group is preferably selected from the above-described preferred examples of the alkyl groups of $R^{11}$ and $R^{13}$. $R^{14}$ is preferably a hydrogen atom or an alkyl group having 1 to 4 carbon atoms, more preferably a hydrogen atom or an alkyl group having 1 to 3 carbon atoms, further preferably a methyl group. $R^{11}$ and $R^{14}$ may be the same or different ones, and are particularly preferably methyl groups.

Also compounds represented by the following formula (V-A) or (V-B) can be preferably used as the compound represented by the formula (V).

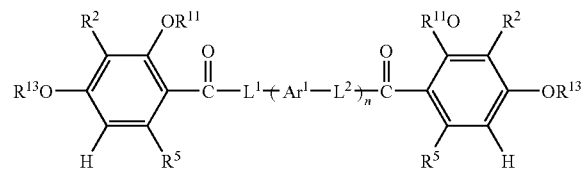

Formula (V-A)

In the formula (V-A), $R^2$ and $R^5$ independently represent a hydrogen atom or a substituent, $R^{11}$ and $R^{13}$ independently represent a hydrogen atom or an alkyl group, and $L^1$ and $L^2$ independently represent a single bond or a divalent linking group. $Ar^1$ represents an arylene group or an aromatic heterocycle, n represents an integer of 3 or more, and $L^1$'s and $Ar^2$'s in the n units may be the same or different ones respectively. $R^{11}$ and $R^{13}$ are different from each other, and the alkyl group represented by $R^{13}$ contains no heteroatoms.

In the formula (V-A), $R^2$, $R^5$, $R^{11}$, $R^{13}$, $L^1$, $L^2$, $Ar^1$, and n have the same meanings and preferred embodiments as those in the formula (III).

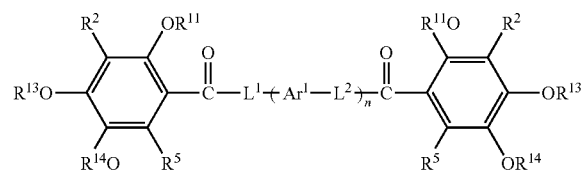

Formula (V-B)

In the formula (V-B), $R^2$ and $R^5$ independently represent a hydrogen atom or a substituent, $R^{11}$, $R^{13}$ and $R^{14}$ independently represent a hydrogen atom or an alkyl group, and $L^1$ and $L^2$ independently represent a single bond or a divalent linking group. $Ar^1$ represents an arylene group or an aromatic heterocycle, n represents an integer of 3 or more, and $L^1$'s and $Ar^2$'s in the n units may be the same or different ones respectively. $R^{11}$ and $R^{13}$ are different from each other, and the alkyl group represented by $R^{13}$ contains no heteroatoms.

In the formula (V-B), $R^2$, $R^5$, $R^{11}$, $R^{13}$, $R^{14}$, $L^{12}$, $L^1$, $Ar^1$, and n have the same meanings and preferred embodiments as those in the formulae (III) and (V).

The above-mentioned substituent T is described below.

Preferred examples of the substituents T include halogen atoms such as a fluorine atom, chlorine atom, bromine atom, and iodine atom; alkyl groups, the carbon number thereof being preferably 1 to 30, such as a methyl group, ethyl group, n-propyl group, isopropyl group, t-butyl group, n-octyl group, and 2-ethylhexyl group; cycloalkyl groups, preferably substituted or unsubstituted cycloalkyl groups having a carbon number of 3 to 30, such as a cyclohexyl group, cyclopentyl group, 4-n-dodecylcyclohexyl group; bicycloalkyl groups, preferably substituted or unsubstituted bicycloalkyl groups having a carbon number of 5 to 30, i.e. monovalent groups provided by removing one hydrogen atom from bicycloalkanes having a carbon number of 5 to 30, such as a bicyclo[1,2,2]heptane-2-yl group and bicyclo[2,2,2]octane-3-yl group; alkenyl groups, preferably substituted or unsubstituted alkenyl groups having a carbon number of 2 to 30, such as a vinyl group and allyl group; cycloalkenyl groups, preferably substituted or unsubstituted cycloalkenyl groups having a carbon number of 3 to 30, i.e. monovalent groups provided by removing one hydrogen atom from cycloalkenes having a carbon number of 3 to 30, such as a 2-cyclopentene-1-yl group and 2-cyclohexene-1-yl; substituted or unsubstituted bicycloalkenyl groups, preferably substituted or unsubstituted bicycloalkenyl groups having a carbon number of 5 to 30, i.e. monovalent groups provided by removing one hydrogen atom from bicycloalkenes having one double bond, such as a bicyclo[2,2,1]hepto-2-ene-1-yl group and bicyclo[2,2,2]octo-2-ene-4-yl; alkynyl groups, preferably substituted or unsubstituted alkynyl groups having a carbon number of 2 to 30, such as an ethynyl group and propargyl group; aryl groups, preferably substituted or unsubstituted aryl groups having a carbon number of 6 to 30, such as a phenyl group, p-tolyl group, and naphtyl group; heterocyclic groups, preferably monovalent groups provided by removing one hydrogen atom from 5 or 6-membered, substituted or unsubstituted, aromatic or nonaromatic heterocycle compounds, more preferably 5 or 6-membered, aromatic heterocyclic groups having a carbon number of 3 to 30, such as a 2-furyl group, 2-thienyl group, 2-pyrimidinyl group, and 2-benzothiazolyl group; a cyano group; a hydroxyl group; a nitro group; a carboxyl group; alkoxy groups, preferably substituted or unsubstituted alkoxy groups having a carbon number of 1 to 30, such as a methoxy group, ethoxy group, isopropoxy group, t-butoxy group, n-octyloxy group, and 2-methoxyethoxy group; aryloxy groups, preferably substituted or unsubstituted aryloxy groups having a carbon number of 6 to 30, such as a phenoxy group, 2-methylphenoxy group, 4-tert-butylphenoxy group, 3-nitrophenoxy group, and 2-tetradecanoylaminophenoxy group; silyloxy groups, the carbon number thereof being preferably 3 to 20, such as a trimethylsilyloxy group and tert-butyldimethylsilyloxy group; heterocyclyloxy groups, preferably substituted or unsubstituted heterocyclyloxy groups having a carbon number of 2 to 30, such as a 1-phenyltetrazole-5-oxy group and 2-tetrahydropyranyloxy group; acyloxy groups, preferably a formyloxy group, substituted or unsubstituted alkylcarbonyloxy groups having a carbon number of 2 to 30, and substituted or unsubstituted arylcarbonyloxy groups having a carbon number of 6 to 30, such as a formyloxy group, acetyloxy group, pivaloyloxy group, stearoyloxy group, benzoyloxy group, and p-methoxyphenylcarbonyloxy group; carbamoyloxy groups, preferably substituted or unsubstituted carbamoyloxy groups having a carbon number of 1 to 30, such as an N,N-dimethylcarbamoyloxy group, N,N-diethylcarbamoyloxy group, morpholinocarbonyloxy group, N,N-di-n-octylaminocarbonyloxy group, and N-n-octylcarbamoyloxy group; alkoxycarbonyloxy groups, preferably substituted or unsubstituted alkoxycarbonyloxy groups having a carbon number of 2 to 30, such as a methoxycarbonyloxy group, ethoxycarbonyloxy group, tert-butoxycarbonyloxy group, and n-octylcarbonyloxy group; aryloxycarbonyloxy groups, preferably substituted or unsubstituted aryloxycarbonyloxy groups having a carbon number of 7 to 30, such as a phenoxycarbonyloxy group, p-methoxyphenoxycarbonyloxy group, and p-n-hexadecyloxyphenoxycarbonyloxy group; amino groups, preferably an amino group, substituted or unsubstituted alkylamino groups having a carbon number of 1 to 30, and substituted or unsubstituted anilino groups having a carbon number of 6 to 30, such as an amino group, methylamino group, dimethylamino group, anilino group, N-methylanilino group, and diphenylamino group; acylamino groups, preferably a formylamino group, substituted or unsubstituted alkylcarbonylamino groups having a carbon number of 1 to 30, and substituted or unsubstituted arylcarbonylamino groups having a carbon number of 6 to 30, such as a formylamino group, acetylamino group, pivaloylamino group, lauroylamino group, and benzoylamino group; aminocarbonylamino groups, preferably substituted or unsubstituted aminocarbonylamino groups having a carbon number of 1 to 30, such as a carbamoylamino group, N,N-dimethylaminocarbonylamino group, N,N-diethylaminocarbonylamino group, and morpholinocarbonylamino group; alkoxycarbonylamino groups, preferably substituted or unsubstituted alkoxycarbonylamino groups having a carbon number of 2 to 30, such as a methoxycarbonylamino group, ethoxycarbonylamino group, tert-butoxycarbonylamino group, n-octadecyloxycarbonylamino group, and N-methyl-methoxycarbonylamino group; aryloxycarbonylamino groups, preferably substituted or unsubstituted aryloxycarbonylamino groups having a carbon number of 7 to 30, such as a phenoxycarbonylamino group, p-chlorophenoxycarbonylamino group, and m-n-octyloxyphenoxycarbonylamino group; sulfamoylamino groups, preferably substituted or unsubstituted sulfamoylamino groups having a carbon number of 0 to 30, such as a sulfamoylamino group, N,N-dimethylaminosulfonylamino group, and N-n-octylaminosulfonylamino group; alkyl- or aryl-sulfonylamino groups, preferably substituted or unsubstituted alkylsulfonylamino groups having a carbon number of 1 to 30 and substituted or unsubstituted arylsulfonylamino groups having a carbon number of 6 to 30, such as a methylsulfonylamino group, butylsulfonylamino group, phenylsulfonylamino group, 2,3,5-trichlorophenylsulfonylamino group, and p-methylphenylsulfonylamino group; a mercapto group; alkylthio groups, preferably substituted or unsubstituted alkylthio groups having a carbon number of 1 to 30, such as a methylthio group, ethylthio group, and n-hexadecylthio group; arylthio groups, preferably substituted or unsubstituted arylthio groups having a carbon number of 6 to 30, such as a phenylthio group, p-chlorophenylthio group, and m-methoxyphenylthio group; heterocyclylthio groups, preferably substituted or unsubstituted heterocyclylthio group having a carbon number of 2 to 30, such as a 2-benzothiazolylthio group and 1-phenyltetrazole-5-yl thio group; sulfamoyl groups, preferably substituted or unsubstituted sulfamoyl groups having a carbon number of 0 to 30, such as an N-ethylsulfamoyl group, N-(3-dodecyloxypropyl)sulfamoyl group, N,N-dimethylsulfamoyl group, N-acetylsulfamoyl group, N-benzoylsulfamoyl group, and N-(N'-phenylcarbamoyl)sulfamoyl group; a sulfo group; alkyl- or aryl-sulfinyl groups, preferably substituted or unsubstituted alkylsulfinyl groups having a carbon number of 1 to 30 and substituted or unsubstituted arylsulfinyl groups having a carbon number of 6 to 30, such as a methylsulfinyl group, ethylsulfinyl group, phenylsulfinyl group, and p-methylphenylsulfinyl group; alkyl- or aryl-sulfonyl groups, preferably substituted or unsubstituted alkylsulfonyl groups having a carbon number of 1 to 30 and substituted or unsubstituted arylsulfonyl groups having a carbon number of 6 to 30, such as a methylsulfonyl group, ethylsulfonyl group, phenylsulfonyl group, and p-methylphenylsulfonyl group; acyl groups, preferably a formyl group, substituted or unsubstituted alkylcarbonyl groups having a carbon number of 2 to 30, substituted or unsubstituted arylcarbonyl groups having a carbon number of 7 to 30, such as an acetyl group and pivaloylbenzoyl group; aryloxycarbonyl groups, preferably substituted or unsubstituted aryloxycarbonyl groups having a carbon number of 7 to 30, such as a phenoxycarbonyl group, o-chlorophenoxycarbonyl group, m-nitrophenoxycarbonyl group, and p-tert-butylphenoxycarbonyl group; alkoxycarbonyl groups, preferably substituted or unsubstituted alkoxycarbonyl groups having a carbon number of 2 to 30, such as a methoxycarbonyl group, ethoxycarbonyl group, tert-butoxycarbonyl group, and n-octadecyloxycarbonyl group; carbamoyl groups, preferably substituted or unsubstituted carbamoyl groups having a carbon number of 1 to 30, such as a carbamoyl group, N-methylcarbamoyl group, N,N-dimethylcarbamoyl group, N,N-di-n-octylcarbamoyl group, and N-(methylsulfonyl)carbamoyl group; aryl- and heterocyclyl-azo groups, preferably substituted or unsubstituted arylazo groups having a carbon number of 6 to 30 and substituted or unsubstituted heterocyclylazo groups having a carbon number of 3 to 30, such as a phenylazo group, p-chlorophenylazo group, and 5-ethylthio-1,3,4-thiadiazole-2-yl azo group; imide groups, preferably an N-succinimido group and N-phthalimido group; phosphino groups, preferably substituted or unsubstituted phosphino groups having a carbon number of 2 to 30, such as a dimethylphosphino group, diphenylphosphino group, and methylphenoxyphosphino group; phosphinyl groups, preferably substituted or unsubstituted phosphinyl groups having a carbon number of 2 to 30, such as a phosphinyl group, dioctyloxyphosphinyl group, and diethoxyphosphinyl group; phosphinyloxy groups, preferably substituted or unsubstituted phosphinyloxy groups having a carbon number of 2 to 30, such as a diphenoxyphosphinyloxy group and dioctyloxyphosphinyloxy group; phosphinylamino groups, preferably substituted or unsubstituted phosphinylamino groups having a carbon number of 2 to 30, such as a dimethoxyphosphinylamino group and dimethylaminophosphinylamino group; and silyl groups, preferably substituted or unsubstituted silyl groups having a carbon number of 3 to 30, such as a trimethylsilyl group, tert-butyldimethylsilyl group, and phenyldimethylsilyl group.

In the above substituents having a hydrogen atom, the hydrogen atom may be removed and further replaced by the above substituent. Examples of such functional groups include alkylcarbonylaminosulfonyl groups, arylcarbonylaminosulfonyl groups, alkylsulfonylaminocarbonyl groups, and arylsulfonylaminocarbonyl groups, and specific examples thereof include a methylsulfonylaminocarbonyl group, p-methylphenylsulfonylaminocarbonyl group, acetylaminosulfonyl group, and benzoylaminosulfonyl group.

Further, when a compound has two or more substituents, the substituents may be the same or different ones, and may be connected to each other to form a ring if possible.

The compound represented by the formula (V-A) is preferably such that $R^{11}$'s are methyl groups, $R^2$'s and $R^5$'s are hydrogen atoms, $R^{13}$ is an alkyl group having 3 or more carbon atoms, $L^1$ is a single bond, —O—, —CO—, —NR—, —SO$_2$NR—, —NRSO$_2$—, —CONR—, —NRCO—, —COO—, —OCO—, or an alkynylene group (in which R is a hydrogen atom, or an alkyl or aryl group that may have a substituent, preferably a hydrogen atom), $L^2$ is —O— or —NR— (in which R is a hydrogen atom, or an alkyl or aryl group that may have a substituent, preferably a hydrogen atom), $Ar^1$ is an arylene group, and n is 3 to 6.

The compounds represented by the formulae (V-A) and (V-B) are illustrated in detail below with reference to specific examples without intention of restricting the scope of the invention.

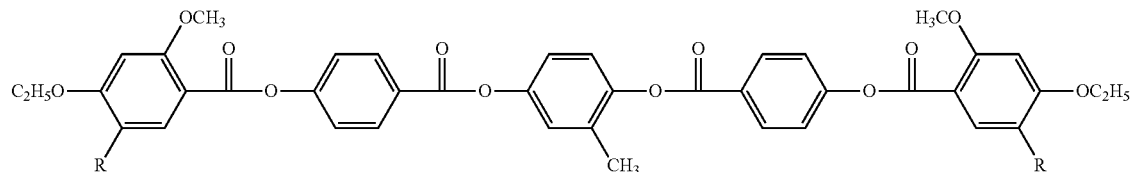

A-101; R = H
B-101; R = OCH$_3$

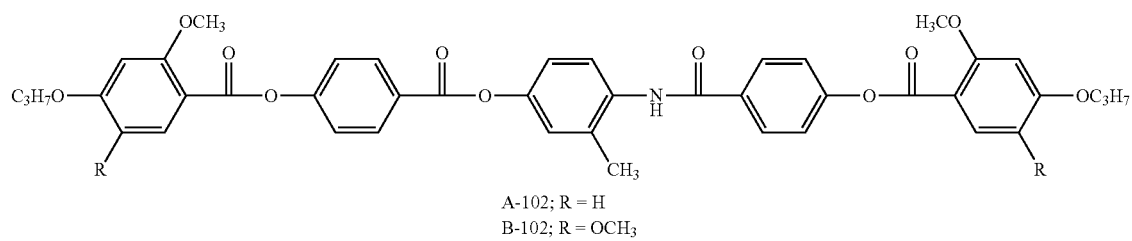

A-102; R = H
B-102; R = OCH$_3$

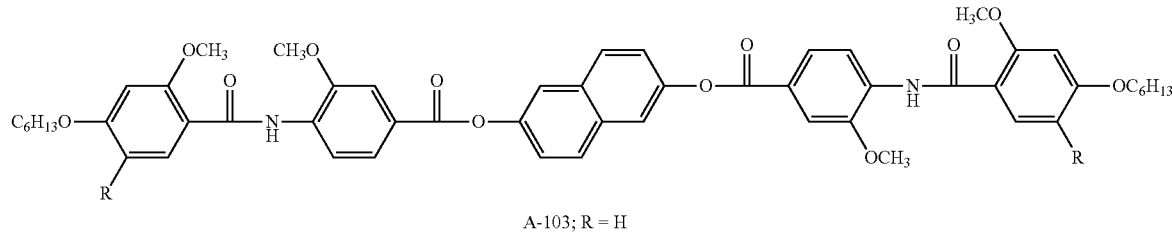

A-103; R = H
B-103; R = OCH$_3$

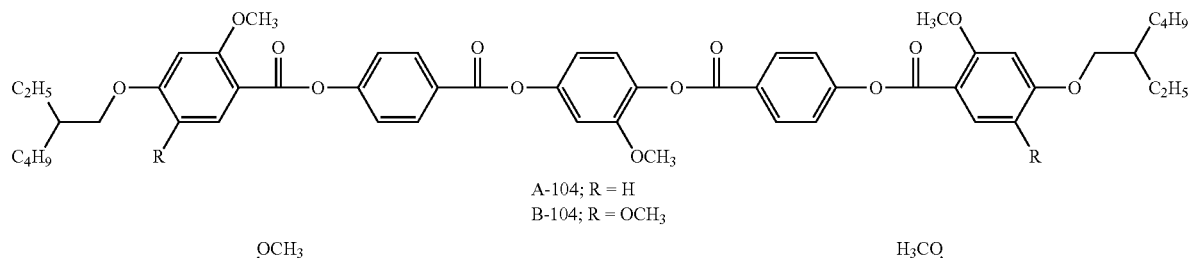

A-104; R = H
B-104; R = OCH$_3$

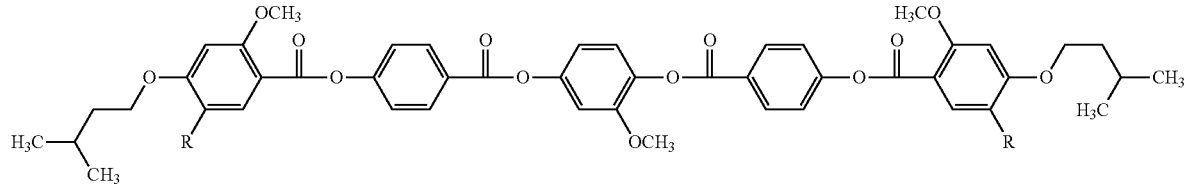

A-105; R = H
B-105; R = OCH$_3$

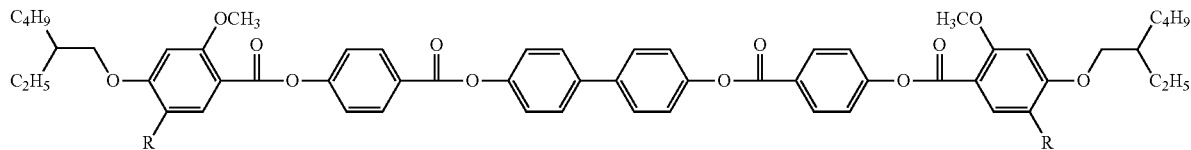

A-106; R = H
B-106; R = OCH$_3$

-continued
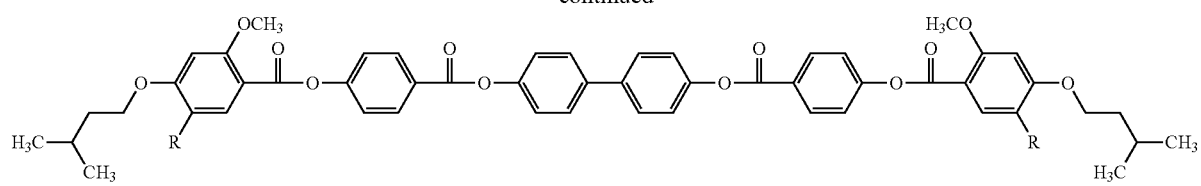
A-107; R = H
B-107; R = OCH₃
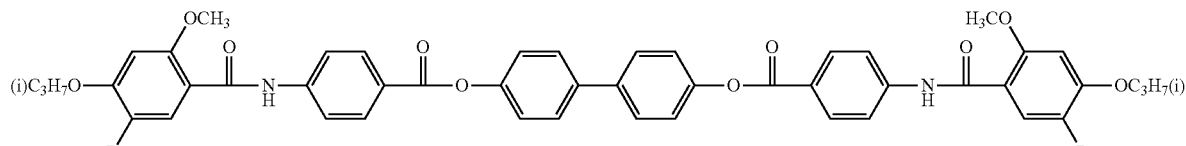
A-108; R = H
B-108; R = OCH₃
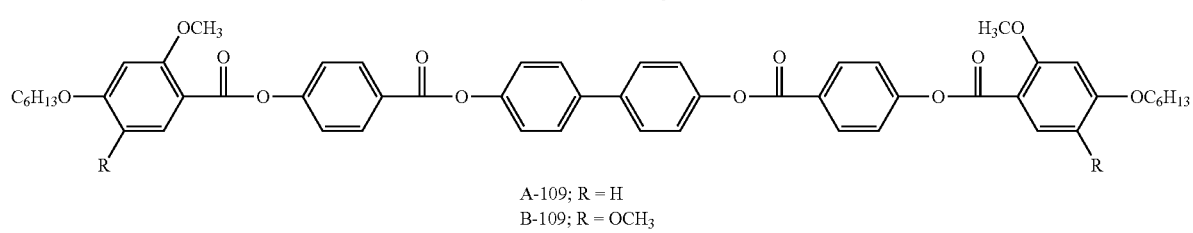
A-109; R = H
B-109; R = OCH₃
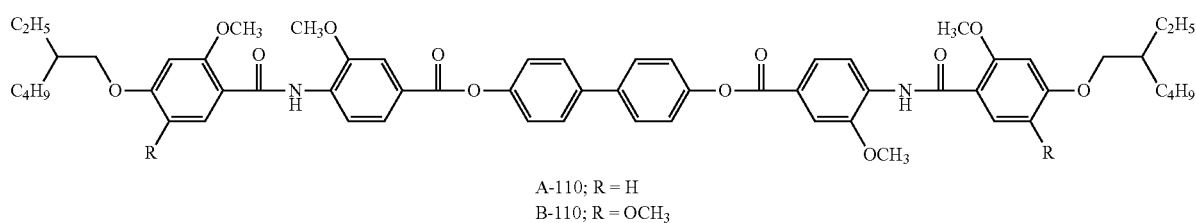
A-110; R = H
B-110; R = OCH₃
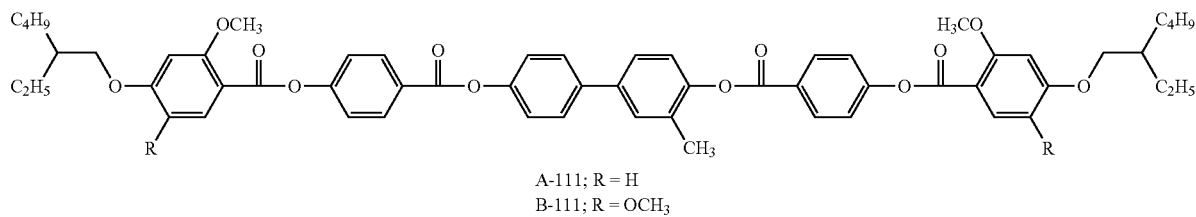
A-111; R = H
B-111; R = OCH₃
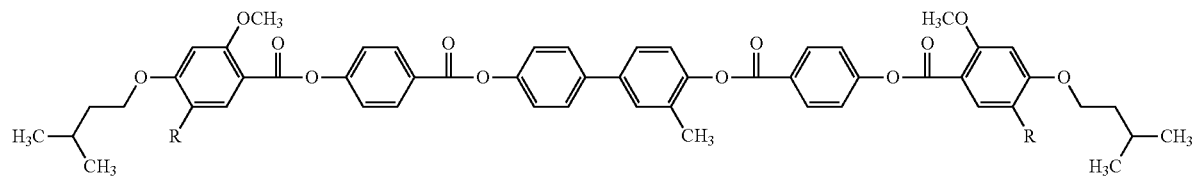
A-112; R = H
B-112; R = OCH₃
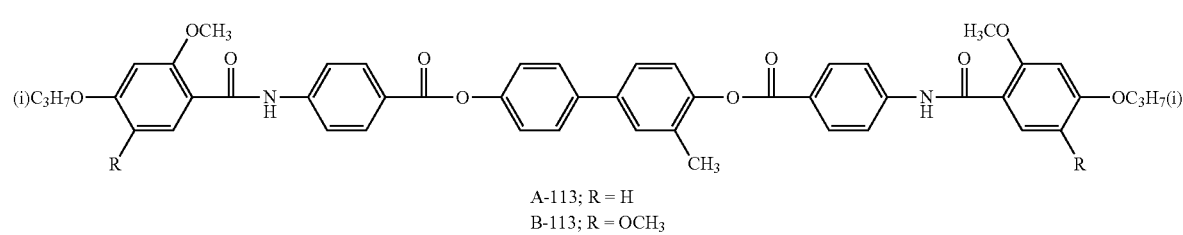
A-113; R = H
B-113; R = OCH₃

-continued
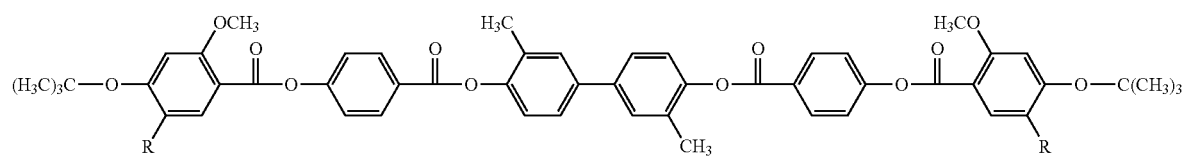
A-114; R = H
B-114; R = OCH₃
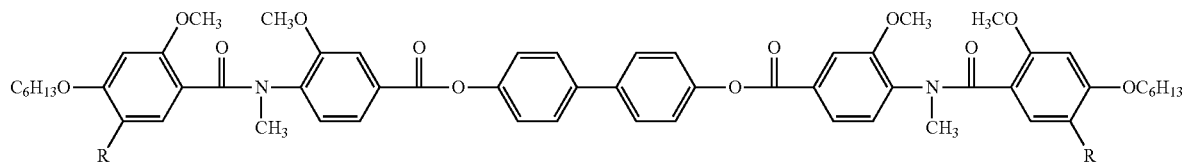
A-115; R = H
B-115; R = OCH₃
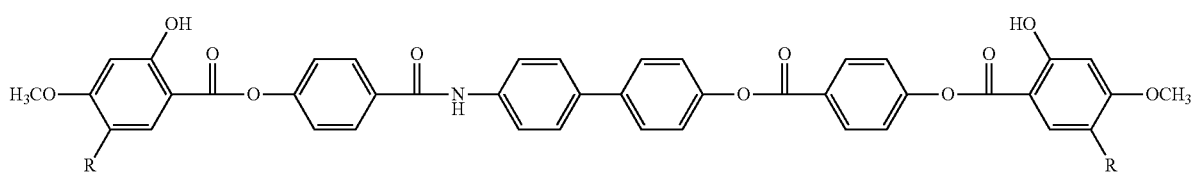
A-116; R = H
B-116; R = OCH₃
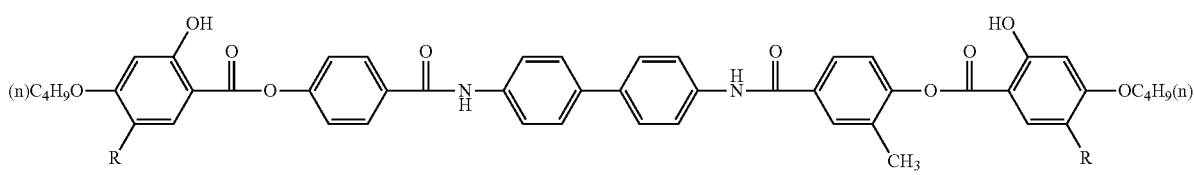
A-117; R = H
B-117; R = OCH₃
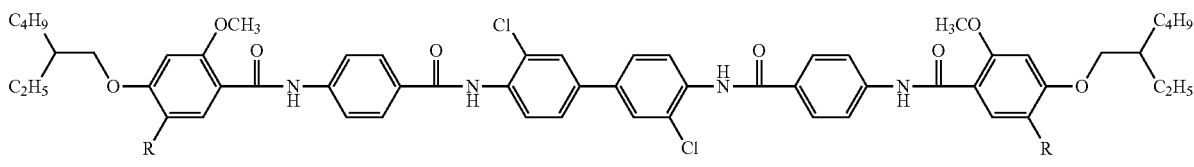
A-118; R = H
B-118; R = OCH₃
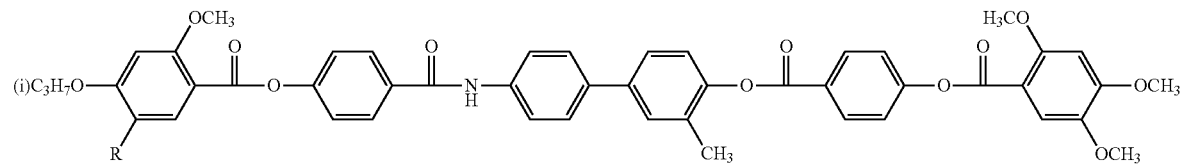
A-119; R = H
B-119; R = OCH₃
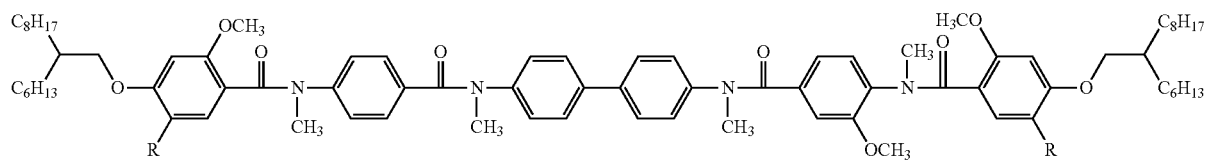
A-120; R = H
B-120; R = OCH₃

-continued
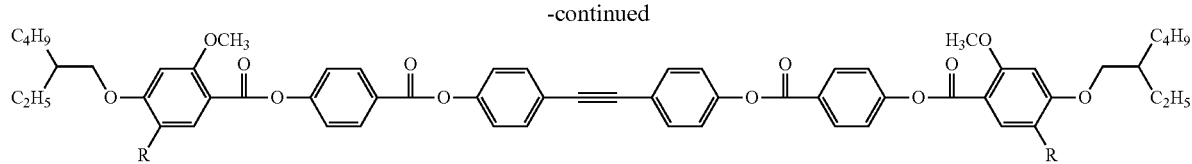
A-121; R = H
B-121; R = OCH₃
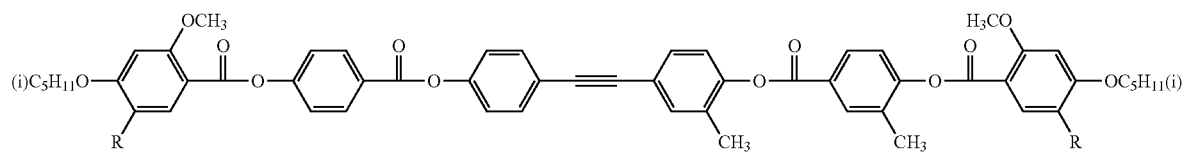
A-122; R = H
B-122; R = OCH₃
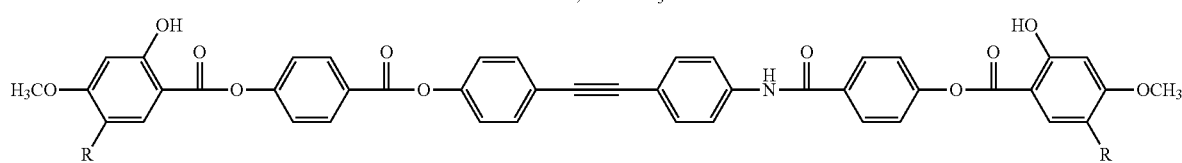
A-123; R = H
B-123; R = OCH₃
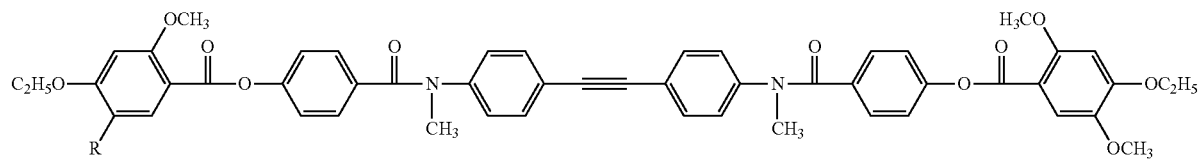
A-124; R = H
B-124; R = OCH₃
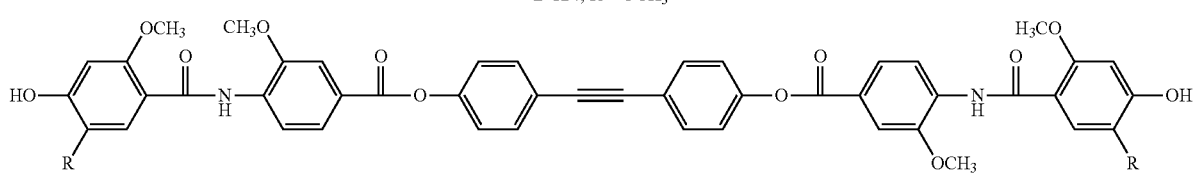
A-125; R = H
B-125; R = OCH₃
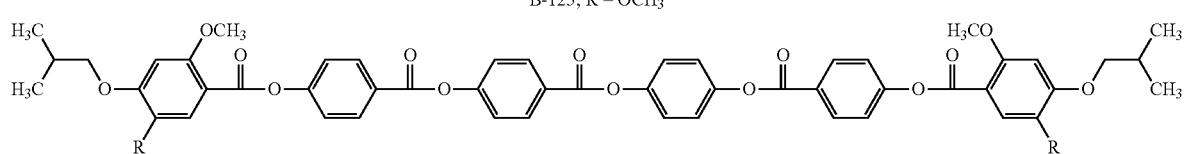
A-126; R = H
B-126; R = OCH₃
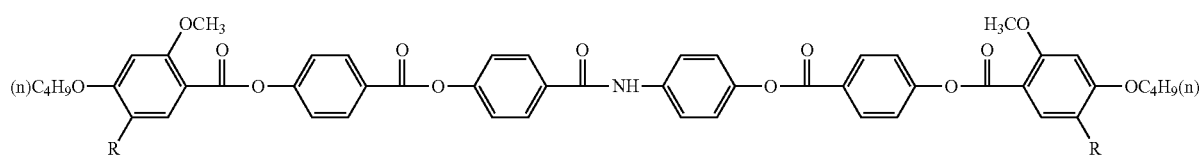
A-127; R = H
B-127; R = OCH₃
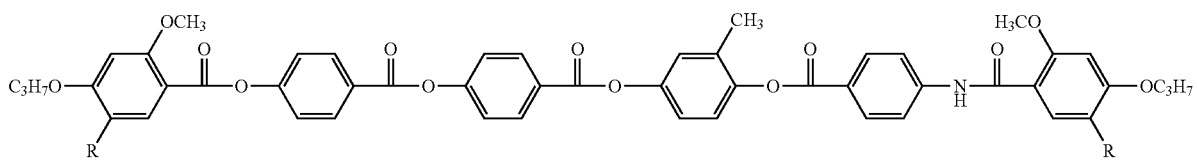
A-128; R = H
B-128; R = OCH₃

-continued
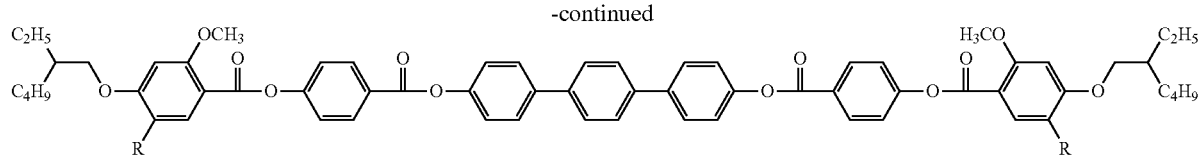
A-129; R = H
B-129; R = OCH₃
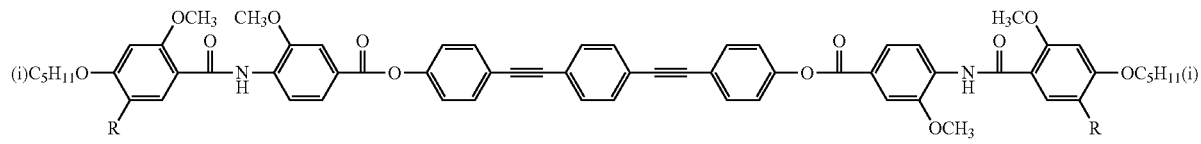
A-130; R = H
B-130; R = OCH₃
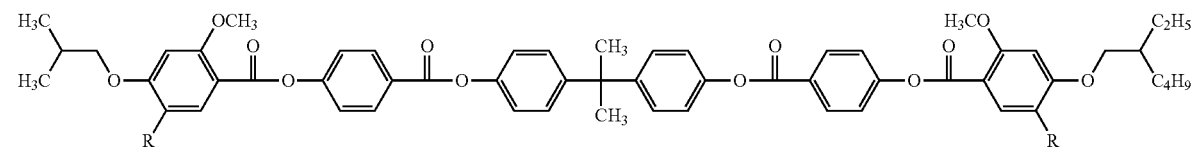
A-131; R = H
B-131; R = OCH₃
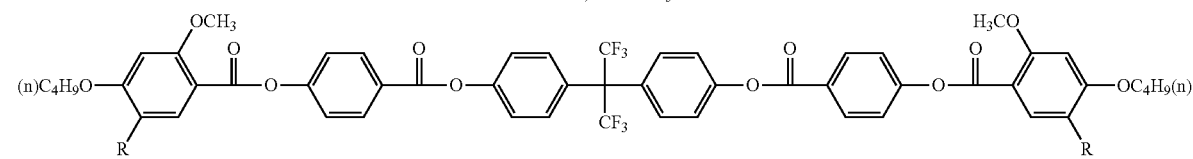
A-132; R = H
B-132; R = OCH₃
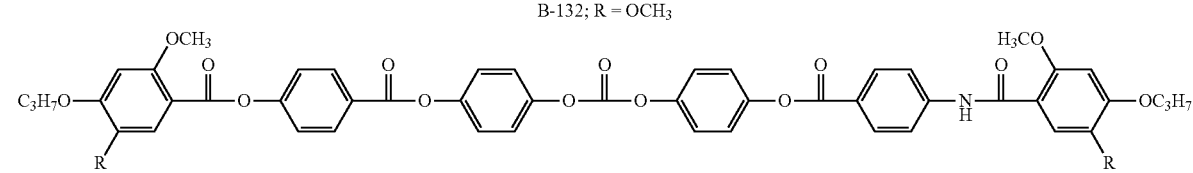
A-133; R = H
B-133; R = OCH₃
C-101
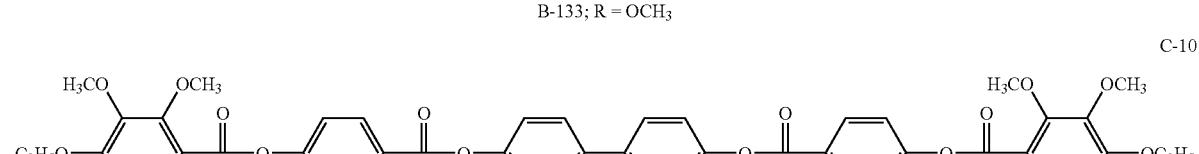
C-102
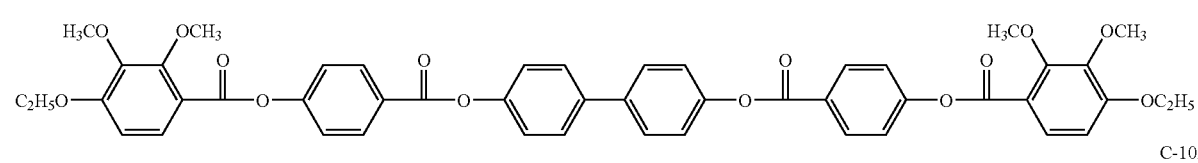
C-103
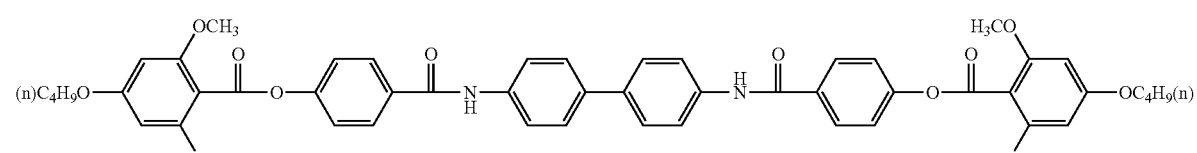
C-104
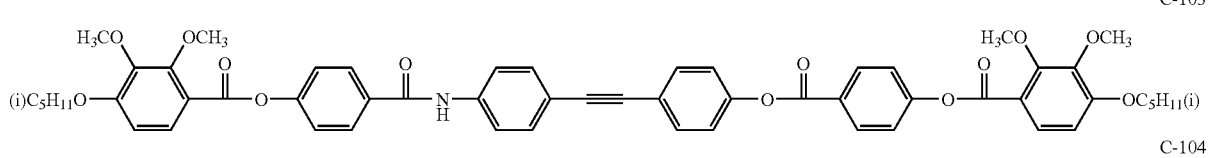
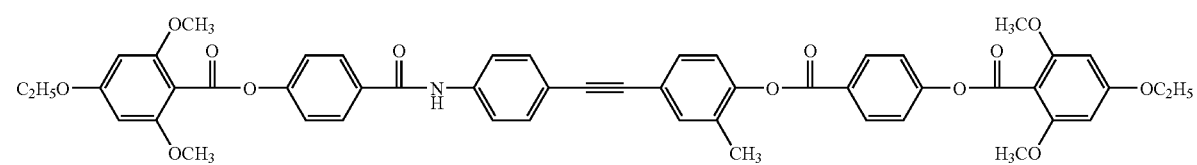

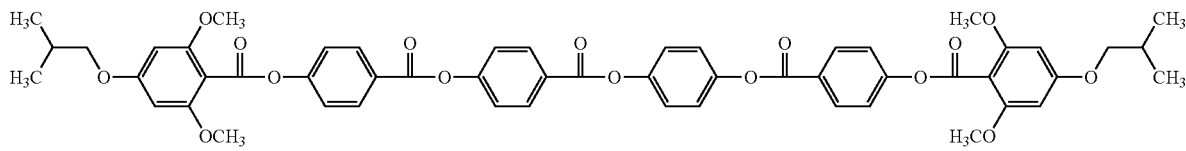

C-105

The compound represented by the formula (III) can be synthesized by preparing a substituted benzoic acid and by carrying out a common esterification or amidation reaction between the substituted benzoic acid and a phenol or aniline derivative. The reaction may be any one as long as it can generate an ester or amide bond. Examples of the reaction methods include methods containing converting the substituted benzoic acid to an acyl halide and condensing the acyl halide with the phenol or aniline derivative, and methods containing dehydration condensation of the substituted benzoic acid and the phenol or aniline derivative using a condensing agent or a catalyst.

It is preferred that the compound represented by the formula (III) is produced by the method containing converting the substituted benzoic acid to the acyl halide and condensing the acyl halide with the phenol or aniline derivative from the viewpoint of the production process.

A reaction solvent used in the production of the compound represented by the formula (III) may be selected from hydrocarbon solvents (preferably toluene and xylene), ether solvents (preferably dimethyl ether, tetrahydrofuran, and dioxane), ketone solvents, ester solvents, acetonitrile, dimethylformamide, and dimethylacetamide. These solvents may be used singly or as a mixed solvent thereof. The solvent is preferably toluene, acetonitrile, dimethylformamide, and dimethylacetamide.

The reaction temperature is preferably 0 to 150° C., more preferably 0 to 100° C., further preferably 0 to 90° C., particularly preferably 20 to 90° C.

It is preferred that a base is not used in the reaction. In the case of using a base, it may be an organic or inorganic base, preferably an organic base, and examples thereof include pyridine and tertiary alkylamine (preferably triethylamine and ethyldiisopropyl amine).

The compounds represented by the formulae (V-A) and (V-B) can be synthesized by known methods. For example, when n is 4, the compounds may be obtained by reacting a starting material having the following structure A with a derivative having a reactive moiety such as a hydroxyl group or an amino group, and by connecting 2 molecules of thus-obtained following intermediate B by 1 molecule of the following compound C. It should be noted that the methods for synthesizing the compounds represented by formulae (V-A) and (V-B) are not limiter to this example.

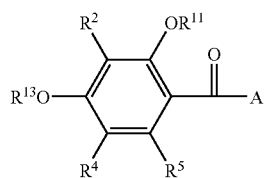

Structure A wherein A represents a reactive moiety such as a hydroxyl group and a halogen atom, $R^{11}$, $R^2$, $R^{13}$, and $R^5$ are the same as above, and $R^4$ is a hydrogen atom or the above substituent represented by $OR^{14}$.

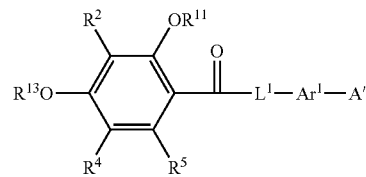

Intermediate B wherein A' represents a reactive group such as a carboxyl group, and $R^{11}$, $R^2$, $R^{13}$, $R^4$, $R^5$, $Ar^1$, and $L^1$ are the same as above.

$$B\text{-}Ar^2\text{-}L^2\text{-}Ar^2\text{-}B'$$

Compound C wherein B and B' each represent a reactive moiety such as a hydroxyl group and an amino group, and $Ar^2$ and $L^2$ have the same meanings as above $Ar^1$ and $L^1$, respectively.

The mass ratio of the Rth generating agent represented by the formulae (I) and (III) to (V) to 100 parts by mass of the cellulose acylate is preferably 0.1 to 30% by mass, more preferably 1 to 25% by mass, most preferably 3 to 15% by mass.

The Rth generating agent may be dissolved in an organic solvent such as an alcohol, methylene chloride, or dioxolane and then added to a cellulose acylate solution (a dope), or alternatively may be added directly to a dope composition.

The Rth generating agents represented by the formulae (I) and (III) to (V) may be used singly or as a mixture of two or more. In the invention, it is preferred that the Rth generating agents represented by the formulae (I) and (III) to (V) are used in combination.

(Ultraviolet Absorbent)

In the cellulose acylate film C used in the invention, an ultraviolet absorbent may act also as an Rth increasing agent.

Examples of the ultraviolet absorbents used in the invention include oxybenzophenone compounds, benzotriazole compounds, salicylic ester compounds, benzophenone compounds, cyanoacrylate compounds, and nickel complex salts, and preferred are benzotriazole compounds with small coloration. Further, also ultraviolet absorbents described in JP-A-10-182621 and JP-A-8-337574, and high-molecular ultraviolet absorbents described in JP-A-6-148430 may be preferably used. In a case of using the cellulose acylate film as a polarizing plate protective film in the invention, the ultraviolet absorbent is preferably excellent in absorptivity for ultraviolet rays with wavelengths of 370 nm or less in view of preventing deterioration of the polarizer and liquid crystal, and has preferably small absorption of visible lights with wavelengths of 400 nm or more in view of liquid crystal display properties.

Specific examples of the benzotriazole ultraviolet absorbent useful in the invention include 2-(2'-hydroxy-5'-methylphenyl)benzotriazole, 2-(2'-hydroxy-3',5'-di-tert-butylphenyl)benzotriazole, 2-(2'-hydroxy-3'-tert-butyl-5'-methylphenyl)benzotriazole, 2-(2'-hydroxy-3',5'-di-tert-butylphenyl)-5-chlorobenzotriazole, 2-(2'-hydroxy-3'-(3", 4",5",6"-tetrahydrophthalimidomethyl)-5'-methylphenyl) benzotriazole, 2,2-methylene bis(4-(1,1,3,3-tetramethylbutyl)-6-(2H-benzotriazole-2-yl)phenol), 2-(2'-hydroxy-3'-tert-butyl-5'-methylphenyl)-5-chlorobenzotriazole, 2-(2H-benzotriazole-2-yl)-6-(straight or branched dodecyl)-4-methylphenols, and mixtures of octyl-3-[3-tert-butyl-4-hydroxy-5-(chloro-2H-benzotriazole-2-yl)phenyl]propionate and 2-ethylhexyl-3-[3-tert-butyl-4-hydroxy-5-(5-chloro-2H-benzotriazole-2-yl)phenyl]propionate, though the ultraviolet absorbent is not limited to the specific examples. Further, commercially available, TINUVIN 109, TINUVIN 171, and TINUVIN 326 (available from Ciba Specialty Chemicals) can be preferably used.

<Cellulose Acylate>

Next the cellulose acylate used for the cellulose acylate film C in the invention is described below.

The cellulose acylate preferably has an acetylation degree of 2.00 to 2.90. The acetylation degree is more preferably 2.2 to 2.8.

The weight average polymerization degree of the cellulose acetate in the cellulose acylate film C is preferably 350 to 800, more preferably 370 to 600. The number average molecular weight of the cellulose acylate is preferably 70,000 to 230,000, more preferably 75,000 to 230,000, most preferably 78,000 to 120,000.

The cellulose acetate for the cellulose acylate film C may be produced from the same materials by the same synthesis method as the cellulose acylate for the cellulose acylate film A.

The dope preparation, casting, drying, and peeling steps for producing the cellulose acylate film C may be the same as those for producing the cellulose acylate film A.

(Stretching)

The cellulose acylate film C used in the invention may be stretched. The stretching is preferably uniaxial stretching in the width direction, or biaxial stretching in the width direction and the transport direction.

Methods for stretching in the width direction are described in JP-A-62-115035, JP-A-4-152125, JPA-4-284211, JP-A-4-298310, JP-A-11-48271, etc.

The film is stretched under ordinary temperature or a heating condition. The heating temperature is preferably equal to or less than the glass-transition temperature of the film. The film may be stretched during the drying, and can be efficiently stretched particularly in a case where a solvent remains in the film. In the case of stretching the film in the longitudinal direction, for example, the film may be stretched by controlling the transporting rollers such that the speed of winding the film is higher than the speed of peeling the film. In the case of stretching the film in the width direction, the film may be stretched such that the film is transported with the ends held by a tenter, the width of the tenter being gradually increased. After drying, the film may be stretched by a stretching apparatus, and is preferably stretched by uniaxial stretching using a long stretching apparatus.

The biaxial stretching includes simultaneous biaxial stretching and successive biaxial stretching. The successive biaxial stretching is preferred in view of successive production. After the dope is cast, a film may be peeled off from a band or drum, stretched in the width direction (or the longitudinal direction), and further stretched in the longitudinal direction (or the width direction).

In the case of uniaxial stretching in the width direction, the stretch ratio of the cellulose acylate film is preferably 1.0 to 1.1 times, more preferably 1.02 to 1.07 times.

In the biaxial stretching, the stretch ratios in the transport direction and the width direction preferably satisfy the following inequality (D): 0.01<(Stretch ratio in vertical direction)−(Stretch ratio in horizontal direction)<0.1.

The inequality (D) is more preferably 0.02<(Stretch ratio in vertical direction)−(Stretch ratio in horizontal direction) <0.08.

By controlling the stretch ratios in the above range, the alignment of the cellulose acylate molecular chain generated in the transporting step is removed, the Re of the film can be controlled within a preferred range, and the surface properties can be remarkably improved.

[Thickness of Cellulose Acylate Film C]

The thickness of the stretched cellulose acylate film used in the invention is preferably 10 to 200 μm, more preferably 20 to 150 μm, most preferably 30 to 100 μm.

[Saponification]

The cellulose acylate films A and C used in the invention (hereinafter referred to as cellulose acylate films) may be subjected to an alkali saponification treatment, thereby improving the adhesion to a polarizer material such as a polyvinyl alcohol, to be uses as the polarizing plate protective films.

The alkali saponification treatment of the cellulose acylate films is preferably such that a film surface is soaked in an alkali solution, neutralized by an acidic solution, washed with water, and dried. The alkali solution may be a potassium hydroxide solution or a sodium hydroxide solution, and the hydroxide ion concentration thereof is preferably 0.1 to 5.0 mol/L, more preferably 0.5 to 4.0 mol/L. The temperature of the alkali solution is preferably within a range of room temperature to 90° C., more preferably within a range of 40 to 70° C.

<Production of Polarizing Plate>

(Polarizer)

A polarizer used in a polarizing plate in the invention is described below.

In the invention, the polarizer is preferably composed of a polyvinyl alcohol (PVA) and a dichroic molecule, and may be a polyvinylene polarizer prepared by subjecting a PVA or polyvinyl chloride to dehydration or dechlorination and by aligning the generated polyene structure as described in JP-A-11-248937.

The PVA is preferably a polymer material obtained by saponifying a polyvinyl acetate, and may contain a component capable of copolymerizing with vinyl acetate, such as an unsaturated carboxylic acid, an unsaturated sulfonic acid, an olefin, or a vinyl ether. Further, modified PVAs having an acetoacetyl group, sulfonic acid group, carboxyl group, oxyalkylene group, etc. may be used in the invention.

The saponification degree of the PVA is not particularly limited, and is preferably 80 to 100 mol %, particularly preferably 90 to 100 mol %, from the viewpoint of solubility, etc. The polymerization degree of the PVA is not particularly limited, preferably 1,000 to 10,000, particularly preferably 1,500 to 5,000.

It is preferred that the syndiotacticity of the PVA is 55% or more in view of improving the durability as described in Japanese Patent No. 2978219. It is also preferred that the syndiotacticity is 45 to 52.5% as described in Japanese Patent No. 3317494.

It is preferred that the PVA is formed into a film and then a dichroic molecule is introduced to prepare the polarizer. Generally the PVA film is preferably produced by casting a liquid prepared by dissolving a PVA-based resin in water or an organic solvent. The polyvinyl alcohol-based resin concentration of the liquid is generally 5 to 20% by mass, and a 10 to 200-μm-thick PVA film may be formed by casting the liquid. The PVA film can be produced with reference to Japanese Patent No. 3342516, JP-A-09-328593, JP-A-2001-302817, JP-A-2002-144401, etc.

The crystallinity degree of the PVA film is not particularly limited. The average crystallinity degree (Xc) may be 50 to 75% by mass as described in Japanese Patent No. 3251073, and the crystallinity degree may be 38% or less to reduce the in-plane hue unevenness as described in JP-A-2002-236214.

The PVA film preferably has a small birefringence (Δn), and the birefringence is preferably $1.0 \times 10^{-3}$ or less as described in Japanese Patent No. 3342516. The birefringence of the PVA film may be 0.002 to 0.01 to obtain a high polarization degree while preventing breakage of the PVA film in the stretching step as described in JP-A-2002-228835. Further, the value of (nx+ny)/2−nz may be 0.0003 to 0.01 as described in JP-A-2002-060505. The Re(1090) of the PVA film is preferably 0 to 100 nm, further preferably 0 to 50 nm. Further, the Rth(1090) of the PVA film is preferably 0 to 500 nm, further preferably 0 to 300 nm.

Additionally, a PVA film having a bonding 1,2-glycol amount of 1.5 mol % or less described in Japanese Patent No. 3021494, a PVA film having 500 or less optically foreign substances of 5 μm or more in size per 100 cm² described in JP-A-2001-316492, a PVA film having a hot water breaking temperature of 1.5° C. or lower in the TD direction described in JP-A-2002-030163, and a PVA film prepared from a solution containing 1 to 100 parts by mass of 3 to 6-polyvalent alcohol such as glycerin or 15% by mass or more of a plasticizer described in JP-A-06-289225 can be preferably used for the polarizing plate in the invention.

The film thickness of the unstretched PVA film is not particularly limited, preferably 1 μm to 1 mm, particularly preferably 20 to 200 μm from the viewpoint of the film stability and uniform stretching. Such a thin PVA film that 10 N or less of stress is generated in the stretching in water at a ratio of 4 to 6 times may be used as described in JP-A-2002-236212.

The dichroic molecule may be a higher iodine ion such as $I_3^-$ or $I_5^-$, or a dichroic dye. The higher iodine ion is particularly preferably used in the invention. The higher iodine ion can be generated such that the PVA is soaked in a liquid prepared by dissolving iodine in an aqueous potassium iodide solution and/or an aqueous boric acid solution to adsorb the iodine to the PVA as described in *Henkoban no Oyo*, Ryo Nagata, CMC and *Kogyo Zairyo*, Vol. 28, No. 7, Page 39 to 45.

In the case of using the dichroic dye as the dichroic molecule, the dichroic dye is preferably an azo dye, particularly preferably a bisazo or trisazo dye. The dichroic dye is preferably water-soluble, and thus a hydrophilic substituent such as a sulfonic acid group, an amino group, or a hydroxyl group is preferably introduced to a dichroic molecule, to generate a free acid, an alkaline metal salt, an ammonium salt, or an amine salt.

Specific examples of the dichroic dyes include benzidine dyes such as C.I. Direct Red 37, Congo Red (C.I. Direct Red 28), C.I. Direct Violet 12, C.I. Direct Blue 90, C.I. Direct Blue 22, C.I. Direct Blue 1, C.I. Direct Blue 151, and C.I. Direct Green 1; diphenylurea dyes such as C.I. Direct Yellow 44, C.I. Direct Red 23, and C.I. Direct Red 79; stilbene dyes such as C.I. Direct Yellow 12; dinaphtylamine dyes such as C.I. Direct Red 31; J acid dyes such as C.I. Direct Red 81, C.I. Direct Violet 9, and C.I. Direct Blue 78.

In addition, the dichroic dyes preferably used in the invention include C.I. Direct Yellow 8, C.I. Direct Yellow 28, C.I. Direct Yellow 86, C.I. Direct Yellow 87, C.I. Direct Yellow 142, C.I. Direct Orange 26, C.I. Direct Orange 39, C.I. Direct Orange 72, C.I. Direct Orange 106, C.I. Direct Orange 107, C.I. Direct Red 2, C.I. Direct Red 39, C.I. Direct Red 83, C.I. Direct Red 89, C.I. Direct Red 240, C.I. Direct Red 242, C.I. Direct Red 247, C.I. Direct Violet 48, C.I. Direct Violet 51, C.I. Direct Violet 98, C.I. Direct Blue 15, C.I. Direct Blue 67, C.I. Direct Blue 71, C.I. Direct Blue 98, C.I. Direct Blue 168, C.I. Direct Blue 202, C.I. Direct Blue 236, C.I. Direct Blue 249, C.I. Direct Blue 270, C.I. Direct Green 59, C.I. Direct Green 85, C.I. Direct Brown 44, C.I. Direct Brown 106, C.I. Direct Brown 195, C.I. Direct Brown 210, C.I. Direct Brown 223, C.I. Direct Brown 224, C.I. Direct Black 1, C.I. Direct Black 17, C.I. Direct Black 19, C.I. Direct Black 54, and dyes described in JP-A-62-70802, JP-A-1-161202, JP-A-1-172906, JP-A-1-172907, JP-A-1-183602, JP-A-1-248105, JP-A-1-265205, and JP-A-7-261024. Two or more dichroic dyes may be used in combination to obtain various hues. In the case of using the dichroic dye, the adsorption thickness may be 4 μm or more as described in JP-A-2002-082222.

The ratio of the dichroic molecule to the film matrix of the polyvinyl alcohol-based polymer is generally controlled within a range of 0.01 to 5% by mass. Too low dichroic molecule content results in reduction of polarization degree, and excessively high dichroic molecule content results in reduction of the single-plate transmittance.

The thickness of the polarizer is preferably 5 to 40 μm, more preferably 10 to 30 μm. Further, it is preferred that the thickness ratio of the polarizer to the protective film satisfies the condition of 0.01<A (Polarizer thickness)/B (Protective film thickness)<0.16 as described in JP-A-2002-174727.

Further, the crossing angle between the slow axis of the protective film and the absorption axis of the polarizer may be any one, and it is preferred that the axes are parallel or the crossing angle is an azimuthal angle of 45±20°.

<Production of Polarizing Plate>

Processes for producing the polarizing plate in the invention are described below.

In the invention, the polarizing plate is preferably produced by a method having a swelling step, dyeing step, hardening step, stretching step, drying step, protective film attaching step, and attached film drying step. The order of the dyeing, hardening, and stretching steps may be changed, and some steps may be combined and simultaneously carried out. It is preferred that the film is water-washed after the hardening step as described in Japanese Patent No. 3331615.

In the invention, the swelling, dyeing, hardening, stretching, drying, protective film attaching, and attached film drying steps are particularly preferably carried out in this order. On-line surface evaluation may be carried out in or after the steps.

Though the swelling step is preferably carried out using only water, a polarizing plate matrix may be swelled by an aqueous boric acid solution, thereby controlling the swelling degree to improve the optical performance stability and prevent wrinkling of the matrix in the production line as described in JP-A-10-153709.

The temperature and time of the swelling may be any one, and are preferably 10 to 60° C. and 5 to 2,000 seconds.

The dyeing step may be carried out using a method described in JP-A-2002-86554. The dyeing may be achieved by soaking, application or spraying of an iodine or dye solution, etc. Further, the dyeing may be carried out while controlling the iodine concentration, dyeing bath temperature, and stretch ratio in the bath and while stirring the solution in the bath as described in JP-A-2002-290025.

In the case of using the higher iodine ion as the dichroic molecule, in the dyeing step, a solution prepared by dissolving iodine in an aqueous potassium iodide solution is preferably used to obtain a high-contrast polarizing plate. It is preferred that, in the aqueous iodine-potassium iodide solution, the iodine concentration is 0.05 to 20 g/l, the potassium iodide concentration is 3 to 200 g/l, and the mass ratio of iodine and potassium iodide is 1 to 2,000. The dyeing time is preferably 10 to 1,200 seconds, and the solution temperature is preferably 10 to 60° C. It is more preferred that the iodine concentration is 0.5 to 2 g/l, the potassium iodide concentration is 30 to 120 g/l, the mass ratio of iodine and potassium iodide is 30 to 120, the dyeing time is 30 to 600 seconds, and the solution temperature is 20 to 50° C.

A boron compound such as boric acid or borax may be added to the dyeing solution as described in Japanese Patent No. 3145747.

In the hardening step, the intermediate film is preferably soaked in a crosslinking agent solution or coated with the solution, thereby adding a crosslinking agent to the film. The hardening step may be carried out in several batches as described in JP-A-11-52130.

The crosslinking agent may be an agent described in U.S. Reissue Pat. No. 232897. Also a boron compound such as boric acid or borax may be used as the crosslinking agent. The crosslinking agent is most preferably a boric acid compound though it may be a polyvalent aldehyde for increasing the dimension stability as described in Japanese Patent No. 3357109. In the case of using boric acid as the crosslinking agent in the hardening step, a metal ion may be added to an aqueous boric acid-potassium iodide solution. A compound containing the metal ion is preferably zinc chloride, and zinc salts including zinc halides such as zinc iodide, zinc sulfate, and zinc acetate may be used instead of zinc chloride as described in JP-A-2000-35512.

In the invention, the PVA film is preferably hardened by soaking the film in an aqueous boric acid-potassium iodide solution containing zinc chloride. It is preferred that the boric acid concentration is 1 to 100 g/l, the potassium iodide concentration is 1 to 120 g/l, the zinc chloride concentration is 0.01 to 10 g/l, the hardening time is 10 to 1,200 seconds, and the solution temperature is 10 to 60° C. It is more preferred that the boric acid concentration is 10 to 80 g/l, the potassium iodide concentration is 5 to 100 g/l, the zinc chloride concentration is 0.02 to 8 g/l, the hardening time is 30 to 600 seconds, and the solution temperature is 20 to 50° C.

In the stretching step, a vertical monoaxial stretching method described in U.S. Pat. No. 2,454,515, etc. and a tentering method described in JP-A-2002-86554 can be preferably used. The stretch ratio is preferably 2 to 12 times, more preferably 3 to 10 times. It is preferred that the stretch ratio, the film thickness, and the polarizer thickness satisfies the condition of (Thickness of protective film-attached polarizer/Thickness of film)×(Total stretch ratio)>0.17 as described in JP-A-2002-040256, and that the width of the polarizer taken from final bath and the width of the polarizer at the time of attaching the protective film satisfies the condition of 0.80<(Width of polarizer at attaching protective film/Width of polarizer taken from final bath)<0.95, as described in JP-A-2002-040247.

In the drying step, a known method described in JP-A-2002-86554 may be used, and the drying temperature is preferably 30 to 100° C., and the drying time is preferably 30 seconds to 60 minutes. It is also preferred that a heat treatment for controlling an in-water discoloring temperature at 50° C. or higher is carried out as described in Japanese Patent No. 3148513, and that an aging treatment under controlled temperature and humidity is carried out as described in JP-A-07-325215 and JP-A-07-325218.

In the protective film attaching step, 2 protective films are bonded to both sides of the polarizer after the drying step. It is preferred that an adhesive liquid is applied immediately before the bonding, and the polarizer is sandwiched between and bonded to the protective films by a couple of rollers. It is preferred that the water content of the polarizer is controlled at the time of the bonding, to prevent concavity and convexity like grooves in a record due to the stretching as described in JP-A-2001-296426 and JP-A-2002-86554. In the invention, the water content is preferably 0.1 to 30%.

The adhesive for bonding the polarizer and the protective films is not particularly limited, and examples thereof include PVA-based resins (including PVAs modified with an acetoacetyl group, a sulfonic acid group, a carboxyl group, an oxyalkylene group, etc.) and aqueous boron compound solutions. The adhesive is preferably the PVA-based resin. The thickness of the dried adhesive layer is preferably 0.01 to 5 μm, particularly preferably 0.05 to 3 μm.

It is preferred that, to increase the adhesive strength between the polarizer and the protective films, the protective films are surface-treated to be hydrophilic, and then bonded to the polarizer. The surface treatment is not particularly restricted and may be a known treatment such as a saponification treatment using an alkali solution or a corona treatment. Further, a highly adhesive layer such as a gelatin undercoat layer may be formed after the surface treatment. It is preferred that the contact angle of the protective film surface against water is 50° or less as described in JP-A-2002-267839.

The conditions of drying after the bonding may be those described in JP-A-2002-86554, and the drying temperature is preferably 30 to 100° C. and the drying time is preferably 30 seconds to 60 minutes. Further, it is preferred that an aging treatment under controlled temperature and humidity is carried out as described in JP-A-07-325220.

Each element content of the polarizer is preferably such that the iodine content is 0.1 to 3.0 g/m$^2$, the boron content is 0.1 to 5.0 g/m$^2$, the potassium content is 0.1 to 2.00 g/m$^2$, and the zinc content is 0 to 2.00 g/m$^2$. The potassium content may be 0.2% by mass or less as described in JP-A-2001-166143, and the zinc content may be 0.04% to 0.5% by mass as described in JP-A-2000-035512.

An organic titanium compound and/or an organic zirconium compound may be added to the film in any of the dyeing, stretching, and hardening steps, to increase the dimension stability of the polarizing plate, as described in Japanese Patent No. 3323255. Further, a dichroic dye may be added to control the hue of the polarizing plate.

<Properties Of Polarizing Plate>

(1) Transmittance and Polarization Degree

In the invention, the single-plate transmittance of the polarizing plate is preferably 42.5% to 49.5%, more preferably 42.8% to 49.0%. The polarization degree defined by the following Equation 4 is preferably 99.900% to 99.999%, more preferably 99.940% to 99.995%. The parallel transmittance is preferably 36% to 42%, and the perpendicular transmittance is preferably 0.001% to 0.05%.

$$\text{Polarization degree}(\%) = \sqrt{\{(Pa-Pe)/(Pa+Pe)\}} \quad \text{Equation 1}$$

Pa: Parallel transmittance
Pe: Perpendicular transmittance

The transmittance is defined by the following equation in accordance with JIS Z8701.

$$T = K \int S(\lambda) y(\lambda) \tau(\lambda) d\lambda$$

In the equation, K, $S(\lambda)$, $y(\lambda)$, and $\tau(\lambda)$ are as follows.

$$K = \frac{100}{\int S(\lambda) y(\lambda) d\lambda} \quad \text{Equation 3}$$

$S(\lambda)$: Spectral distribution of standard light for color display
$y(\lambda)$: Color matching function in XYZ system
$\tau(\lambda)$: Spectral transmittance The dichroic ratio defined by the following Equation 5 is preferably 48 to 1215, more preferably 53 to 525.

$$\text{Dichroic ratio}(Rd) = \frac{\log\left[\frac{\text{Single-plate transmittance}}{100} \middle/ \left(1 - \frac{\text{Polarization degree}}{100}\right)\right]}{\log\left[\frac{\text{Single-plate transmittance}}{100} \middle/ \left(1 + \frac{\text{Polarization degree}}{100}\right)\right]} \quad \text{Equation 5}$$

The iodine concentration and the single-plate transmittance may be in ranges described in JP-A-2002-258051, Paragraph 0017.

The wavelength dependency of the parallel transmittance may be lower as described in JP-A-2001-083328 and JP-A-2002-022950. In the case of placing the polarizing plate in the crossed nicols state, the optical property may be in a range described in JP-A-2001-091736, Paragraph 0007, and the relation between the parallel transmittance and the perpendicular transmittance may be in a range described in JP-A-2002-174728, Paragraph 0006.

As described in JP-A-2002-221618, in a light wavelength range of 420 to 700 nm, the standard deviation of parallel transmittance of every 10 nm may be 3 or less, and the minimum values of (Parallel transmittance/Perpendicular transmittance) of every 10 nm may be 300 or more.

Also it is preferred that the parallel transmittance and the perpendicular transmittance of the polarizing plate at a wavelength of 440 nm, those at a wavelength of 550 nm, and those at a wavelength of 610 nm are within ranges described in JP-A-2002-258042, Paragraph 0012 or JP-A-2002-258043, Paragraph 0012.

(2) Hue

The hue of the polarizing plate in the invention is preferably evaluated by using a lightness index L* and chromaticness indexes a* and b* of the L*a*b* calorimetric system with a CIE uniform color space.

Definitions of L*, a*, and b* are described in *Shikisai Kogaku*, Tokyo Denki University Press, etc.

The a* of one polarizing plate is preferably −2.5 to 0.2, more preferably −2.0 to 0. The b* of one polarizing plate is preferably 1.5 to 5, more preferably 2 to 4.5. The a* of a parallel transmitted light in two polarizing plates is preferably −4.0 to 0, more preferably −3.5 to −0.5. The b* of a parallel transmitted light in two polarizing plates is preferably 2.0 to 8, more preferably 2.5 to 7. The a* of a perpendicular transmitted light in two polarizing plates is preferably −0.5 to 1.0, more preferably 0 to 2. The b* of a perpendicular transmitted light in two polarizing plates is preferably −2.0 to 2, more preferably −1.5 to 0.5.

The hue may be evaluated by chromaticity coordinates (x, y) calculated from the above X, Y, and Z. For example, it is preferred that the parallel transmitted light chromaticity ($x_p$, $y_p$) and the perpendicular transmitted light chromaticity ($x_c$, $y_c$) of two polarizing plates are within ranges described in JP-A-2002-214436, Paragraph 0017, JP-A-2001-166136, Paragraph 0007, or JP-A-2002-169024, Paragraph 0005 to 0008, and that the relation between the hue and absorbance is within a range described in JP-A-2001-311827, Paragraph 0005 to 0006.

(3) Viewing Angle Properties

It is preferred that, when the polarizing plate is disposed in the crossed nicols state and a light having a wavelength of 550 nm is injected thereinto, the transmittance ratio and the xy chromaticity differences between a vertically light injection and a light injected from an angle of 45° against the polarizing axis at an angle of 40° against the normal line are within ranges described in JP-A-2001-166135 or JP-A-2001-166137. It is preferred that the ratio $T_{60}/T_0$, in which $T_0$ is a light transmittance of a polarizing plate stack placed in the crossed nicols state in the vertically direction and $T_{60}$ is a light transmittance in the direction at an angle of 60° against the normal line of the stack, is 10,000 or less as described in JP-A-10-068817. It is preferred also that, in a case where a natural light is injected to the polarizing plate from the normal line direction or at an elevation angle of 80° or less, the transmittance difference of transmitted lights is 6% or less in 20 nm within a transmission spectrum wavelength range of 520 to 640 nm as described in JP-A-2002-139625. Further, it is preferred that the brightness difference of the transmitted lights between regions 1 cm away from each other is 30% or less as described in JP-A-08-248201.

(4) Durability (4-1) Temperature and Humidity Durability

When the light transmittance and polarization degree are measured before and after the polarizing plate is left under a temperature of 60° C. and a relative humidity of 95% for 500 hours, the change of the light transmittance and polarization degree are preferably 3% or less based on the absolute values. The change of the light transmittance is particularly preferably 2% or less, and the change of the polarization degree is particularly preferably 1.0% or less, based on the absolute values. Further, it is preferred that the polarizing plate has a polarization degree of 95% or more and a single transmittance of 38% or more after the polarizing plate is left under a temperature of 80° C. and a relative humidity of 90% for 500 hours as described in JP-A-07-077608.

(4-2) Dry Durability

When the light transmittance and polarization degree are measured before and after the polarizing plate is left under a dry condition at 80° C. for 500 hours, the change of the light transmittance and polarization degree are preferably 3% or less based on the absolute values. The change of the light transmittance is particularly preferably 2% or less, and the change of the polarization degree is particularly preferably 1.0% or less, furthermore preferably 0.1% or less, based on the absolute values.

(4-3) Other Durability

Further, it is preferred that the shrinkage ratio of the polarizing plate by leaving the polarizing plate at 80° C. for 2 hours is 0.5% or less as described in JP-A-06-167611. Also it is preferred that, when a stack is prepared by disposing the polarizing plates on the both sides of a glass plate in the crossed nicols state and left at 69° C. for 750 hours, x and y values of the stack are within ranges described in JP-A-10-068818 after the leaving. Furthermore, it is preferred that, when the polarizing plate is left at 80° C. under a relative humidity of 90% for 200 hours, the change of spectral intensity ratio between 105 $cm^{-1}$ and 157 $cm^{-1}$ obtained by Raman spectroscopy is within a range described in JP-A-08-094834 or JP-A-09-197127.

(5) Alignment Degree

More excellent polarization performance is achieved as the alignment degree of the PVA is increased. The alignment degree calculated as order parameter values by polarized Raman scattering or polarized FT-IR, etc. is preferably 0.2 to 1.0. Also it is preferred that difference between an alignment coefficient of a high-molecular segment in the entire amorphous region of the polarizer and an alignment coefficient of occupying molecules (0.75 or more) is at least 0.15 as described in JP-A-59-133509. Further, it is preferred that the alignment coefficient of the amorphous region in the polarizer is 0.65 to 0.85 or that the alignment degree of the higher iodine ion such as $I_3^-$ and $I_5^-$ is 0.8 to 1.0 as an order parameter value as described in JP-A-04-204907.

(6) Other Properties

It is preferred that the shrinkage force per unit width in the absorption axis direction is 4.0 N/cm or less when the polarizing plate is heated at 80° C. for 30 minutes as described in JP-A-2002-006133, that the dimension changes of the polarizing plate in the absorption axis direction and the polarizing axis direction are both within ±0.6% when the polarizing plate is heated at 70° C. for 120 hours as described in JP-A-2002-236213, and that the water content of the polarizing plate is 3% by mass or less as described in JP-A-2002-090546. Further, it is preferred that the surface roughness in a direction vertically to the stretching axis is 0.04 μm or less based on the center line average roughness as described in JP-A-2000-249832, that the refractive index no in the transmission axis direction is 1.6 or more as described in JP-A-10-268294, and that the relation between the polarizing plate thickness and the protective film thickness is within a range described in JP-A-10-111411, Paragraph 0004.

<Functionalization of Polarizing Plate>

The polarizing plate used in the invention may be preferably used as a functionalized polarizing plate by combining with an antireflection film for increasing visibility of the display, a brightness increasing film, or an optical film having a functional layer such as a hard coating layer, a forward scattering layer, or an antiglare (antidazzle) layer.

(Antireflection Film)

The polarizing plate used in the invention may be used in combination with an antireflection film. The antireflection film may be a film with a reflectivity of about 1.5% composed of a single layer of a low refractive material such as a fluorine polymer, or a film with a reflectivity of about 1% utilizing interference of thin layers. In the invention, it is preferred that a low refractive layer and at least one layer having a refractive index higher than that of the low refractive layer (a high refractive layer or an middle refractive layer) are stacked on a transparent support. Further, also antireflection films described in *Nitto Giho*, Vol. 38, No. 1, May 2000, Page 26 to 28, JP-A-2002-301783, etc. may be preferably used in the invention.

The refractive indexes of the layers satisfy the following relations.

Refractive index of high refractive layer>Refractive index of middle refractive layer>Refractive index of transparent support>Refractive index of low refractive layer The transparent support used for the antireflection film may be preferably the above mentioned transparent polymer film for the protective film of the polarizer.

The refractive index of the low refractive layer is preferably 1.20 to 1.55, more preferably 1.30 to 1.50. It is preferred that the low refractive layer is used as the outermost layer having an excoriation resistance and antifouling property. It is also preferred that a silicone-containing compound or a fluorine-containing compound, etc. is used for improving the slipping property of the surface to increase the excoriation resistance.

For example, compounds described in JP-A-9-222503, Paragraph 0018 to 0026, JP-A-11-38202, Paragraph 0019 to 0030, JP-A-2001-40284, Paragraph 0027 to 0028, JP-A-2000-284102, etc. can be preferably used as the fluorine-containing compound.

The silicone-containing compound preferably has a polysiloxane structure. Reactive silicones such as SILAPLANE available from Chisso Corporation and polysiloxanes having silanol end groups described in JP-A-11-258403, etc. can be used as the compound. An organic metal compound such as a silane coupling agent and a silane coupling agent having a particular fluorine-containing hydrocarbon group may be hardened by a condensation reaction in the presence of a catalyst, as described in JP-A-58-142958, JP-A-58-147483, JP-A-58-147484, JP-A-9-157582, JP-A-11-106704, JP-A-2000-117902, JP-A-2001-48590, JP-A-2002-53804, etc.

The low refractive layer may preferably contain another additive such as a filler (e.g. low refractive inorganic compound having an average primary particle size of 1 to 150 nm composed of silicon dioxide (silica) or a fluorine-containing compound (magnesium fluoride, calcium fluoride, barium fluoride, etc.), a fine organic particle described in JP-A-11-3820, Paragraph 0020 to 0038), a silane coupling agent, a slipping agent, or a surfactant.

The low refractive layer may be formed by a gas phase method such as a vacuum deposition method, a sputtering method, an ion plating method, or a plasma CVD method, and is preferably formed by a coating method advantageous in low costs. Preferred examples of the coating methods include dip coating methods, air-knife coating methods, curtain coating methods, roller coating methods, wire bar coating methods, gravure coating methods, and microgravure coating methods.

The thickness of the low refractive layer is preferably 30 to 200 nm, more preferably 50 to 150 nm, most preferably 60 to 120 nm.

The middle refractive layer and the high refractive layer are preferably such that high refractive inorganic compound ultrafine particles with an average particle size of 100 nm or less are dispersed in a matrix material. The high refractive inorganic compound fine particles are preferably composed of an inorganic compound having a refractive index of 1.65 or more such as an oxide of Ti, Zn, Sb, Sn, Zr, Ce, Ta, La, In, etc. or a multiple oxide containing the metal atom.

The ultrafine particles may be used such that the particle surfaces are treated with a surface treatment agent such as a silane coupling agent described in JP-A-11-295503, JP-A-11-153703, JP-A-2000-9908, etc., or an anionic compound or organic metal coupling agent described in JP-A-2001-310432, etc., such that a core-shell structure is formed by using high refractive particles as cores as described in JP-A-

2001-166104, or such that a particular dispersant is used in combination as described in JP-A-11-153703, U.S. Pat. No. 6,210,858B1, JP-A-2002-2776069, etc.

The matrix material may be a known thermoplastic resin or hardening resin coating, etc., and may be a polyfunctional material described in JP-A-2000-47004, JP-A-2001-315242, JP-A-2001-31871, JP-A-2001-296401, etc. or a hardening film derived from a metal alkoxide composition described in JP-A-2001-293818, etc.

The refractive index of the high refractive layer is preferably 1.70 to 2.20. The thickness of the high refractive layer is preferably 5 nm to 10 μm, more preferably 10 nm to 1 μm.

The refractive index of the middle refractive layer is controlled at a value between those of the low refractive layer and the high refractive layer. The refractive index of the middle refractive layer is preferably 1.50 to 1.70.

The haze of the antireflection film is preferably 5% or less, more preferably 3% or less. The strength of the film is preferably H or more, more preferably 2H or more, most preferably 3H or more, in a pencil hardness test in accordance with JIS K5400.

(Brightness Increasing Film)

In the invention, the polarizing plate may be used in combination with a brightness increasing film. The brightness increasing film has a function of separating a circular polarized light or a linearly polarized light, is placed between the polarizing plate and a backlight, and reflects or scatters a circular polarized light or linearly polarized light backward to the backlight. The light reflected by the backlight is in a partly changed polarization state, and is injected again to the brightness increasing film and the polarizing plate. In this case, a part of the light is transmitted therethrough, whereby the light utilization ratio is increased by repeating the processes to improve the front brightness about 1.4 times. In the invention, the polarizing plate may be used in combination with a known brightness increasing film such as an anisotropy reflection type film or an anisotropy scattering type film.

A known anisotropy reflection type brightness increasing film is such that uniaxially stretched films and unstretched films are stacked to enlarge the refractive index difference in the stretch direction, thereby showing a reflectivity and a transmittance anisotropy. Such brightness increasing films include multilayer films using dielectric mirror described in WO 95/17691, WO 95/17692, and WO 95/17699, and cholesteric liquid crystal films described in EP No. 606940A2 and JP-A-8-271731. In the invention, DBEF-E, DBEF-D, and DBEF-M available from 3M is preferably used as the multilayer brightness increasing film using the dielectric mirror principle, and NIPOCS available from Nitto Denko Corporation is preferably used as the cholesteric liquid crystal brightness increasing film. NIPOCS is described in *Nitto Giho*, Vol. 38, No. 1, May 2000, Page 19 to 21, etc.

In the invention, also an anisotropy scattering type brightness increasing film prepared by blending a positive intrinsic birefringence polymer and a negative intrinsic birefringence polymer and by uniaxial stretching, described in WO 97/32223, WO 97/32224, WO 97/32225, WO 97/32226, JP-A-9-274108, and JP-A-11-174231, is preferably used in combination. DRPF-H available from 3M is preferably used as the anisotropy scattering type brightness increasing film.

(Other Functional Optical Film)

In the invention, the polarizing plate is preferably used in combination with a functional optical film having a hard coating layer, a forward scattering layer, an antiglare (antidazzle) layer, a gas barrier layer, a slipping layer, an antistatic layer, an undercoat layer, a protective layer, etc. Further, it is preferred that these functional layers are combined with the antireflection layer of the antireflection film or the optically anisotropic layer in one layer. These functional layers may be formed on one or both of the polarizer side and the opposite side near the air interface.

[Hard Coating Layer]

The polarizing plate is preferably combined with a functional optical film prepared by forming a hard coating layer on a transparent support to improve the mechanical strength such as excoriation resistance. Particularly in the case of forming the hard coating layer in the above antireflection film, the hard coating layer is preferably formed between the transparent support and the high refractive layer.

The hard coating layer is preferably formed by a crosslinking reaction of a hardening compound by light and/or heat, or a polymerization reaction. A hardening functional group of the compound is preferably a photopolymerizable group, and an organic alkoxysilyl compound is preferably used as a hydrolyzable functional group-containing, organic metal compound. A hard coating layer composition described in JP-A-2002-144913, JP-A-2000-9908, and WO 00/46617, etc. is preferably used in the invention.

The thickness of the hard coating layer is preferably 0.2 to 100 μm.

The strength of the hard coating layer is preferably H or more, more preferably 2H or more, most preferably 3H or more, by a pencil hardness test in accordance with JIS K5400. Further, in a taber test according to JIS K5400, the hard coating layer more preferably has a smaller abrasion.

Compounds having an unsaturated ethylenic group and compounds having a ring opening polymerizable group can be used as materials for the hard coating layer, and the compounds may be used singly or in combination. Preferred examples of the compounds having the unsaturated ethylenic groups include polyol polyacrylates such as ethyleneglycol diacrylate, trimethylolpropane triacrylate, ditrimethylolpropane tetraacrylate, pentaerythritol triacrylate, pentaerythritol tetraacrylate, dipentaerythritol pentaacrylate, and dipentaerythritol hexaacrylate; epoxy acrylates such as diacrylate of bisphenol A diglycidyl ether and diacrylate of hexanediol diglycidyl ether; and urethane acrylates prepared by a reaction of a polyisocyanate and a hydroxyl-containing acrylate such as hydroxyethyl acrylate. Examples of commercially available compounds include EB-600, EB-40, EB-140, EB-1150, EB-1290K, IRR214, EB-2220, TMPTA, and TMPTMA available from Daicel ucb, and UV-6300 and UV-1700B available from Nippon Synthetic Chemical Industry Co., Ltd.

Preferred examples of the compounds having a ring opening polymerizable group include glycidyl ethers such as ethylene glycol diglycidyl ether, bisphenol A diglycidyl ether, trimethylolethane triglycidyl ether, trimethylolpropane triglycidyl ether, glycerol triglycidyl ether, triglycidyl trishydroxyethyl isocyanurate, sorbitol tetraglycidyl ether, pentaerythritol tetraglycidyl ether, polyglycidyl ethers of cresol novolac resins, and polyglycidyl ethers of phenol novolac resins; alicyclic epoxys such as CELOXIDE 2021P, CELOXIDE 2081, EPOLEAD GT-301, EPOLEAD GT-401, and EHPE3150CE available from Daicel Chemical Industries, Ltd., and polycyclohexyl epoxymethyl ether of phenol novolac resins; oxetanes such as OXT-121, OXT-221, OX-SQ, and PNOX-1009 available from Toagosei Co., Ltd. Further, polymers of glycidyl(meth)acrylate, and copolymers of glycidyl(meth)acrylate and a monomer copolymerizable therewith may be used for the hard coating layer.

It is preferred that fine particles of oxides of silicon, titanium, zirconium, aluminum, etc., crosslinked particles of polyethylenes, polystyrenes, poly(meth)acrylic esters, polydimethylsiloxanes, etc., and organic crosslinked fine particles such as crosslinked rubber particles of SBR, NBR, etc. are added to the hard coating layer to reduce hardening shrinkage of the hard coating layer, increase the adhesion to the substrate, and reduce curling of the hard coating product. The average particle size of these crosslinked fine particles is preferably 1 to 20,000 nm. The shape of the crosslinked fine particles is not particularly limited, and may be a spherical shape, rod-like shape, needle-like shape, tabular shape, etc. The amount of the fine particles is preferably such that the fine particle content of the hardened hard coating layer is 60% or less by volume. The fine particle content is more preferably 40% or less by volume.

In the case of adding the above described inorganic fine particles, which are poor in affinity for binder polymers generally, a surface treatment is preferably carried out using a surface treatment agent having a metal such as silicon, aluminum, or titanium, and a functional group such as an alkoxide group, a carboxylic acid group, a sulfonic acid group, or a phosphonic acid group.

The hard coating layer is hardened preferably by heat or an activation energy ray, and more preferably by an activation energy ray such as a radioactive ray, a gamma ray, an alpha ray, an electron ray, or a ultraviolet ray, and particularly preferably by an electron ray or a ultraviolet ray in view of safeness and productivity. In the case of the heat hardening, the heating temperature is preferably 140° C. or lower, more preferably 100° C. or lower, in view of the heat resistance of the plastic.

[Forward Scattering Layer]

The forward scattering layer is used for improving the viewing angle properties (the hue and brightness distribution) in the directions of up, down, left, and right, of the liquid crystal display device containing the polarizing plate according to the invention. In the invention, the forward scattering layer is preferably composed of fine particles with different refractive indexes dispersed in a binder. For example, the forward scattering layer may have such a structure that the forward scattering coefficient is particularly controlled as described in JP-A-11-38208, that relative refractive indexes of a transparent resin and fine particles are particularly controlled as described in JP-A-2000-199809, or that the haze is controlled at 40% o more as described in JP-A-2002-107512. Further, it is preferred that the polarizing plate is used in combination with LUMISTY described in Sumitomo Chemical Co., Ltd., *Technical Report, Optical functional film*, page 31 to 39 to control the haze viewing angle properties.

[Antiglare Layer]

The antiglare (antidazzle) layer is used for scattering a reflected light to prevent glare. The antiglare function is obtained by forming concavity and convexity on the outermost surface of the liquid crystal display device. The haze of the optical film having the antiglare function is preferably 3 to 30%, more preferably 5 to 20%, most preferably 7 to 20%.

The concavity and convexity is preferably formed on the film surface by a method of adding fine particles (JP-A-2000-271878, etc.), a method of adding a small amount (0.1 to 50% by mass) of relatively large particles having a size of 0.05 to 2 μm (JP-A-2000-281410, JP-A-2000-95893, JP-A-2001-100004, JP-A-2001-281407, etc.), or a method of physically transferring the concavity and convexity to the film surface (such as a embossing method described in JP-A-63-278839, JP-A-11-183710, JP-A-2000-275401, etc.)

<Liquid Crystal Display Device>

The liquid crystal display device of the invention is described below.

FIG. 1 is a schematic view showing an example of the liquid crystal display device according to the invention. In FIG. 1, a liquid crystal display device 10 has a liquid crystal cell containing a liquid crystal layer 7, and an upper electrode substrate 5 and a lower electrode substrate 8 disposed thereon, and has an upper polarizing plate 1 and a lower polarizing plate 12 disposed on the both sides of the liquid crystal cells. A color filter may be disposed between the liquid crystal cell and the polarizing films. When the liquid crystal display device 10 is a transmission type device, a backlight using a light source such as a cold or hot cathode fluorescent tube, a light emitting diode, a field emission device, or an electroluminescent device is disposed on the back side.

The upper and lower polarizing plates 1 and 12 are each composed of a polarizer sandwiched between two protective films. In the liquid crystal display device 10 of the invention, the protective film facing the cell in one of the polarizing plate has the properties of the above inequalities (1) to (5), and the protective film facing the cell in the other polarizing plate has the properties of the above inequalities (6) to (10). In the liquid crystal display device 10 of the invention, a transparent protective film, a polarizer, and a cellulose acylate film are preferably stacked in this order from the outside of the device (from the side farther from the liquid crystal cell). The liquid crystal display device 10 may be a direct view type, projection type, or optical modulation type display. The invention is particularly efficiently applied to active matrix liquid crystal display devices using 3- or 2-terminal semiconductor elements such as TFT and MIM. The invention may be efficiently applied also to passive matrix liquid crystal display devices as represented by STN mode, which is so-called time division operation.

(VA Mode)

The liquid crystal display device of the invention preferably has a VA mode liquid crystal cell.

In the case of the VA mode, a liquid crystal having Δn of about 0.0813 and Δ∈ of negative value −4.6 is enclosed between the upper and lower substrates. The alignment of the liquid crystal can be controlled by rubbing, and the director representing the alignment direction of the liquid crystal molecules, the tilt angle, is preferably about 89°. In the FIG. 1, the thickness d of the liquid crystal layer 7 is 3.5 μm. The brightness at the white display depends on the product Δnd of the thickness d and the refractive index anisotropy Δn. Thus the thickness of the liquid crystal layer is controlled in a range of 0.2 to 0.5 μm to obtain a maximum brightness.

The absorption axis 2 of the upper polarizing plate 1 in the liquid crystal cell is approximately perpendicular to the absorption axis 13 of the lower polarizing plate 12. A transparent electrode (not shown) is formed on the inner surface of the alignment film disposed on each of the upper and lower electrode substrates 5 and 8. In the non-driving state where a driving voltage is not applied to the electrodes, the liquid crystal molecules in the liquid crystal layer 7 are aligned approximately perpendicular to the substrate, so that the polarization state of a light that passes through the liquid crystal panel is hardly changed. Thus, the liquid crystal display device shows ideal black display in the non-driving state. On the other hand, in the driving state, the liquid crystal molecules are aligned approximately parallel to the substrate, so that the polarization state of the light that passes through the liquid crystal panel is changed by the tilted liquid crystal molecules. Thus, the liquid crystal display device shows white display in the driving state. In FIG. 1, the signs 6 and 9 represent the alignment control directions.

An electric field is applied to the upper and lower substrates, whereby the used liquid crystal material has a negative dielectric anisotropy and is such that the liquid crystal molecules are aligned perpendicularly to the electric field direction. In a case where an electrode is placed on one substrate, and an electric field is applied in the longitudinal direction parallel to the substrate, the liquid crystal material having a positive dielectric anisotropy is used.

In the VA mode liquid crystal display device, A chiral agent, which is commonly used for TN mode liquid crystal display devices, is not often used because it deteriorates the dynamic response characteristic. A chiral agent may be added to reduce alignment defects in some cases.

The VA mode is characterized by high-speed response and high contrast. However, the contrast is lowered in the oblique direction though it is high at the front. The liquid crystal molecules are aligned perpendicular to the substrate surface at the time of black level. When the display is observed at the front, the transmittance is low and the contrast is high because the liquid crystal molecules have little birefringence. However, when the diplay is observed from an oblique direction, the liquid crystal molecules show a birefringence. The angle between the absorption axes of the upper and lower polarizing plates is more than 90° from an oblique direction, though it is 90° at the front. By the two factors, light leakage is caused and the contrast is reduced in the oblique direction. An optical compensatory sheet is added to solve the problem.

Further, the liquid crystal molecules are tilted at the time of white level, and in the tilted direction and the opposite direction, the birefringences of the liquid crystal molecules are different from the oblique direction, resulting in different brightness and color hue. To solve the problem, one pixel of the liquid crystal display device is divided into a plurality of domains to form a multidomain structure.

[Multidomain]

For example, in the VA mode, when an electric field is applied to the liquid crystal molecules, the molecules are tilted in different domains in one pixel, thereby averaging the viewing angle properties. The alignment of the one pixel may be divided by forming a slit in the electrode, or by forming a projection to change the electric field direction or make an electric field density deviation. To obtain constant viewing angles in all the directions, the number of the domains has to be increased. Approximately constant viewing angles can be obtained by dividing into 4 or 8 domains. When the pixel is divided into 8 domains, the polarizing plate absorption axis can be preferably controlled at a desired angle.

In the boundary of the domains, the liquid crystal molecules are hardly likely to respond. Thus, in the normally black display, the black level of display is maintained, thereby resulting in brightness reduction. The boundary area can be reduced by adding a chiral agent to the liquid crystal material.

EXAMPLES (Production of Polarizing Plate Protective Film A-1)

[Preparation of Cellulose Acylate Solution]

The following composition was added to a mixing tank and stirred to dissolve the components, so that a cellulose acetate solution was prepared.

| (Composition of cellulose acylate solution 01) | |
|---|---|
| Cellulose acetate butyrate having acetylation degree of 1.0 and butyrylation degree of 1.5 | 100.0 parts by mass |
| Plasticizer of triphenyl phosphate | 3.0 parts by mass |
| Plasticizer of biphenyl phosphate | 1.5 parts by mass |
| Methylene chloride (First solvent) | 250.0 parts by mass |
| Methanol (Second solvent) | 45.0 parts by mass |
| n-Butanol (Third solvent) | 10.0 parts by mass |

[Preparation of Matting Agent Solution 11]

The following composition was put in a disperser and stirred to dissolve the components, whereby a matting agent solution 11 was prepared.

| (Composition of matting agent solution) | |
|---|---|
| Silica particles having average particle size of 20 nm, AEROSIL R972 available from Nippon Aerosil Co., Ltd. | 2.0 parts by mass |
| Methylene chloride (First solvent) | 75.0 parts by mass |
| Methanol (Second solvent) | 12.7 parts by mass |
| Cellulose acylate solution 01 | 10.3 parts by mass |

[Preparation of Retarder Solution 21]

The following composition was added to a mixing tank and stirred while heating to dissolve the components, so that a retarder solution 21 was prepared.

| (Composition of retarder solution 21) | |
|---|---|
| Retarder (G) | 10.0 parts by mass |
| Methylene chloride (First solvent) | 67.1 parts by mass |
| Methanol (Second solvent) | 10.0 parts by mass |
| Cellulose acylate solution 01 | 12.8 parts by mass |

Retarder G

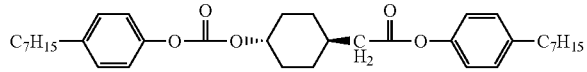

The cellulose acylate solution 01 (94.7 parts by mass), the matting agent solution 11 (1.3 parts by mass), and the retarder solution 21 (4.0 parts by mass) were each filtered, and mixed and cast by a band casting apparatus. The obtained web was peeled off from the band, and transversely stretched at a stretch ratio of 35% using a tenter at 130° C. Then, clips were removed and the film was dried at 130° C. for 40 minutes, to produce a stretched cellulose acylate film A-1. The stretched cellulose acylate film had a residual solvent content of 0.2% by mass and a thickness of 80 μm.

(Production of Polarizing Plate Protective Film A-2)

[Preparation of Cellulose Acylate Solution 02]

The following composition was added to a mixing tank and stirred to dissolve the components, so that a cellulose acylate solution 02 was prepared.

| (Composition of cellulose acylate solution 02) | |
|---|---|
| Cellulose acylate having acetylation degree of 1.0 and benzoylation degree of 1.3 | 100.0 parts by mass |
| Plasticizer of triphenyl phosphate | 3.0 parts by mass |

| (Composition of cellulose acylate solution 02) | |
|---|---|
| Plasticizer of biphenyl phosphate | 1.5 parts by mass |
| Methylene chloride (First solvent) | 250.0 parts by mass |
| Methanol (Second solvent) | 45.0 parts by mass |

[Preparation of Matting Agent Solution 12]

The following composition was put in a disperser and stirred to dissolve the components, whereby a matting agent solution 12 was prepared.

| (Composition of matting agent solution 12) | |
|---|---|
| Silica particles having average particle size of 20 nm, AEROSIL R972 available from Nippon Aerosil Co., Ltd. | 2.0 parts by mass |
| Methylene chloride (First solvent) | 75.0 parts by mass |
| Methanol (Second solvent) | 12.7 parts by mass |
| Cellulose acylate solution 02 | 10.3 parts by mass |

[Preparation of Retarder Solution 22]

The following composition was added to a mixing tank and stirred while heating to dissolve the components, so that a retarder solution 22 was prepared.

| (Composition of retarder solution 22) | |
|---|---|
| Retarder (G) | 5.0 parts by mass |
| Methylene chloride (First solvent) | 71.5 parts by mass |
| Methanol (Second solvent) | 10.7 parts by mass |
| Cellulose acylate solution 02 | 12.8 parts by mass |

The cellulose acylate solution 02 (94.7 parts by mass), the matting agent solution 12 (1.3 parts by mass), and the retarder solution 22 (4.0 parts by mass) were each filtered, and mixed and cast by a band casting apparatus. The obtained web was peeled off from the band, and transversely stretched at a stretch ratio of 35% using a tenter at 135° C. Then, clips were removed and the film was dried at 130° C. for 40 minutes, to produce a stretched cellulose acylate film A-2. The stretched cellulose acylate film had a residual solvent content of 0.3% by mass and a thickness of 78 µm.

(Production of Polarizing Plate Protective Film A-3)

[Preparation of Cellulose Acylate Solution 03]

The following composition was added to a mixing tank and stirred to dissolve the components, so that a cellulose acylate solution 03 was prepared.

| (Composition of cellulose acylate solution 03) | |
|---|---|
| Cellulose acylate having acetylation degree of 1.0 and benzoylation degree of 1.2 | 100.0 parts by mass |
| Plasticizer of triphenyl phosphate | 3.0 parts by mass |
| Plasticizer of biphenyl phosphate | 1.5 parts by mass |
| Methylene chloride (First solvent) | 250.0 parts by mass |
| Methanol (Second solvent) | 45.0 parts by mass |

[Preparation of Matting Agent Solution 13]

The following composition was put in a disperser and stirred to dissolve the components, whereby a matting agent solution 12 was prepared.

| (Composition of matting agent solution 13) | |
|---|---|
| Silica particles having average particle size of 20 nm, AEROSIL R972 available from Nippon Aerosil Co., Ltd. | 2.0 parts by mass |
| Methylene chloride (First solvent) | 75.0 parts by mass |
| Methanol (Second solvent) | 12.7 parts by mass |
| Cellulose acylate solution 03 | 10.3 parts by mass |

The cellulose acylate solution 03 (98.7 parts by mass) and the matting agent solution 13 (1.3 parts by mass) were each filtered, and mixed and cast by a band casting apparatus. The obtained web was peeled off from the band, and transversely stretched at a stretch ratio of 38% using a tenter at 140° C. Then, clips were removed and the film was dried at 130° C. for 40 minutes, to produce a stretched cellulose acylate film A-3. The stretched cellulose acylate film had a residual solvent content of 0.3% by mass and a thickness of 80 µm.

[Preparation of Matting Agent Solution 14]

The following composition was put in a disperser and stirred to dissolve the components, whereby a matting agent solution 14 was prepared.

| (Composition of matting agent solution) | |
|---|---|
| Silica particles having average particle size of 20 nm, AEROSIL R972 available from Nippon Aerosil Co., Ltd. | 2.0 parts by mass |
| Methylene chloride (First solvent) | 75.0 parts by mass |
| Methanol (Second solvent) | 12.7 parts by mass |
| Cellulose acylate solution 04 | 10.3 parts by mass |

[Preparation of Retarder Solution 24]

The following composition was added to a mixing tank and stirred while heating to dissolve the components, so that a retarder solution 24 was prepared.

| (Composition of retarder solution 24) | |
|---|---|
| Retarder (20) | 5.0 parts by mass |
| Methylene chloride (First solvent) | 71.5 parts by mass |
| Methanol (Second solvent) | 10.7 parts by mass |
| Cellulose acylate solution 04 | 12.8 parts by mass |

The cellulose acylate solution 04 (94.7 parts by mass), the matting agent solution 14 (1.3 parts by mass), and the retarder solution 24 (4.0 parts by mass) were each filtered, and mixed and cast by a band casting apparatus. The obtained web was peeled off from the band, and transversely stretched at a stretch ratio of 45% using a tenter at 135° C. and relaxed at a ratio of 10% in the longitudinal direction (in the transport direction). Then, clips were removed and the film was dried at 130° C. for 40 minutes, to produce a stretched cellulose acylate film A-2. The stretched cellulose acylate film had a residual solvent content of 0.2% by mass and a thickness of 83 µm.

Comparative Example 1

(Production of Polarizing Plate Protective Film A-5)

[Preparation of Cellulose Acylate Solution]

The following composition was added to a mixing tank and stirred to dissolve the components, so that a cellulose acylate solution was prepared.

| (Composition of cellulose acylate solution 05) | |
| --- | --- |
| Cellulose acetate having acetylation degree of 2.8 | 100.0 parts by mass |
| Plasticizer of triphenyl phosphate | 8.0 parts by mass |
| Plasticizer of biphenyl phosphate | 3.5 parts by mass |
| Methylene chloride (First solvent) | 260.0 parts by mass |
| Methanol (Second solvent) | 40.0 parts by mass |

[Preparation of Matting Agent Solution 15]

The following composition was put in a disperser and stirred to dissolve the components, whereby a matting agent solution 15 was prepared.

| (Composition of matting agent solution) | |
| --- | --- |
| Silica particles having average particle size of 20 nm, AEROSIL R972 available from Nippon Aerosil Co., Ltd. | 2.0 parts by mass |
| Methylene chloride (First solvent) | 75.0 parts by mass |
| Methanol (Second solvent) | 12.7 parts by mass |
| Cellulose acylate solution 05 | 10.3 parts by mass |

[Preparation of Retarder Solution 25]

The following composition was added to a mixing tank and stirred while heating to dissolve the components, so that a retarder solution 25 was prepared.

| (Composition of retarder solution 25) | |
| --- | --- |
| Retarder (II)-4 | 10.0 parts by mass |
| Methylene chloride (First solvent) | 67.1 parts by mass |
| Methanol (Second solvent) | 10.0 parts by mass |
| Cellulose acylate solution 01 | 12.8 parts by mass |

The cellulose acylate solution 05 (92.7 parts by mass), the matting agent solution 15 (1.3 parts by mass), and the retarder solution 25 (6.0 parts by mass) were each filtered, and mixed and cast by a band casting apparatus. The obtained web was peeled off from the band, and transversely stretched at a stretch ratio of 30% using a tenter at 145° C. Then, clips were removed and the film was dried at 140° C. for 20 minutes, to produce a stretched cellulose acylate film A-5. The stretched cellulose acylate film had a residual solvent content of 0.2% by mass and a thickness of 82 μm.

(Production of Referential Retardation Films A-6 and C-3)

A copolymerized PC film A-6 having retardation properties shown in Table 2 was produced by a method described in WO 2003/032060.

Further, a stretched ARTON film C-3 having retardation properties shown in Table 2 was produced by a method described in WO 2003/032060.

(Production of Polarizing Plate Protective Film C-1)

<Preparation of Cellulose Acylate Solution 06>

The following composition was added to a mixing tank and stirred to dissolve the components, so that a cellulose acylate solution 06 was prepared.

| (Composition of cellulose acylate solution 06) | |
| --- | --- |
| Cellulose acetate having acetylation degree of 2.80 | 100.0 parts by mass |
| Triphenyl phosphate (Plasticizer) | 5.0 parts by mass |
| Biphenyl phosphate (Plasticizer) | 3.0 parts by mass |
| Methylene chloride (First solvent) | 402.0 parts by mass |
| Methanol (Second solvent) | 60.0 parts by mass |

<Preparation of Matting Agent Solution 16>

The following composition was put in a disperser and stirred to dissolve the components, whereby a matting agent solution 16 was prepared.

| (Composition of matting agent solution 16) | |
| --- | --- |
| Silica particles having average particle size of 20 nm, AEROSIL R972 available from Nippon Aerosil Co., Ltd. | 2.0 parts by mass |
| Methylene chloride (First solvent) | 75.0 parts by mass |
| Methanol (Second solvent) | 12.7 parts by mass |
| Cellulose acylate solution 06 | 10.3 parts by mass |

<Preparation of Retarder Solution 26>

The following composition was added to a mixing tank and stirred while heating to dissolve the components, so that a retarder solution 26 was prepared.

| (Composition of retarder solution 26) | |
| --- | --- |
| Retarder (B-121) | 7.0 parts by mass |
| Retarder (B-122) | 13.0 parts by mass |
| Methylene chloride (First solvent) | 58.4 parts by mass |
| Methanol (Second solvent) | 8.7 parts by mass |
| Cellulose acylate solution 06 | 12.8 parts by mass |

The cellulose acylate solution 06 (94.5 parts by mass), the matting agent solution 16 (1.3 parts by mass), and the retarder solution 26 (4.8 parts by mass) were each filtered, and mixed and cast by a band casting apparatus. The obtained film having a residual solvent content of 23% was peeled off from the band, transversely stretched at a stretch ratio of 5% using a tenter at 135° C., and the stretched width was maintained at 135° C. for 30 seconds. Then, clips were removed and the film was dried at 130° C. for 40 minutes, to produce a cellulose acylate film (a polarizing plate protective film C-1) according to the present invention. The polarizing plate protective film C-1 had a residual solvent content of 0.2% and a thickness of 81 μm.

(Production of Comparative Polarizing Plate Protective Film C-2)

A polyvinyl alcohol was applied to one surface of a commercially available cellulose triacetate film FUJITAC TD80UF manufactured by Fuji Photo Film Co., Ltd., and subjected to a rubbing alignment treatment to form an alignment film. Then, the alignment film was coated with a liquid crystal layer containing the following liquid crystal materials A and B at a mass ratio of 1/1, heated at 90° C. for 3 minutes, and cooled and fixed to the cholesteric state to form a 5 μm thick cholesteric liquid crystal layer, so that an optical film was prepared. The cholesteric liquid crystal layer had a front phase difference of 2 nm and a phase difference in the thickness direction of 240 nm.

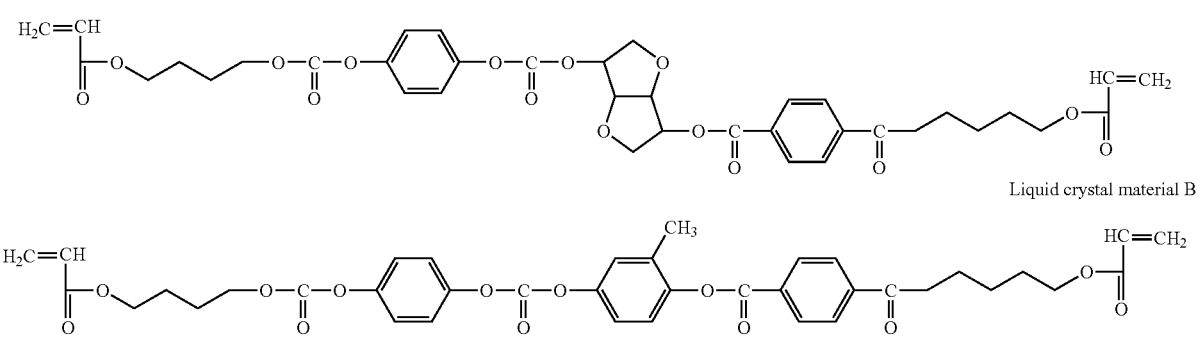

Liquid crystal material A

Liquid crystal material B

The Re and Rth of thus produced films A-1 to A-6 and C-1 to C-3 were measured by a automatic birefringence meter KOBRA-WR available from Oji Scientific Instruments under conditions of 25° C. and relative humidity of 60% at wavelengths of 446 nm, 548 nm, and 628 nm. The results are shown in Table 1.

TABLE 1

| Sample | Re (nm) | | | | | Rth (nm) | | | | |
|---|---|---|---|---|---|---|---|---|---|---|
| | Re(446) | Re(548) | Re(628) | Re(446)/Re(548) | Re(628)/Re(548) | Rth(446) | Rth(548) | Rth(628) | Rth(446)/Rth(548) | Rth(628)/Rth(548) |
| Polarizing plate protective film A-1 | 67 | 80 | 88 | 0.84 | 1.10 | 92 | 102 | 107 | 0.90 | 1.05 |
| Polarizing plate protective film A-2 | 70 | 95 | 110 | 0.74 | 1.16 | 90 | 103 | 111 | 0.87 | 1.08 |
| Polarizing plate protective film A-3 | 72 | 106 | 124 | 0.68 | 1.17 | 92 | 105 | 113 | 0.88 | 1.08 |
| Polarizing plate protective film A-4 | 80 | 112 | 124 | 0.71 | 1.11 | 61 | 83 | 91 | 0.73 | 1.10 |
| Polarizing plate protective film A-5 | 72 | 67 | 64 | 1.07 | 0.96 | 189 | 180 | 174 | 1.05 | 0.97 |
| Retardation film A-6 | 120 | 147 | 156 | 0.82 | 1.06 | 60 | 72 | 78 | 0.83 | 1.08 |
| Polarizing plate protective film C-1 | 2 | 2 | 2 | 1.00 | 1.00 | 226 | 200 | 194 | 1.13 | 0.97 |
| Polarizing plate protective film C-2 | 4 | 4 | 4 | 1.00 | 1.00 | 250 | 243 | 243 | 1.03 | 1.00 |
| Retardation film C-3 | 1 | 1 | 1 | 1.00 | 1.00 | 272 | 253 | 247 | 1.08 | 0.98 |

(Saponification Treatment of Polarizing Plate Protective Film A-1)
(Alkali Treatment of Film)

The produced polarizing plate protective film A-1 was soaked in a 2.3-mol/L aqueous sodium hydroxide solution at 55° C. for 3 minutes. The film was washed in a water-washing bath at the room temperature, and neutralized by 0.05-mol/L sulfuric acid at 30° C. The film was washed again in the water-washing bath at the room temperature, and dried by a hot air at 100° C. The surface of the polarizing plate protective film A-1 was saponified in this manner.

(Saponification of Polarizing Plate Protective Films A-2 to A-5, C-1 and C-2)

The polarizing plate protective films A-2 to A-5, C-1 and C-2 were saponified in the same manner as the polarizing plate protective film A-1 respectively.

<Production of Polarizing Plate>
(Saponification of Polarizing Plate Protective Film)

A commercially available cellulose acylate film (FUJITAC TD80) was soaked in a 1.5-mol/L aqueous sodium hydroxide solution at 55° C. for 1 minute. The film was washed in a water-washing bath at the room temperature, and neutralized by 0.05-mol/L sulfuric acid at 30° C. The film was washed again in the water-washing bath at the room temperature, and dried by a hot air at 100° C.

(Production of Polarizer)

A polyvinyl alcohol film having a polymerization degree of 1700 and a thickness of 39 μm was swollen in hot water bath at 30° C., and stretched by about 4 times at 30° C. in a coloring bath containing iodine and an aqueous potassium iodide solution. Then, the film was stretched and crosslinked at 50° C. in a crosslinking bath containing boric acid and potassium iodide such that the total stretch ratio was 5.5 times. This was soaked in an aqueous potassium iodide solution at 35° C. for 10 seconds to control the hue. The resultant film was water-washed and dried to obtain a polarizer having a thickness of 18 μm. The water content of the polarizer was 14%. The birefringence ($\Delta n$) was 0.0482, the transmittance was 43%, and the polarization degree was 99.9%, at a wavelength of 900 nm.

The birefringence was obtained such that a phase difference value ($\Delta nd$) at a wavelength of 900 nm was obtained by using a parallel nicols rotation method and divided by the thickness d (nm).

The transmittance was measured by a spectrophotometer DOT-3 manufactured by Murakami Color Research Laboratory Co., Ltd., and corrected with respect to visibility by two-degree visual field (C light source) according to JIS Z8701 to obtain a Y value.

The transmittance (H0) was measured when 2 polarizers were stacked such that the polarizing axes were parallel, the transmittance (H90) was measured when the 2 polarizers were stacked such that the polarizing axes were perpendicular, and the polarization degree was calculated by the following formula. The parallel transmittance (H0) and the perpendicular transmittance (H90) were Y values corrected with respect to visibility.

Polarization degree(%)= $\sqrt{\{(H0-H90)/(H0+H90)\}} \times 100$ (Preparation of Adhesive)

10 parts of a polyester-based urethane (TAKELAC XW-74-C154 available from Mitsui Takeda Chemicals, Inc.) and 1 part of an isocyanate crosslinking agent (TAKENATE WD?725 available from Mitsui Takeda Chemicals, Inc.) were dissolved in water to prepare a liquid having a solid content of 20% as an adhesive.

(Production of Polarizing Plate A-1)

The adhesive solution was applied to the both sides of the polarizer, the saponified polarizing plate protective film A-1 and the saponified FUJITAC TD80 were bonded to the polarizer, dried and cured in an oven at 40° C. for 72 hours to produce polarizing plates A'-1.

(Production of Polarizing Plates A-2, A-3, A-4 and C'-1)

Polarizing plates A'-2, A'-3, A'-4 and C'-1 were produced in the same manner as the polarizing plate A-1 except for using the polarizing plate protective films A-2, A-3, A'-4 and C-1, respectively.

(Production of Comparative Polarizing Plates A'-5 and C'-2)

Comparative polarizing plates A'-5 and C'-2 were produced in the same manner as the polarizing plate A'-1 except for using the comparative polarizing plate protective films A-5 and C-2, respectively. The comparative polarizing plate C'-2 was bonded such that the optically anisotropic layer faced their interface.

(Production of Comparative Polarizing Plate A'-6)

The referential retardation film A-6 was bonded to a surface of a commercially available polarizing plate HLC2-5618 available from Sanritz Corporation using an adhesive.

(Production of Comparative Polarizing Plate C'-3)

The referential retardation film C-3 was bonded to a surface of a commercially available polarizing plate HLC2-5618 available from Sanritz Corporation using an adhesive to produce a polarizing plate C'-3.

(Production of Liquid Crystal Display Device)

The polarizing plates were each bonded by an adhesive to the observer side and the backlight side of a VA mode liquid crystal cell. The polarizing plate A'-1 was bonded as the upper polarizing plate 1 of FIG. 1 to the VA mode cell such that the polarizing plate protective film A-1 according to the invention faced the liquid crystal cell, and the polarizing plate C'-1 was bonded as the lower polarizing plate 12 to the VA mode cell such that the polarizing plate protective film C-1 according to the invention faced the liquid crystal cell. They were placed in the crossed nicols state such that the transmission axis of the observer side polarizing plate extended in the vertical direction and the transmission axis of the backlight side polarizing plate extended in the horizontal direction. A liquid crystal display device (201) was produced in this manner.

Further, a liquid crystal display device 202 to 204 of the invention and a comparative liquid crystal display devices 205 to 208 were produced using the films shown in Table 2 facing the liquid crystal cell respectively.

(Change of Color Viewing Angle)

The color changes of the liquid crystal display devices 201 to 208 at a polar angle of 60° between azimuth angles of 0° and 80° were measured by ELDIM EZ contrast, to obtain absolute values Δx and Δy of the color changes in the xy chromaticity diagram. The results are shown in Table 2.

TABLE 2

| Liquid crystal display device | Polarizing plate structure Upper polarizing plate | Lower polarizing plate | Evaluation Δx | Δy | Note |
|---|---|---|---|---|---|
| 201 | A'-1 | C'-1 | 0.19 | 0.20 | This invention |
| 202 | A'-2 | C'-1 | 0.17 | 0.18 | This invention |
| 203 | A'-3 | C'-1 | 0.16 | 0.17 | This invention |
| 204 | A'-4 | C'-1 | 0.17 | 0.16 | This invention |
| 205 | A'-1 | C'-2 | 0.25 | 0.24 | Comparative |
| 206 | A'-5 | C'-1 | 0.31 | 0.29 | Comparative |
| 207 | A'-5 | C'-2 | 0.35 | 0.34 | Comparative |
| 208 | A'-6 | C'-3 | 0.20 | 0.20 | Comparative |

It was clear from the results shown in Table 2 that the liquid crystal display devices 201 to 204 of the invention preferably showed smaller color changes due to the viewing angles as compared with the comparative liquid crystal display devices 205 to 207. In the liquid crystal display devices 201 to 204 of the invention, the polarizing plate protective films preferably acted also as optical compensatory films, whereby the devices could be produced by smaller bonding steps as compared with comparative liquid crystal display devices 208.

The invention claimed is:

1. A liquid crystal display device comprising a liquid crystal cell and two polarizing plates disposed on the both sides thereof, wherein
   the polarizing plates each comprise a polarizer and two protective films disposed on the both sides thereof,
   in one of the polarizing plates, the protective film facing the liquid crystal cell has properties of the following inequalities (1) to (5), and
   in the other polarizing plate, the protective film facing the liquid crystal cell has properties of the following inequalities (6) to (10):

$20\ nm < Re(548) < 150\ nm$  Inequality (1)

$20\ nm < Rth(548) < 150\ nm$  Inequality (2)

$0 < Rth(548)/Re(548) < 2.0$  Inequality (3)

$0.6 < Re(446)/Re(548) < 0.8$  Inequality (4)

$1.1 < Re(628)/Re(548) < 1.3$  Inequality (5)

$0\ nm < Re(548) < 10\ nm$  Inequality (6)

$100\ nm < Rth(548) < 300\ nm$  Inequality (7)

$10 < Rth(548)/Re(548)$  Inequality (8)

$1.1 < Rth(446)/Rth(548) < 1.5$  Inequality (9)

$0.5 < Rth(628)/Rth(548) < 1.0$  Inequality (10).

2. The liquid crystal display device according to claim 1, wherein the protective film facing the liquid crystal cell is a cellulose acylate film.

3. The liquid crystal display device according to claim 1, wherein the protective film facing the liquid crystal cell is a stretched cellulose acylate film.

4. The liquid crystal display device according to claim 2, wherein the cellulose acylate film having the properties of the inequalities (1) to (5) comprises a cellulose acylate having two or more types of acyl groups.

5. The liquid crystal display device according to claim 2, wherein the cellulose acylate film having the properties of the inequalities (1) to (5) comprises a cellulose acylate having a fatty acyl group and a substituted or unsubstituted aromatic acyl group.

6. The liquid crystal display device according to claim 2, wherein the cellulose acylate film having the properties of the inequalities (1) to (5) comprises at least one Re generating agent.

7. The liquid crystal display device according to claim 6, wherein the Re generating agent is a compound represented by the following formula (I):

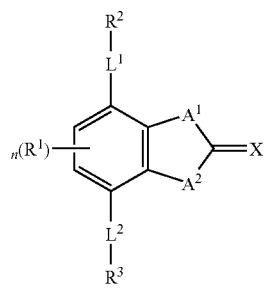

Formula (I)

wherein $L^1$ and $L^2$ independently represent a single bond or a divalent linking group, $A^1$ and $A^2$ independently represent one selected from the group consisting of —O—, —NR—, —S—, and —CO—, R represents a hydrogen atom or a substituent, $R^1$, $R^2$, and $R^3$ independently represent a substituent, X represents a nonmetal atom of Groups 14 to 16, to which a hydrogen atom or a substituent may be connected, and n represents an integer of 0 to 2.

8. The liquid crystal display device according to claim 2, wherein the cellulose acylate film having the properties of the inequalities (6) to (10) comprises at least one Rth generating agent.

9. The liquid crystal display device according to claim 8, wherein the Rth generating agent has an absorption maximum in a wavelength range of 250 to 380 nm.

10. The liquid crystal display device according to claim 1, wherein the liquid crystal cell uses a VA mode.

\* \* \* \* \*